US007579716B2

(12) United States Patent
Sato et al.

(10) Patent No.: US 7,579,716 B2
(45) Date of Patent: Aug. 25, 2009

(54) POWER STORAGE DEVICE AND IMAGE FORMING APPARATUS

(75) Inventors: Naoki Sato, Kanagawa (JP); Masayuki Ohtani, Kanagawa (JP); Masahide Nakaya, Kanagawa (JP); Hideo Kikuchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 84 days.

(21) Appl. No.: 11/802,485

(22) Filed: May 23, 2007

(65) Prior Publication Data

US 2007/0274736 A1 Nov. 29, 2007

(30) Foreign Application Priority Data

May 23, 2006 (JP) ............................ 2006-143395
Mar. 29, 2007 (JP) ............................ 2007-087563

(51) Int. Cl.
*H02J 3/06* (2006.01)

(52) U.S. Cl. ............................ 307/80; 307/70; 399/60; 219/216

(58) Field of Classification Search .................. 307/80, 307/43, 70; 399/69, 335; 219/216
See application file for complete search history.

(56) References Cited

U.S. PATENT DOCUMENTS

| | | | | |
|---|---|---|---|---|
| 4,434,395 | A * | 2/1984 | Higuchi | 320/166 |
| 4,634,953 | A * | 1/1987 | Shoji et al. | 368/205 |
| 6,930,293 | B2 * | 8/2005 | Matsuo et al. | 219/664 |
| 7,127,189 | B2 * | 10/2006 | Takamatsu et al. | 399/69 |
| 7,164,870 | B2 * | 1/2007 | Satoh | 399/69 |
| 2005/0139591 | A1 | 6/2005 | Takamatsu et al. | |

FOREIGN PATENT DOCUMENTS

| | | |
|---|---|---|
| EP | 1 494 332 | 1/2005 |
| JP | 10-282821 | 10/1998 |
| JP | 2003-297526 | 10/2003 |
| JP | 2004-234996 | 8/2004 |
| WO | WO03/017413 | 2/2003 |

OTHER PUBLICATIONS

Search Report dated Mar. 17, 2008 for corresponding European Application No. 07108710.0-2207.
Office Action dated Jan. 16, 2009 for corresponding Chinese Application No. 2007101048826.

* cited by examiner

*Primary Examiner*—Albert W Paladini
(74) *Attorney, Agent, or Firm*—Harness, Dickey & Pierce PLC

(57) ABSTRACT

A power storage device includes an alternating current (AC) power source, a field effect transistor (FET), a capacitor bank, a direct current (DC) fixing heater, a step-down chopper circuit, and an output control unit. The FET switches between a first path and a second path to supply power from the AC power source in combination with a diode and an IGBT. The capacitor bank is arranged on the first path, and includes capacitor cells. The DC fixing heater is arranged on the second path. The step-down chopper circuit is arranged on the first path, and changes a voltage value of power supplied from the AC power source. The output control unit controls, when power is supplied to the first path, controls the step-down chopper circuit to change a voltage value based on a charging voltage of the capacitor cells.

9 Claims, 42 Drawing Sheets

| FIG. 7A |
| --- |
| FIG. 7B |

| FIG. 26A |
|---|
| FIG. 26B |

POWER STORAGE DEVICE AND IMAGE FORMING APPARATUS

CROSS-REFERENCE TO RELATED APPLICATIONS

The present document incorporates by reference the entire contents of Japanese priority documents, 2006-143395 filed in Japan on May 23, 2006 and 2007-087563 filed in Japan on Mar. 29, 2007.

BACKGROUND OF THE INVENTION

1. Field of the Invention

The present invention relates to a power storage device and an image forming apparatus.

2. Description of the Related Art

In recent years, with increase of environmental conservation activities, there has been a growing trend in making an office environment energy-efficient. Therefore, there is a need for energy-saving in an image forming apparatus, in particular, in a type of an image forming apparatus with a heat-roller fixing device, which gives pressure and heat to a heated body such as paper and film, that requires more power.

An image forming apparatus with a heat-roller fixing device capable of high-speed image formation often uses a fixing roller that has a large heat capacity to prevent temperature of a fixing roller of a heating unit from falling in image forming operation. In this case, it takes longer time until the fixing roller reaches a temperature at which it can be used. It is undesirable that a user has to wait a long time for copying.

When an image forming apparatus enters energy-saving mode, temperature of the fixing roller is maintained lower than in standby mode. Thus, it takes long until the fixing roller reaches a usable temperature, resulting in long waiting time for a user. In other words, longer standby-mode time is preferable to reduce waiting time for a user; however, it causes consumption of more power.

To overcome the problem, some conventional image forming apparatuses have been proposed that is capable of reducing the time taken to achieve a usable temperature from energy-saving mode. For example, Japanese Patent Application Laid-open No. 2004-234996 discloses one of such conventional image forming apparatuses in which the mode is shifted from standby to energy-saving in a short time after completion of copying to reduce power consumption. The conventional image forming apparatus includes a secondary power source such as a capacitor, and supplies power from the secondary power source.

In the conventional image forming apparatus, power is supplied from a commercial alternating current (AC) power source to a fixing heater and a capacitor in a switching manner, and the capacitor as a secondary power source is charged as needed. Subsequently, power is supplied from the capacitor to the fixing heater, which is heated in a short time to a predetermined temperature. This makes it possible to reduce the time for a fixing roller to reach a usable temperature. In addition, it is possible to supply power from a commercial AC power source to both the capacitor and the fixing heater. Accordingly, a plurality of power sources is not required, leading to a simplified configuration of an image forming apparatus.

However, when power is supplied to the capacitor in the conventional image forming apparatus, a commercial power source is used for direct current (DC) power supplying and smoothed power is supplied. Thus, electric current flows into the capacitor while maintaining voltage supplied through the commercial power source. On the other hand, a capacitor is a component that is often damaged due to overcharge. To prevent it from being damaged, it is necessary to arrange an appropriate number of capacitors correspondingly to supply voltage. That is, the required number of capacitors depends on voltage supplied through a commercial power source, and therefore, a large number of capacitors are required, leading to an increase in cost. Moreover, the required number of capacitors varies according to countries because voltage supplied through a commercial power source is different in each country.

SUMMARY OF THE INVENTION

It is an object of the present invention to at least partially solve the problems in the conventional technology.

According to an aspect of the present invention, a power storage device that stores therein power output from a power supply unit to be supplied to a load unit, includes a power storing unit that includes a capacitor cell, a first switching unit that switches between a first power-supply path and a second power-supply path to supply power from the power supply unit, the power storing unit being located on the first power-supply path, and the load unit being located on the second power-supply path, a voltage changing unit that is located on the first power-supply path, and that changes a voltage value of power supplied from the power supply unit, and an output control unit that controls, when power is supplied to the first power-supply path, the voltage changing unit to change a voltage value based on a charging voltage of the capacitor cells.

According to another aspect of the present invention, an image forming apparatus includes a fixing unit that fixes a toner image, a heating unit that heats the fixing unit, and a power storage device that stores therein power output from a power supply unit. The image forming apparatus further includes a power storing unit that includes a capacitor cell, a switching unit that switches between a first power-supply path and a second power-supply path to supply power from the power supply unit, the power storing unit being located on the first power-supply path, and the heating unit being located on the second power-supply path, a voltage changing unit that is located on the first power-supply path, and that changes a voltage value of power supplied from the power supply unit, and an output control unit that controls, when power is supplied to the first power-supply path, the voltage changing unit to change a voltage value based on a charging voltage of the capacitor cells.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
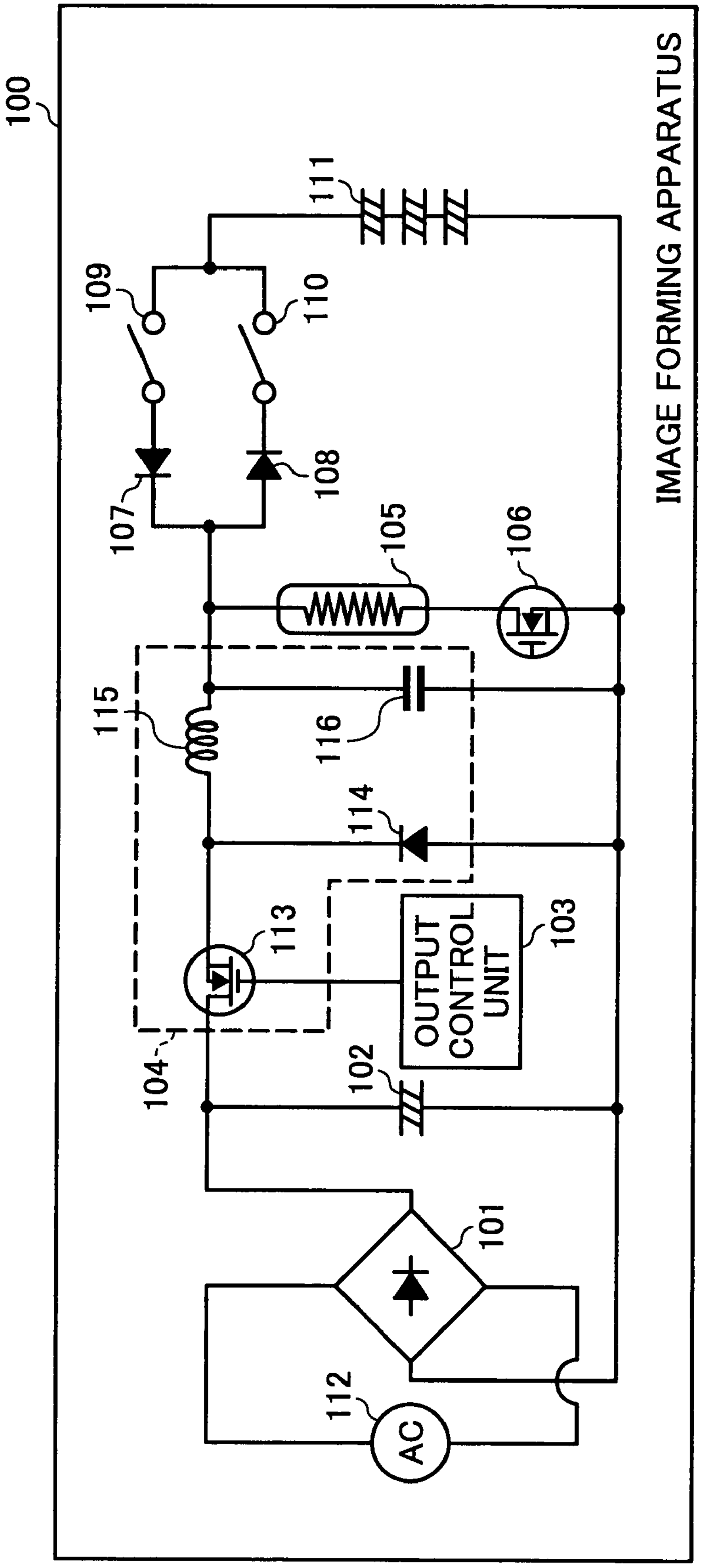
FIG. 1 is a schematic diagram of an image forming apparatus according to a first embodiment of the present invention.

FIG. 1 is a schematic diagram of an image forming apparatus 100 according to a first embodiment of the present invention. The image forming apparatus 100 includes a full-wave rectifying circuit 101, a smoothing condenser 102, an output control unit 103, a step-down chopper circuit 104, a DC fixing heater 105, a discharge circuit (field effect transistor) 106, a diode 107, a diode 108, a switching circuit 109, a switching circuit 110, a capacitor bank 111, and an AC power source 112. The image forming apparatus 100 includes only one fixing heater as shown in FIG. 1.

In the first embodiment, an explanation is given of the case where larger electric power is stored in the capacitor bank 111 through the step-down chopper circuit 104 than electric power supplied to the DC fixing heater 105, the stored electric power is used upon starting of the image forming apparatus 100 and when temperature decreases during a series of copying operations, and otherwise, electric power is supplied from the step-down chopper circuit 104 to the DC fixing heater 105.

Electric power from a commercial power source is supplied through the AC power source 112.

The full-wave rectifying circuit 101 rectifies alternating current (AC) input from the AC power source 112 in full-wave and outputs as direct current (DC). The smoothing condenser 102 removes ripple components with respect to full-wave rectified output.

The step-down chopper circuit 104 includes a field effect transistor (FET) 113 arranged on its input side, a choke coil 115 connected to an output side (source) of the EFT 113, a feedback diode 114 arranged between the FET 113 and the choke coil 115, and a smoothing condenser 116. Voltage is lowered in the step-down chopper circuit 104 based on control of the output control unit 103.

The output control unit 103 controls the FET 113 of the step-down chopper circuit 104 and causes it to supply electric power large enough for the DC fixing heater 105 to fix or perform constant-current charge or constant-power charge based on suitable voltage to charge the later-described capacitor bank 111. The details are to be described later.

The DC fixing heater 105 heats a fixing roller included in the image forming apparatus 100. The fixing roller is to be described later.

The discharge circuit (FET) 106 is arranged on a path through which the AC power source 112, the step-down chopper circuit 104, the DC fixing heater 105, and a ground are connected, i.e., on a second path. The FET 106 is controlled by an engine control unit (not shown). When it is turned on by the engine control unit, electric power is supplied to the DC fixing heater 105.

The diode 108 and the switching circuit 110 are arranged on a path through which the AC power source 112, the step-down chopper circuit 104, and the capacitor bank 111 are connected, in other words, on a first path. Current whose voltage is lowered by the step-down chopper circuit 104 is limited to flow only in one direction to the capacitor bank 111 by the diode 108. Current whose voltage is lowered by the step-down chopper circuit 104 is directed to the capacitor bank 111 by the switching circuit 110 at turn-on. An insulated gate bipolar transistor (IGBT) is used as the switching circuit 110.

In short, it is possible to switch between the first and second paths as destinations to supply current based on a combination of the FET 106, the diode 108, and the switching circuit 110.

The diode 107 and the switching circuit 109 are arranged on a path through which the capacitor bank 111 and the DC fixing heater are connected, i.e., on a third path. Current is limited to flow only in one direction from the capacitor bank 111 to the DC fixing heater 105 by the diode 107. Current flows from the capacitor bank 111 to the DC fixing heater 105 by the diode 107 when the switching circuit 109 is turned on. Insulated gate bipolar transistor (IGBT) is used as the switching circuit 109 in the first embodiment.

In short, it is possible to switch over whether to supply power from the capacitor bank 111 to the DC fixing heater 105 based on a combination of the diode 107 and the switching circuit 109.

The capacitor bank 111 includes a plurality of capacitor cells, stores therein current whose voltage is lowered by the step-down chopper circuit 104, and supplies the stored power to the DC fixing heater 105 when a predetermined condition is satisfied. A condition to supply power is described later.

In the image forming apparatus 100, the output control unit 103 causes the FET 113 to lower voltage to a suitable level to store power. Then, when the IGBT 110 is turned on and the FET 106 is turned off, power is stored in the capacitor bank 111. The IGBT 109 is turned off.

When the IGBT 110 is turned off, the IGBT 109 is turned on, and the FET 106 is turned on, power stored in the capacitor bank 111 is supplied to the DC fixing heater 105.

Figure 2A:
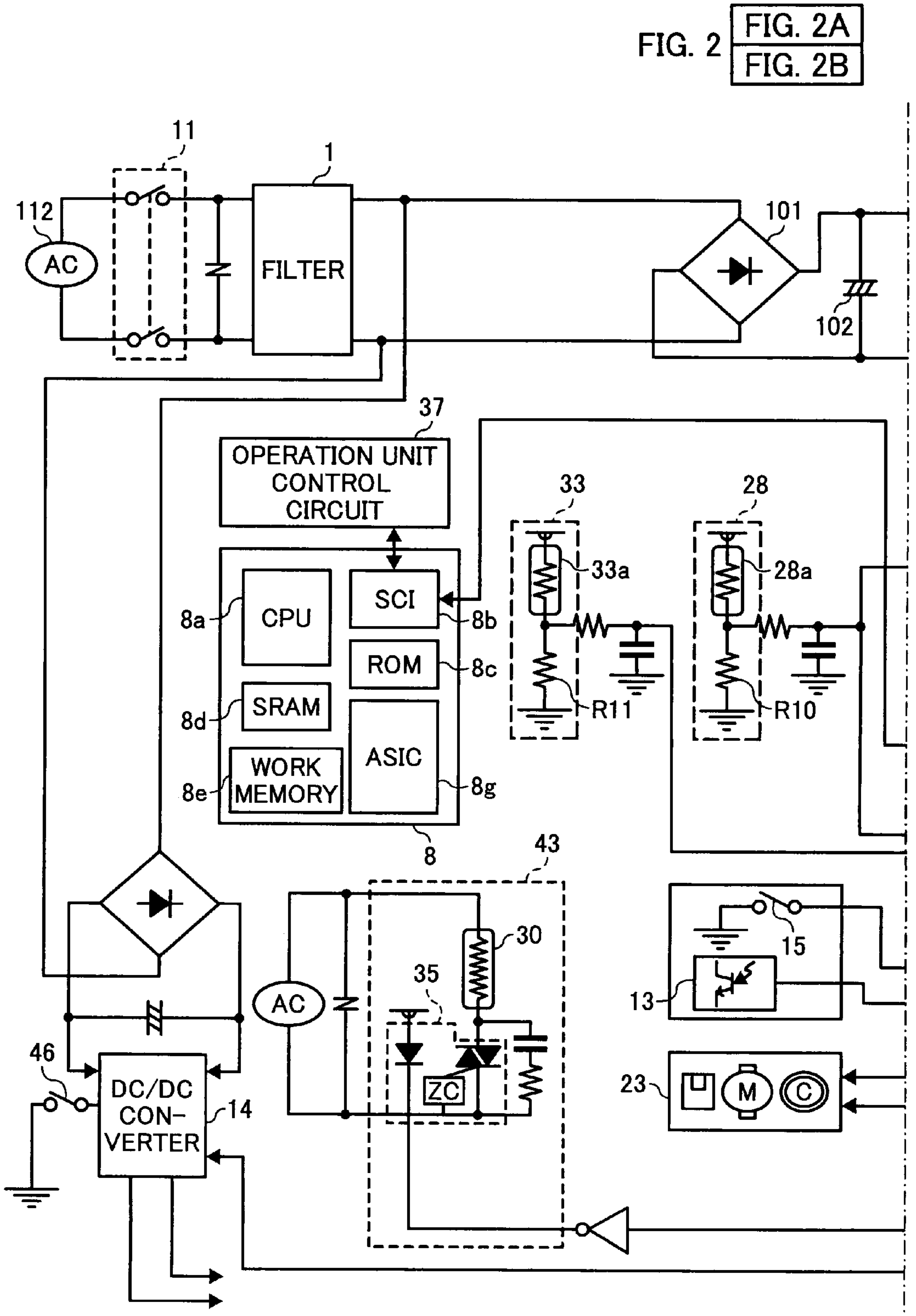
FIG. 2 is a circuit diagram of the image forming apparatus.
Figure 2B:
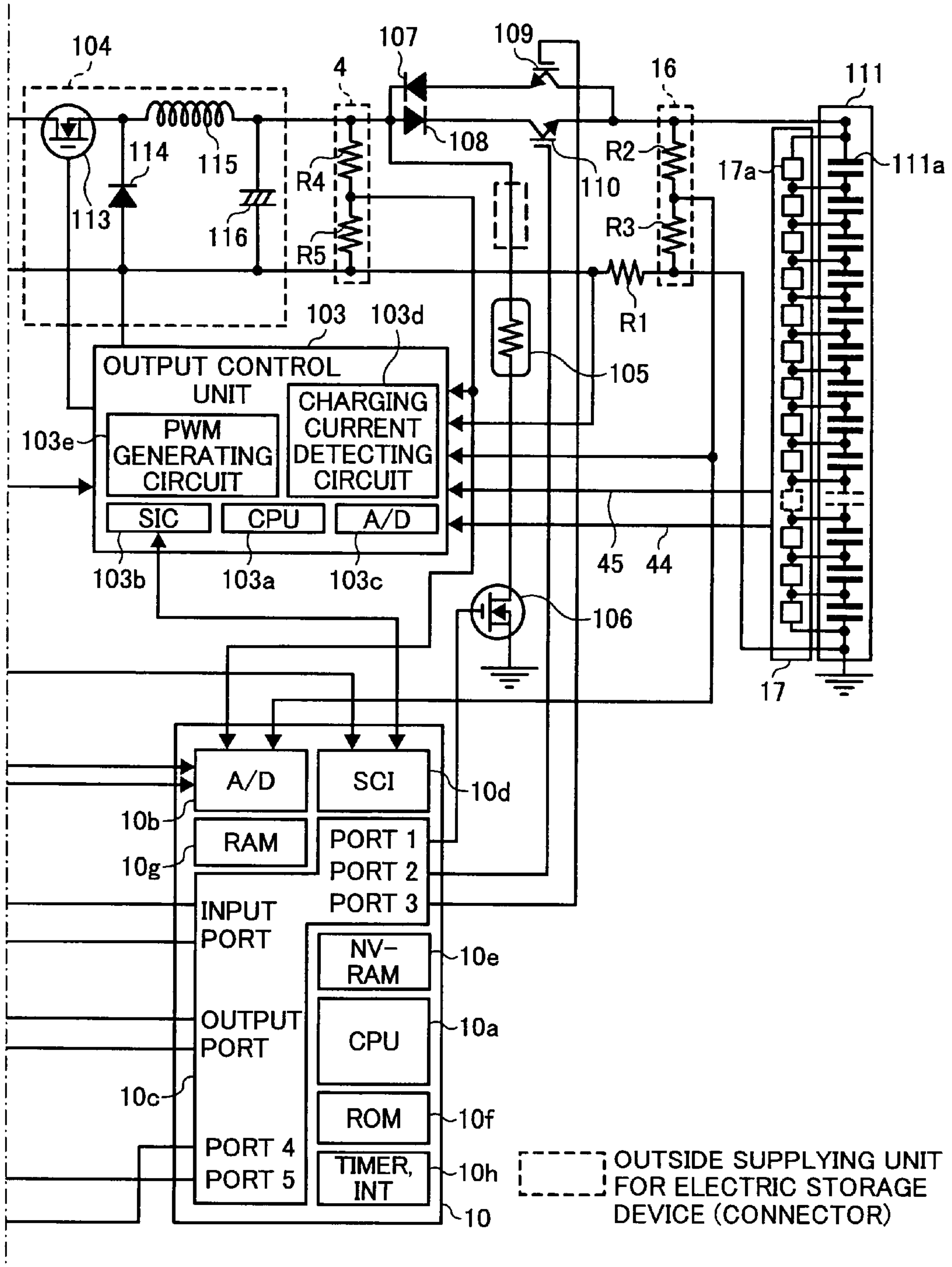

FIG. 2 is a circuit diagram of the image forming apparatus 100.

A main power source switch 11 is used to start the image forming apparatus 100. Alternating current (AC) input from the AC power source 112 through the main power source 11 when the main power source 11 is turned on is received through a filter 1 to the full-wave rectifying circuit 101. The full-wave rectifying circuit 101 performs full-wave rectification. Ripple components are removed from the full-wave rectified electric power by the smoothing condenser 102.

DC power in which ripple components are removed by the smoothing condenser 102 is received on a drain side of the FET 113 of the step-down chopper circuit 104.

The step-down chopper circuit 104 is connected in parallel to the capacitor bank 111 between terminals of the capacitor bank 111. An explanation about the configuration of the step-down chopper circuit 104 is above given and it is omitted. Then, a configuration of the output control unit 103 that controls the step-down chopper circuit 104 is explained.

The output control unit 103 includes a CPU 103*a*, a pulse width modulation (PWM) generating circuit 103*e* connected to the CPU 103*a* through an internal bus, an A/D converter 103*c*, a charging current detecting circuit 103*d*, and a serial controller (SIC) 103*b*. The output control unit 103 additionally includes a read only memory (ROM), a random access memory (RAM), a timer, an interrupt control circuit, and an input/output port (not shown).

The PWM generating circuit 103*e*, when charging the capacitor bank 111, generates PWM signals to perform constant-current charging and constant-power charging to the capacitor bank 111 in response to results that are caused by detecting charging voltage stored in the capacitor bank 111, charging current to the capacitor bank 111, and an operation of a balance circuit. When supplying power to the DC fixing heater 105, the PWM generating circuit 103*e* generates PWM signals to supply power based on voltage suitable for the DC fixing heater 105 or to perform constant-voltage output.

Thus, switching is performed between PWM signals for constant-voltage output to the DC fixing heater 105 and PWM signals for constant-current charging and constant-power charging to the capacitor bank 111 as needed, then enabling output to the FET 113.

That is, when the FET 113 is turned on based on PWM signals output from the PWM generating circuit 103*e*, current flows into the choke coil 115. Accordingly, part of input power is stored in the choke coil 115. Then, the FET 113 is turned off based on PWM signals output from the PWM generating circuit 103*e*. Power stored in the choke coil 115 at turn-on is discharged through the feedback diode 114.

Repetition of the above operations leads to drop in voltage of power in the step-down chopper circuit 104. The lowered voltage is smoothed by the smoothing condenser 116. Power whose voltage is smoothed is supplied to the DC fixing heater 105 or supplied through the diode 108 and the IGBT 110 to the capacitor bank 111.

Voltage lowered by the step-down chopper circuit 104 is controlled based on a ratio (a duty ratio D/T) between a turn-on period and a turn-off period of the FET 113 and voltage input to the step-down chopper circuit 104. The output control unit 103 controls the duty ratio of the FET 113 based on PWM signals. Thus, the output control unit 103 can control voltage output from the step-down chopper circuit 104.

Voltage after it is lowered is detected by a step-down voltage detecting circuit 4. Voltage of the step-down voltage detecting circuit 4 is divided into a resistance R4 and a resistance R5, which enables detection of voltage after it is lowered. The voltage detected by the step-down voltage detecting circuit 4 is returned to the PWM generating circuit 103*e*. That is, lowered and smoothed voltage is monitored by the PWM generating circuit 103*e*.

The voltage detected by the step-down voltage detecting circuit 4 is also received in an A/D converter 10*b* of a later-described engine control unit 10. The details are explained later.

When the PWM generating circuit 103*e* outputs PWM signals for constant-current charging and constant-power charging to the capacitor bank 111, the IGBT 110 is turned on based on control of the engine control unit 10. Therefore, power is charged to the capacitor bank 111 through the diode 108 and the IGBT 110.

The capacitor bank 111 according to the first embodiment includes 18 serially-connected capacitor cells (electric double layer capacitor), each of which is fully charged to 2.5 volts. That is, when the 18 capacitor cells are fully charged, a total of 45-volt voltage is stored therein.

The capacitor bank 111 of the image forming apparatus 100 includes the capacitor cells that enable temporarily supplying larger power than power supplied to the DC fixing heater 105. That is, power charged in the capacitor bank 111 is supplied to the DC fixing heater 105 so that it is possible to achieve a usable temperature for a later-described fixing roller 21 in a short time.

A charging voltage detecting circuit 16 detects voltage charged in the capacitor bank 111. More specifically, the charging voltage detecting circuit 16 has voltage dividing circuits of a resistance R2 and a resistance R3. Therefore, the charging voltage detecting circuit 16 can detect voltage between terminals of the capacitor bank 111. The detected voltage between terminals is transmitted to the A/D converter 103*c* and the A/D converter 10*b* of the engine control unit 10.

The PWM generating circuit 103*e* determines a duty ratio based on voltage between terminals transmitted to the A/D converter 103*c* and outputs PWM signals for constant-current charging and constant-power charging. The details are explained later.

Charging current in the capacitor bank 111 is detected as follows. Current that passes through a resistance R1 serially connected to the capacitor bank 111 is detected and voltage between terminals is detected. The detected voltage between terminals is input to the charging current detecting circuit 103*d* of the output control unit 103. Thus, the charging current detecting circuit 103*d* can detect charging current, and the voltage of the charging current in the capacitor bank 111.

An equalization circuit 17 detects full charge in each of the capacitor cells, operates the balance circuit (see FIG. 3), and equalizes charging voltage of each of the capacitor cells.

More specifically, when a capacitor cell 111*a* is fully charged to 2.5 volts through the step-down chopper circuit 104, a balance circuit 17*a* bypasses charging current. The other balance circuits connected in parallel to the other capacitor cells operate in the same manner. Thus, charging voltage in each of the capacitor cells is equalized.

When the equalization circuit 17 senses full charge in any one of the capacitor cells and operates a corresponding balance circuit, the equalization circuit 17 outputs a single-cell full-charge signal 44 to the PWM generating circuit 103*e*.

When the equalization circuit 17 senses full charge in all the capacitor cells and operates all the balance circuits, the equalization circuit 17 outputs full-charge signals 45 of all the capacitor cells to the PWM generating circuit 103*e*.

Figure 3:
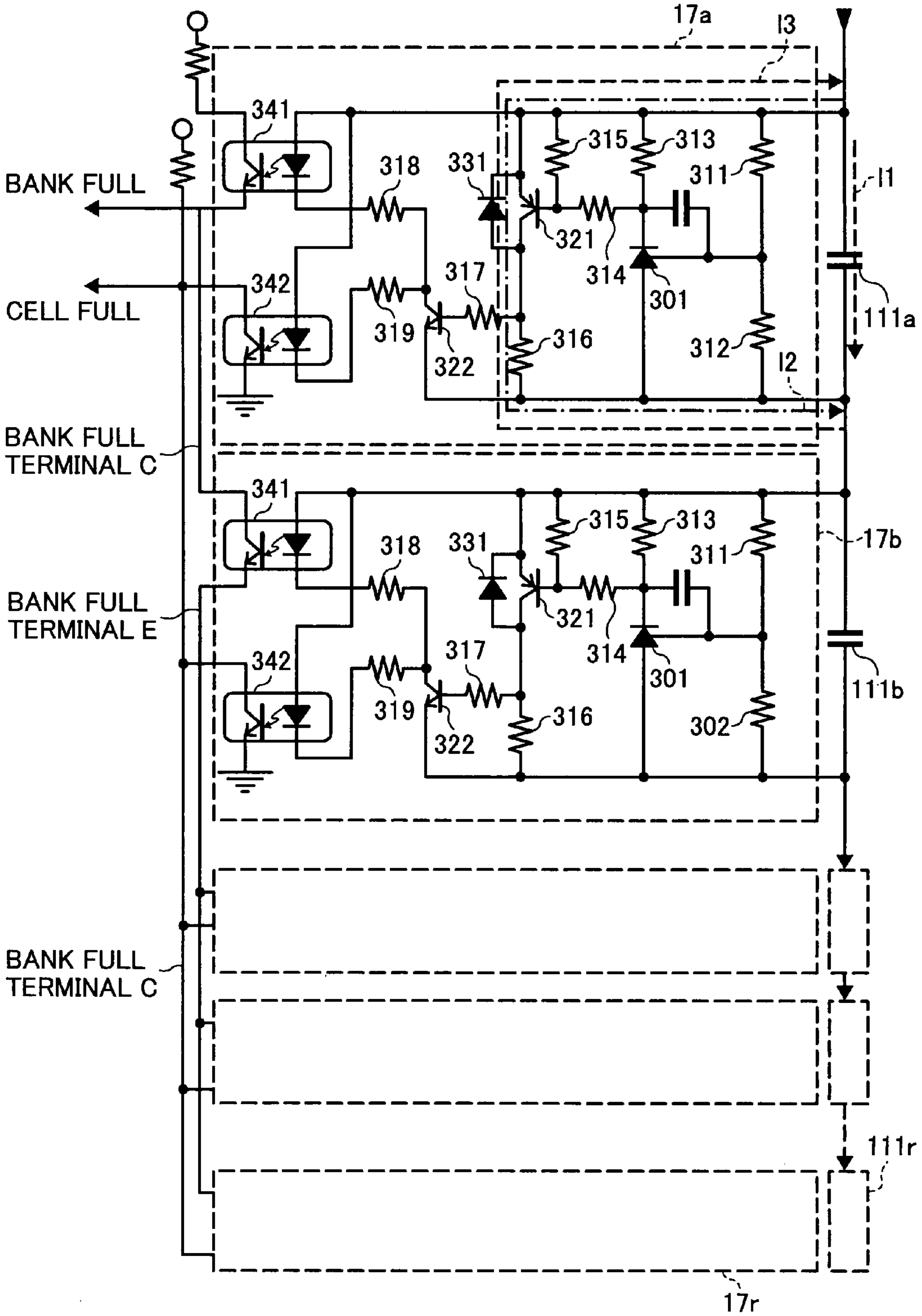
FIG. 3 is a schematic diagram of balance circuits connected in parallel to capacitor cells shown in FIG. 2.

An explanation is given of the equalization circuit 17. FIG. 3 is a schematic diagram of the balance circuit 17*a* that is connected in parallel to the capacitor cell 111*a*. As shown in FIG. 3, a balance circuit is connected to each of the capacitor cells. In the first embodiment, there are 18 capacitor cells, and accordingly, 18 balance circuits are serially connected.

A current path I1 indicates a current path when charging the capacitor cell 111*a*, as shown in FIG. 3. A current path I2 indicates a bypass path of charging current when the balance circuit 17*a* operates. A current path I3 indicates a reverse current bypass path when applying reverse voltage.

Capacitor cells 111*b* to 111*r* are, as well as the capacitor cell 111*a*, an electric double layer capacitor in which they are serially connected to store power. The balance circuit 17*a* is connected in parallel to the capacitor cell 111*a* between terminals of the capacitor cell 111*a*.

The balance circuit 17*a* includes a shunt regulator 301, resistances 311 to 315, a transistor 321, and a diode 331. Terminal voltage in the capacitor cell 111*a* is detected based on a voltage dividing circuit that includes the resistances 311 and 312, and the shunt regulator 301.

More specifically, divided voltage of the voltage dividing circuit that includes the resistances 311 and 312 is sent to a control terminal of the shunt regulator 301. When terminal voltage of the capacitor cell 111*a* is charged to a predetermined voltage level, the shunt regulator is turned on. When the shunt regulator 301 is turned on, base current passes through the resistance 313 to the transistor 321 and the transistor 321 is turned on. When the transistor 321 is turned on, charging current in the capacitor cell 111*a* is bypassed through the resistance 315 as I2 shows.

When the transistor 321 is turned on, a transistor 322 is also turned on. Accordingly, current passes through resistances 317 and 318 to light-emitting diodes of photocouplers 341 and 342. The balance circuits 17*b* to 17*r* have the same configuration as that of the balance circuit 17*a*, and their explanation is omitted.

Bank Full terminals are serially connected to balance circuits 17*a* to 17*r*. In other words, when all the capacitor cells are charged to a predetermined voltage level and all the balance circuits operate, a whole-cell full-charge signal is output from a Bank Full terminal.

Upon receiving the whole-cell full-charge signal, the PWM generating circuit 103*e* stops charging and sends the full-charge signal to a CPU 10*a* of the engine control unit 10. In response to the full-charge signal, the CPU 10*a* outputs a signal to turn off the IGBT 110 from a port 2.

A Cell Full terminal of the balance circuit 17*a* is connected in parallel to Cell Full terminals of the other balance circuits. In other words, when any one of capacitor cells is charged to a predetermined voltage level and the balance circuit connected to the capacitor cell concerned operates, a cell full-charge signal is output from the Cell Full terminal.

The output cell full-charge signal is input to the PWM generating circuit 103*e*. When the cell full-charge signal is input to the PWM generating circuit 103*e*, the PWM generating circuit 103*e* performs a predetermined constant-current charging operation that is described later.

Returning to FIG. 2, an explanation is given about operations performed when the PWM generating circuit 103*e* charges the capacitor bank 111. In the first embodiment, the A/D converter 103*c* monitors charging voltage of the capacitor bank 111, the charging current detecting circuit 103*d* monitors charging current, and the PWM generating circuit 103*e* detects operations of the balance circuit (based on an input single-cell full-charge signal and a full-charge signal of a capacitor cell). The PWM generating circuit 103*e* outputs PWM signals based on the monitored results and the resulting detection. Thus, constant-current charging and constant-power charging are performed in the capacitor bank 111. The detailed processing procedure is explained later.

The PWM generating circuit can transmit a signal of a predetermined duty ratio to perform constant-current charging as a PWM signal. The predetermined duty ratio can be, for example, a relation between voltage between terminals of the resistance R1 and an ON duty of a PWM signal that is previously stored in a table or can be obtained from calculation of previously prepared Equation.

A procedure of controlling PWM signals in the PWM generating circuit 103*e* is not limited to the above description. For example, in consideration of only charging current, it is possible to control PWM signals to obtain previously set charging current.

When charging is not performed in the capacitor bank 111, the PWM generating circuit 103*e* can output PWM signals to first keep voltage low after it is lowered and gradually raise voltage. This makes it possible to prevent large rush current from flowing into the capacitor bank 111.

When voltage between terminals in the capacitor bank 111 is equal to or larger than a first predetermined voltage (hereinafter, "first reference charging voltage"), the PWM generating circuit 103*e* performs constant-power charging. Then, the PWM generating circuit 103*e* outputs PWM signals to perform constant-power charging to a gate of the FET 113.

The PWM signals are obtained from previously set calculation processing based on charging current to the capacitor bank 111 and voltage between terminals in the capacitor bank 111. A specific processing method is later explained.

Figure 9:
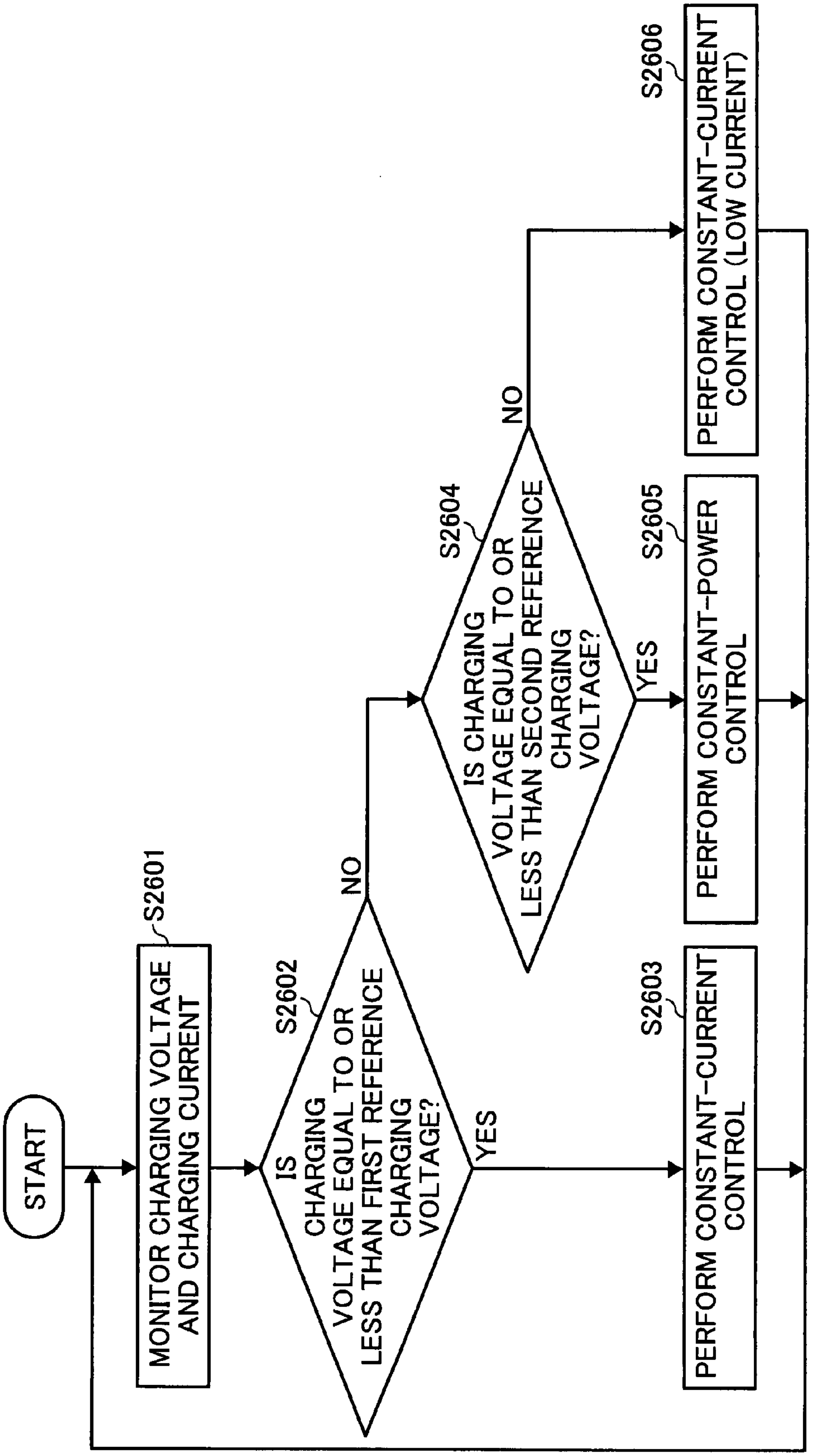
FIG. 9 is a flowchart of a processing procedure of charging the capacitor bank through an output control unit shown in FIG. 1.

When voltage between terminals in the capacitor bank 111 is equal to or larger than a second predetermined voltage (hereinafter, "second reference charging voltage"), the PWM generating circuit 103*e* outputs previously set PWM signals to perform low current and constant-current charging to the gate of the FET 113 again. Apart from the first embodiment, the PWM generating circuit 103*e* can output the PWM signals not when voltage between terminals is equal to or larger than the second reference charging voltage but when a single-cell full-charge signal 44 of any one of capacitor cells is detected. A specific processing is depicted in FIG. 9.

When full-charge signals 45 that represent full charge in all the capacitor cells are detected, the PWM generating circuit 103*e* outputs a signal to stop charging to the gate of the FET 113.

Thus, the image forming apparatus 100 can charge the capacitor bank 111. The stored power in the capacitor bank 111 that is charged is supplied through the IGBT 109 and the diode 107 to the DC fixing heater 105.

The image forming apparatus 100 includes an AC fixing heater 30 and the DC fixing heater 105 as a heating unit of a fixing device.

Figure 4:
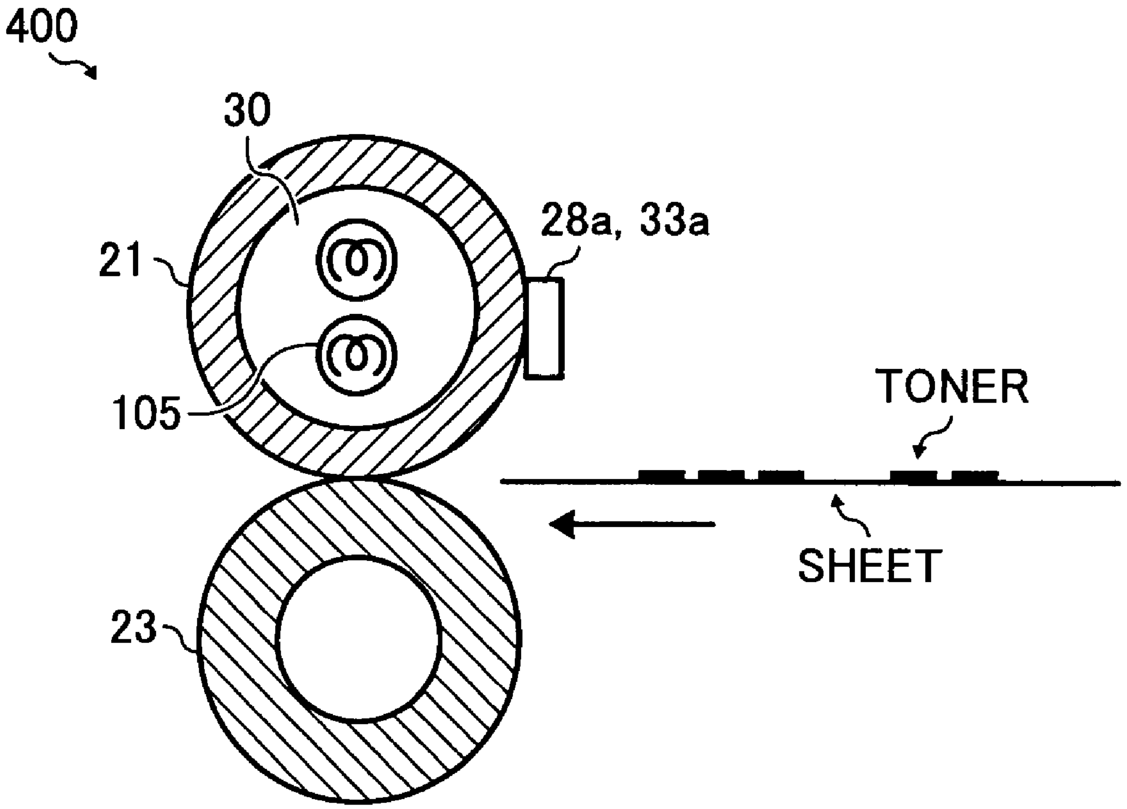
FIG. 4 is a longitudinal section for schematically explaining a fixing device in the image forming apparatus.

FIG. 4 is a longitudinal section for schematically explaining a fixing device 400. The fixing device 400 includes the fixing roller 21 as a fixing member, a pressure roller 23 as a pressure member, and pressure means (not shown) that presses the pressure roller 23 against the fixing roller 21 with a predetermined pressing force. The fixing roller 21 and the pressure roller 23 in the fixing device 400 are rotated and driven by a driving mechanism (not shown).

The fixing device 400 includes the AC fixing heater 30, the DC fixing heater 105, a DC fixing heater thermistor 28*a* that detects a surface temperature of the fixing roller 21, and an AC fixing heater thermistor 33*a*.

The AC fixing heater 30 and the DC fixing heater 105 are arranged inside the fixing roller 21 and heat the fixing roller 21 from the inside. The DC fixing heater thermistor 28*a* and the AC fixing heater thermistor 33*a* are in close contact with a surface of the fixing roller 21 and detects the surface temperature (fixing temperature) of the fixing roller 21. The AC fixing heater thermistor 33*a* is arranged on a measured region that corresponds to the AC fixing heater 30. The DC fixing heater thermistor 28*a* is arranged on a measured region that corresponds to the DC fixing heater 105.

When temperature of the fixing roller 21 does not reach a target temperature, the AC fixing heater 30 and the DC fixing heater 105 are turned on and heat the fixing roller 21.

The DC fixing heater 105 is used when the main power source of the image forming apparatus is turned on or while starting from an off mode for energy saving until a copy-possible condition. That is, power is supplied from the capacitor bank 111 to the DC fixing heater 105 in a warm-up condition of the fixing device 400, and the DC fixing heater 105 assists starting the fixing device 400. That is, the DC fixing heater 105 functions as a secondary heater (a subsidiary heater).

Therefore, the DC fixing heater 105 uses less power in normal operations than rated power of the heater and uses the rest power that has not reached the rated power when starting the fixing device or when temperature falls in continuous copying.

When a sheet that carries a toner image passes through a nip portion between the fixing roller 21 and the pressure roller 23 in the fixing device 400, it is heated and pressed by the fixing roller 21 and the pressure roller 23. Thus, the toner image is fixed on the sheet.

As shown in FIG. 2, the engine control unit 10 includes the CPU 10*a*, a serial controller (SCI) 10*d* connected to the CPU 10*a* through an internal bus, input/output ports 10*c*, the A/D converter 10*b*, an NV-RAM 10*e*, a ROM 10*f*, a RAM 10*g*, a timer, and an interrupt control circuit (INT) 10*h*.

Temperature detecting circuits 28 and 33 that detect a surface temperature (fixing temperature) of the fixing roller 21 in the fixing device 400 are connected to the A/D converter 10*b* of the engine control unit 10.

The temperature detecting circuit 28 includes the DC fixing heater thermistor 28*a* and a resistance R10 serially connected thereto and detects temperature of a measured region that corresponds to the DC fixing heater 105.

The temperature detecting circuit 33 includes the AC fixing heater thermistor 33*a* and a resistance R11 serially connected thereto and detects temperature of a measured region that corresponds to the AC fixing heater 30.

The FET 106, an AC fixing heater control circuit 43, a load 23 such as a motor, solenoid, and clutch that is needed to perform image forming, a sensor 13, and a switching circuit 15 are connected to the input/output ports 10*c*. Power stored in the capacitor bank 111 is supplied to the DC fixing heater 105 by an FET based on the resulting detected temperature of the temperature detecting circuit 28. Power is supplied to the AC fixing heater 30 by the AC fixing heater control circuit 43 based on the resulting detected temperature of the temperature detecting circuit 33. The sensor 13 is used to perform image forming.

The CPU 10*a* transmits and receives signals through the output control unit 103 and the SCI 10*d*. A charging instruction signal, a charging permission signal, or a charging operation signal are transmitted to the output control unit 103 by the CPU 10*a* while not discharging, while in standby, or in energy-saving mode. When power is supplied to the DC fixing heater 105, the CPU 10*a* transmits a power supply mode signal to the output control unit 103.

When a charging instruction signal or a charging permission signal is input to the CPU 103*a* of the output control unit 103 under a condition in which power is not supplied to the DC fixing heater 105, the CPU 103*a* instructs the PWM generating circuit 103*e* to charge. This allows starting to charge.

Power is supplied to the AC fixing heater 30 by the AC fixing heater control circuit 43 at turn-on of the main power source and in normal copying operation. This makes it possible to copy in the image forming apparatus 100.

When it is input that a predetermined temperature or less is detected from the temperature detecting circuit 33, a signal to turn on a phototriac is output from a port 5 to a phototriac drive circuit 35 by the CPU 10*a*. This causes starting to supply power to the AC fixing heater 30.

When it is input that a predetermined temperature or more is detected from the temperature detecting circuit 33, a signal to turn off the phototriac is output from the port 5 to the phototriac drive circuit 35 by the CPU 10*a*. This causes power supply to the AC fixing heater 30 to be stopped.

An explanation is next given about an operation of supplying power to the DC fixing heater 105. When the main power source is turned on, the CPU 10*a* checks charging voltage of the charging voltage detecting circuit 16 and a signal of turning on the IGBT 109 is output from a port 3 of the input/output ports 10*c* by the CPU 10*a*. A signal of turning on the FET 106 is output from a port 1 of the input/output ports 10*c* by the CPU 10*a*. When the FET 106 is turned on, stored power in the capacitor bank 111 is supplied to the DC fixing heater 105.

When temperature of the fixing roller 21 decreases during a series of copying operations and it becomes low enough to generate an image to which toners are not fixed, the CPU 10*a* recognizes a whole-cell full-charge signal from the output control unit 103 or charging voltage from the charging voltage detecting circuit 16 and then outputs a signal of turning on the IGBT 109 from the port 3 in the input/output ports 10*c*.

This causes stored power in the capacitor bank 111 to be supplied to the DC fixing heater 105.

When the CPU 10*a* detects that temperature of the fixing roller 21 is a predetermined temperature or more, the CPU 10*a* outputs a signal of turning off the IGBT 109 from the port 3 in the input/output ports 10*c*. This causes power discharge from the capacitor bank 111 to be stopped.

Then, the PWM generating circuit 103*e* outputs PWM signals to supply power to the DC fixing heater 105 to the gate of the FET 113.

After image forming operations end, the CPU 10*a* enters energy-saving mode after the elapse of a predetermined time. In this event, a signal to stop part of power source output is output to a DC/DC converter 14 from a port 4 by the CPU 10*a*. When energy-saving mode is released, an energy-saving release switch 46 (switching by sensing open/close position of automatic document feeder (ADF), or a document on ADF) causes the DC/DC converter 14 to return to a normal operation.

A control circuit 8 that controls the image forming apparatus 100 includes a CPU 8*a* that controls the whole image forming apparatus, an SCI 8*b* connected to the CPU 8*a* through an internal bus, a ROM 8*c*, a static random access memory (SRAM) 8*d*, a work memory 8*e* for image developing that is used in the image forming apparatus, a flame memory that temporarily stores image data of a writing image, and an ASIC 8*g* that includes a function of controlling periphery of a CPU, and an interface circuit thereof.

The control circuit 8 is connected to an operation unit control circuit 37 and the engine control unit 10 through the SCI 8*b*. The operation unit control circuit 37 controls input of setting in response to user's operation through a panel and display of set contents on the panel.

Figure 5:
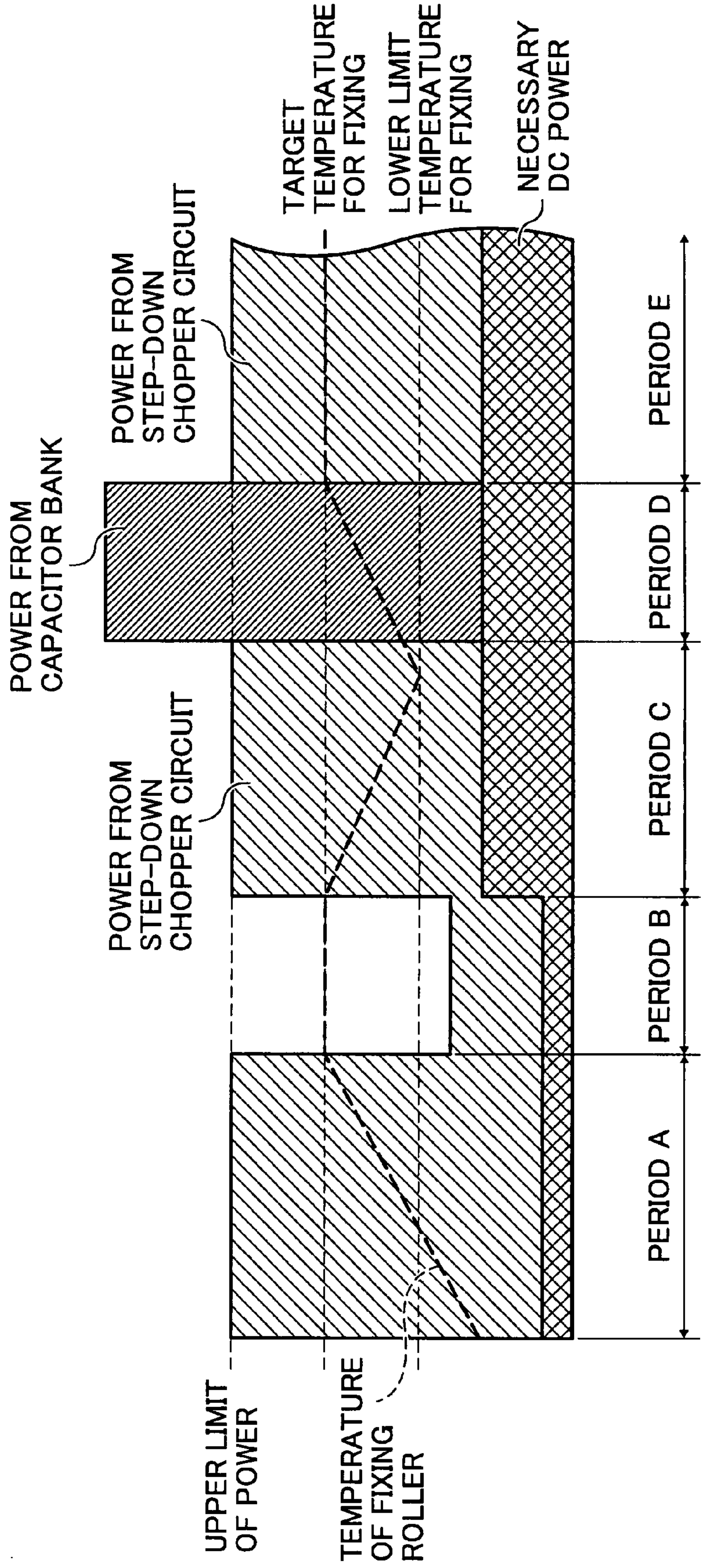
FIG. 5 is a chart of a relation among temperature of a fixing roller, electric power supplied from a step-down chopper circuit, and electric power supplied from a capacitor bank in the image forming apparatus.

FIG. 5 is a chart of a relation among temperature of the fixing roller 21, electric power supplied from the step-down chopper circuit 104, and electric power supplied from the capacitor bank 111 in the image forming apparatus 100. In FIG. 5, a period A represents a fixing reload period, a period B standby period, and periods C to E printing periods. When a fixing temperature falls due to copying operation in the period C, power supplied from the step-down chopper circuit 104 stops in the period D and power is supplied from the capacitor bank 111 to the DC fixing heater 105. This makes it possible to supply power more than upper limit of power in the image forming apparatus 100 and, therefore, to rapidly return temperature of the fixing roller 21 to a target fixing temperature. Specific processing that is actually performed is explained later.

As shown in FIG. 5, when temperature of the fixing roller reaches the target fixing temperature, power supplied from the capacitor bank 111 stops and power only from the step-down chopper circuit 104 is supplied.

Figure 6:
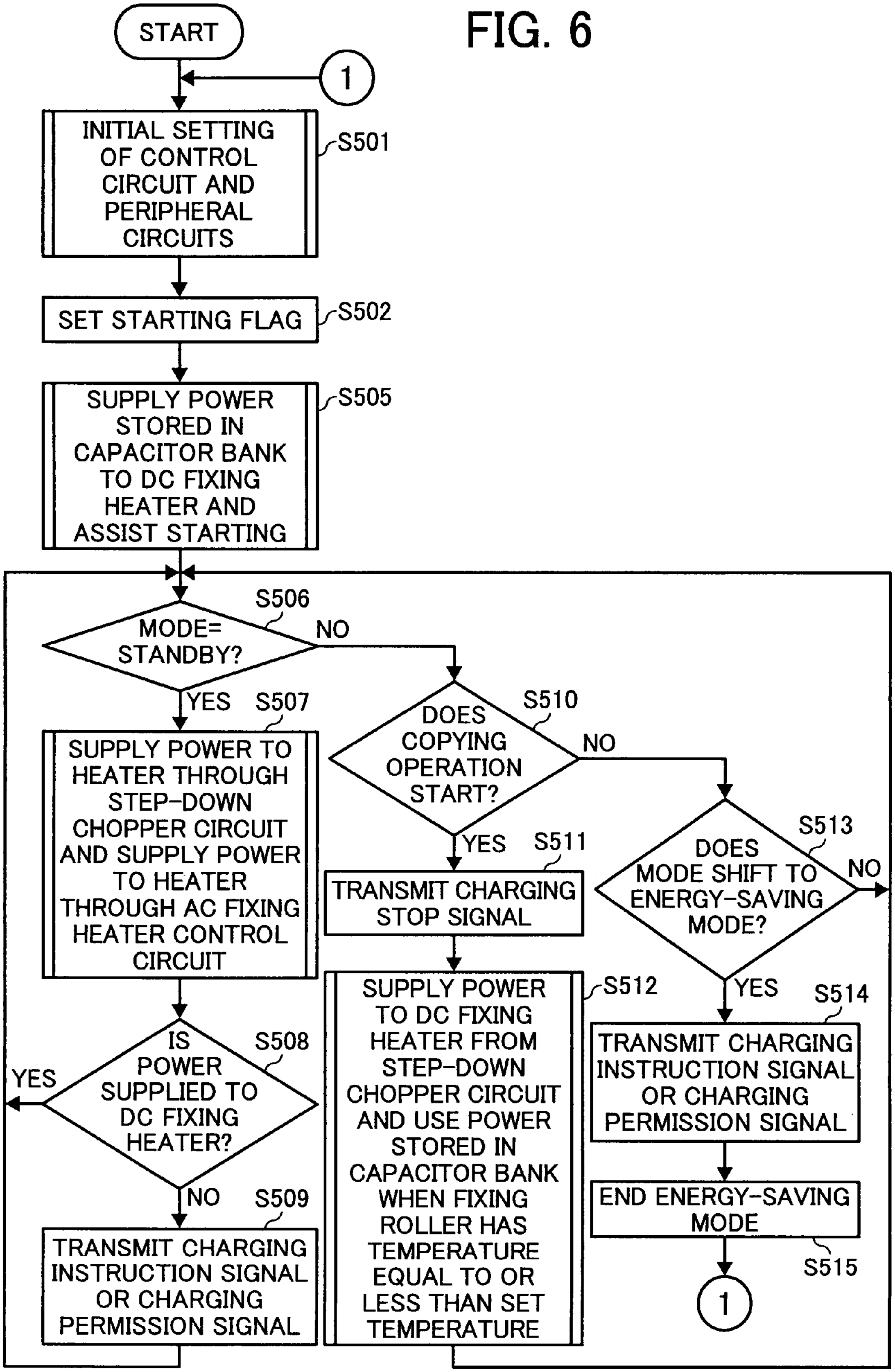
FIG. 6 is a flowchart of a processing procedure of copying operation under control of a central processing unit (CPU) of an engine control unit shown in FIG. 2.

FIG. 6 is a flowchart of a series of copying operations under control of the CPU 10*a* of the engine control unit 10.

When power is first supplied at turn-on of the main power source or at the time of releasing energy-saving mode, initial setting is performed with regard to the CPU 10*a* of the engine control unit 10, peripheral circuits thereof, and a memory (step S501).

The CPU 10*a* sets a starting flag to '1' that is set at turn-on of the main power source or at the time of releasing energy-saving mode (step S502).

The CPU 10*a* assists starting to supply power stored in the capacitor bank 111 to the DC fixing heater 105 (step S505). After starting, the image forming apparatus 100 is in standby mode. In this event, the starting flag is set back to '0', and a detailed procedure so far is explained later.

The CPU 10*a* determines whether to maintain the standby mode (step S506) based on the presence or absence of input of a copy instruction signal or whether a predetermined time has elapsed from the start of the standby mode.

When it is determined that standby mode is to be maintained (Yes at step S506), the CPU 10*a* supplies power to the DC fixing heater 105 through the step-down chopper circuit 104 to maintain standby mode, and supplies power to the AC fixing heater 30 through the AC fixing heater control circuit 43 (step S507).

The CPU 10*a* determines whether power is supplied to the DC fixing heater 105 from the step-down chopper circuit 104 (step S508). When power is supplied to the DC fixing heater 105 from the step-down chopper circuit 104 (Yes at step S508), the process control returns to step S506.

When power is not supplied to the DC fixing heater 105 from the step-down chopper circuit 104 (No at step S508), the CPU 10*a* transmits a charging instruction signal or a charging permission signal to charge the capacitor bank 111 (step S509).

Upon determining to interrupt the standby mode (No at step S506), the CPU 10*a* determines whether processing moves to copying operation based on a copy instruction signal (step S510).

When processing moves to copying operation (Yes at step S510), the CPU 10*a* starts copying and transmits a charging stop signal (step S511).

The CPU 10*a* supplies power from the step-down chopper circuit 104 to the DC fixing heater 105 and supplies power from the AC fixing heater control circuit 43 to the AC fixing heater 30. When the fixing roller 21 has a temperature equal to or less than a set temperature, power stored in the capacitor bank 111 is used (step S512). Such operations are repeated in a series of copying operations, and temperature of the fixing roller 21 is controlled to be within a predetermined range. A procedure of controlling the fixing roller is described later.

When processing does not move to copying operation (No at step S510), the CPU 10*a* determines whether a predetermined time has elapsed after the end of copying or the start of standby mode (step S513).

When the predetermined time has elapsed (Yes at step S513), the CPU 10*a* controls the image forming apparatus 100 to enter energy-saving mode. Because it is possible to charge in energy-saving mode, the CPU 10*a* transmits a charging instruction signal or a charging permission signal (step S514).

A user depresses an energy-saving release key and a period of energy-saving mode ends (step S515). After energy-saving mode is released, the processing starts from initial setting again (step S501).

When the predetermined time has not elapsed (No at step S513), the process control returns to step S506.

The CPU 10*a* detects voltage between terminals of the capacitor bank 111 through the charging voltage detecting circuit 16 and determines whether it is possible to discharge power in the capacitor bank 111. The CPU 10*a* outputs a value of voltage that is supplied to the DC fixing heater 105 or a pattern for starting the fixing device to the CPU 103*a* of the output control unit 103.

Figures 7, 7A:
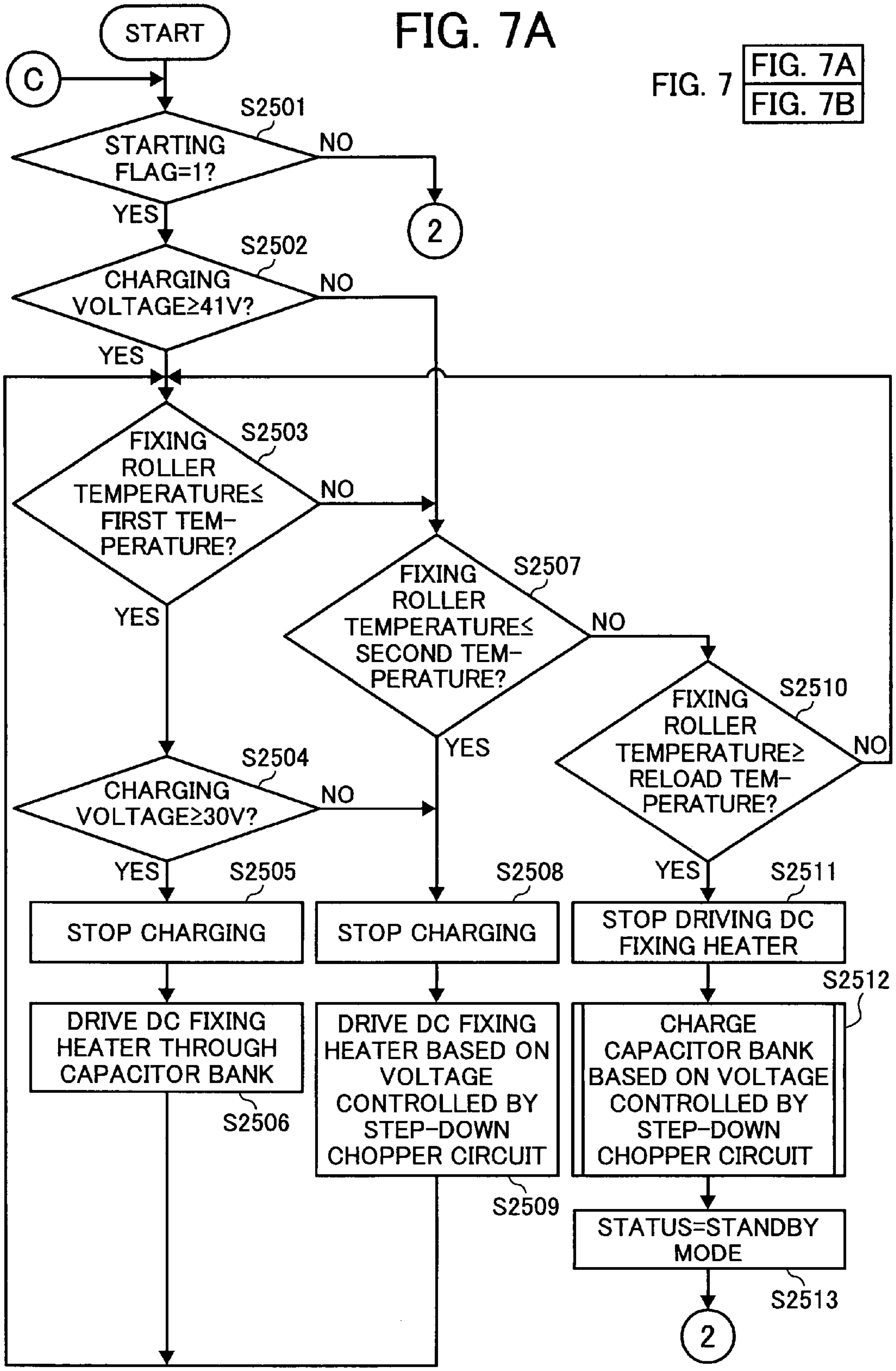
FIGS. 7 and 8 are flowcharts of a processing procedure of switching between supplying electric power to a DC fixing heater and charging a capacitor bank in response to operation conditions of the image forming apparatus.
Figure 7B:
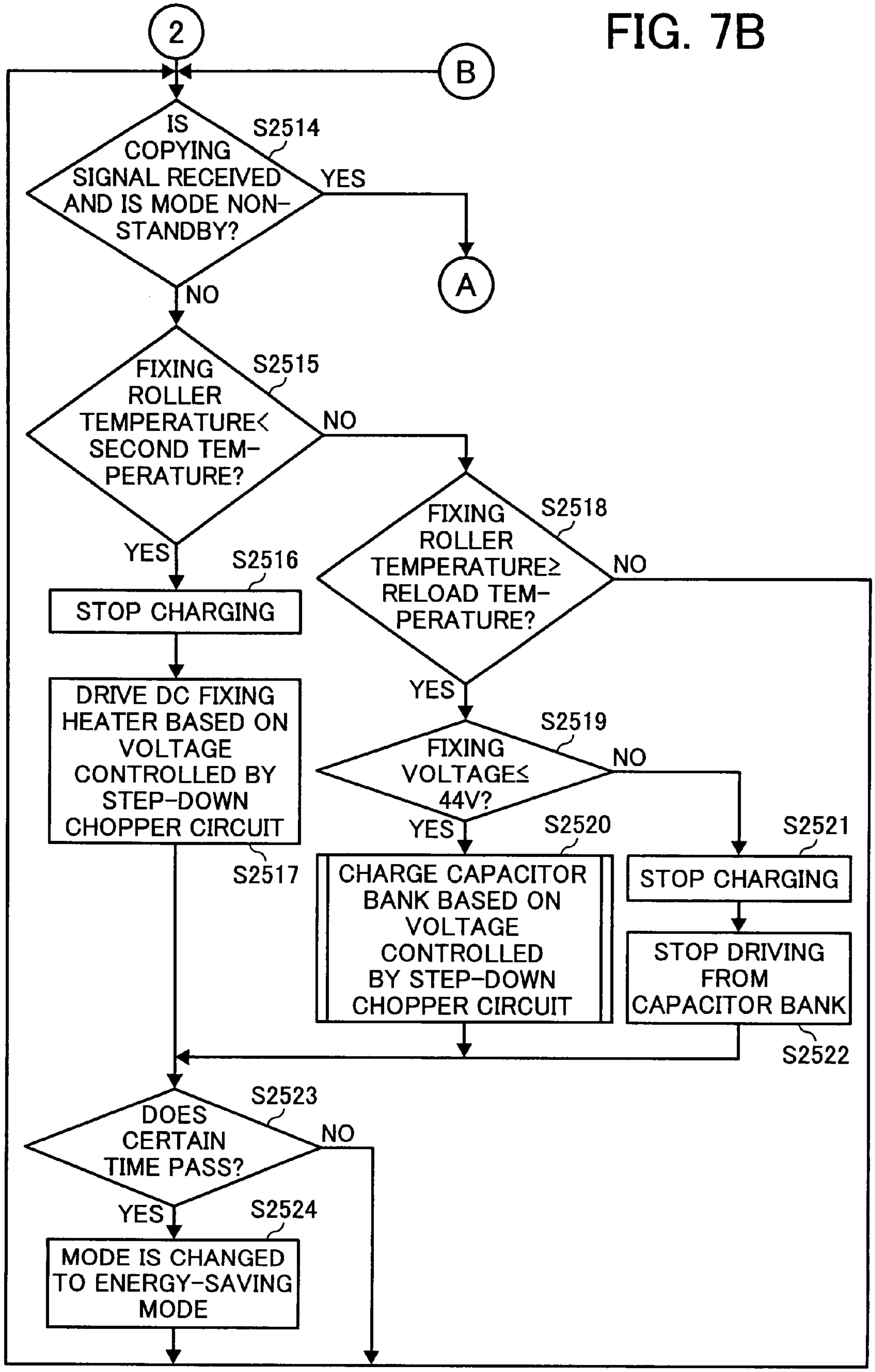
Figure 8:
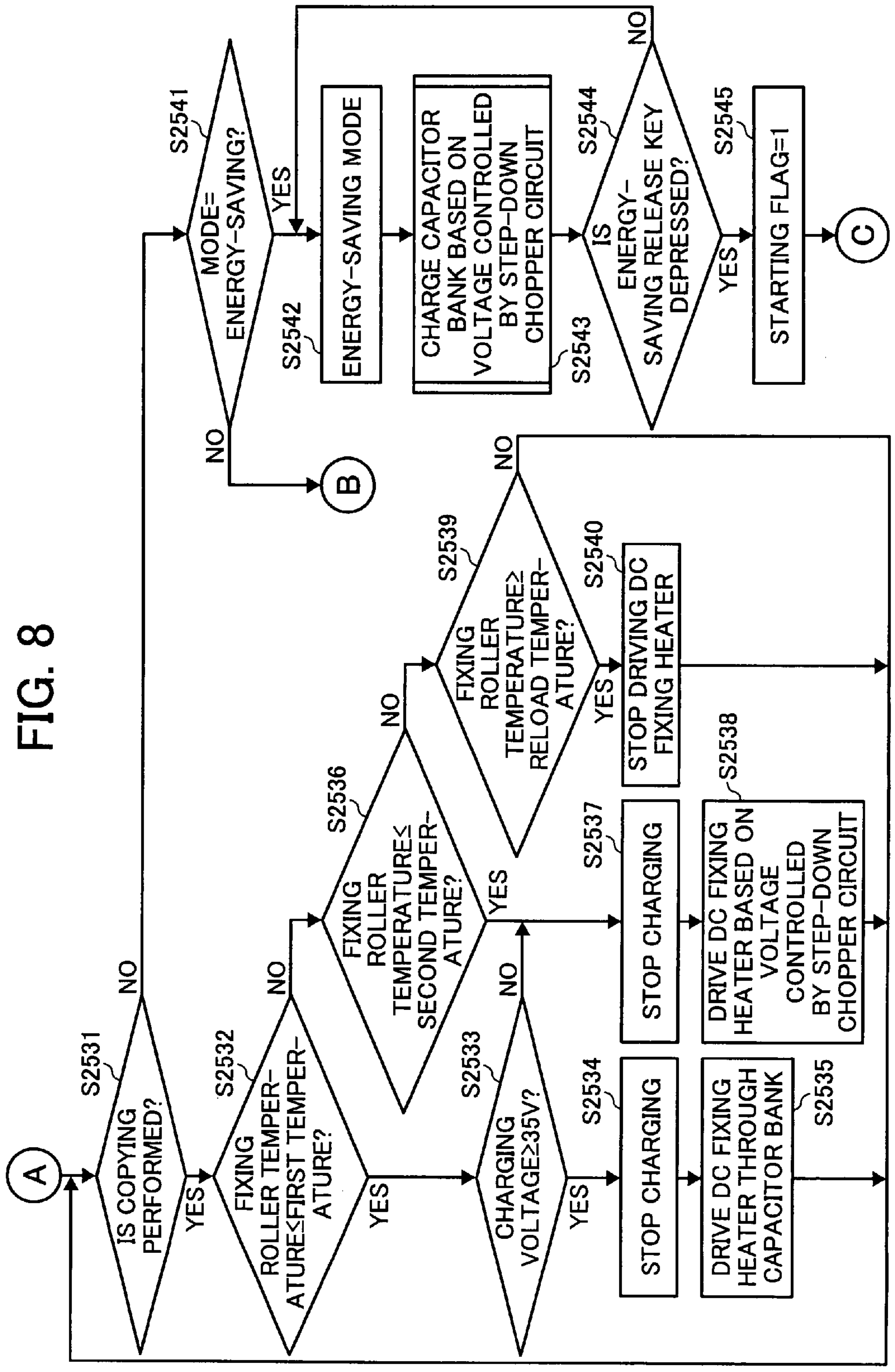

FIGS. 7 and 8 are flowcharts of a processing procedure of switching between supplying power to the DC fixing heater 105 and charging the capacitor bank 111 based on operation conditions of the image forming apparatus 100.

The CPU 10*a* of the engine control unit 10 determines how the image forming apparatus 100 operates. The CPU 10*a* first determines whether a starting flag is set (step S2501). The starting flag is that shown in FIG. 6 and is set to '1' at turn-on of the main power source or when energy-saving mode is released.

When the starting flag is set to '1' (Yes at step S2501), the CPU 10*a* determines through the A/D converter 10*b* whether a full-charge signal is received from the output control unit 103 or charging voltage in the capacitor bank 111 is equal to or larger than 41 volts (step S2502). As such, in the first embodiment, a value of charging voltage as a reference to start using power charged in the capacitor bank 111 is set to 41 volts.

When charging voltage is equal to or larger than 41 volts (Yes at step S2502), the CPU 10*a* determines through the A/D converter 10*b* whether temperature of the fixing roller 21 is equal to or less than a first temperature (step S2503). The first temperature is a low temperature such that the fixing roller 21 needs to be further heated. The first temperature is set to 170 degrees centigrade as an example.

When temperature of the fixing roller 21 is equal to or less than the first temperature (Yes at step S2503), the CPU 10*a* determines whether charging voltage is equal to or larger than 30 volts (step S2504).

When the CPU 10*a* determines that charging voltage is equal to or larger than 30 volts (Yes at step S2504), the CPU 10*a* controls to stop charging to the capacitor bank 111 (step S2505). Control to stop charging is described later.

The CPU 10*a* supplies power stored in the capacitor bank 111 to the DC fixing heater 105 and drives the DC fixing heater 105 (step S2506). Then, the CPU 10*a* determines again whether temperature of the fixing roller 21 is equal to or less than the first temperature (step S2503).

When temperature of the fixing roller 21 exceeds the first temperature (Yes at step S2503) or determines that charging voltage of the capacitor bank 111 is less than 41 volts (No at step S2502), the CPU 10*a* determines whether temperature of the fixing roller 21 is equal to or less than a second temperature (step S2507). The second temperature is higher than the first temperature, but the one such that the fixing roller 21 needs to be further heated. In the first embodiment, the second temperature is set to 178 degrees centigrade.

When temperature of the fixing roller 21 is equal to or less than the second temperature (Yes at step S2507), the CPU 10*a* stops charging the capacitor bank 111 (step S2508). Subsequently, the CPU 10*a* supplies power to the DC fixing heater 105 based on voltage controlled by the step-down chopper circuit 104 and drives the DC fixing heater 105 (step S2509). Then, the CPU 10*a* determines again whether temperature of the fixing roller 21 is equal to or less than the first temperature (step S2503).

When temperature of the fixing roller 21 exceeds the second temperature (No at step S2507), the CPU 10*a* checks whether temperature of the fixing roller 21 reaches a reload temperature (180 degrees centigrade) (step S2510).

When temperature of the fixing roller 21 does not reach the reload temperature (No at step S2510), the CPU 10*a* determines again whether temperature of the fixing roller 21 exceeds the first temperature (step S2503). If the DC fixing heater 105 is being driven during the processing, the DC fixing heater 105 is continued to be driven.

When temperature of the fixing roller 21 reaches the reload temperature (Yes at step S2510), the CPU 10*a* stops driving the DC fixing heater 105 (step S2511).

Then, the CPU 10*a* charges the capacitor bank 111 based on voltage controlled by the step-down chopper circuit 104 (step S2512). A detailed charging procedure is described later.

In this case, the starting flag is reset. The CPU 10*a* sets a status of the image forming apparatus 100 to standby mode (step S2513).

When the CPU 10*a* determines that the starting flag is not set to '1' (No at step S2501) or after the processing at S2513, the CPU 10*a* determines whether the image forming apparatus 100 is in standby mode without receiving a copying signal (step S2514).

When a copying signal is not received and the image forming apparatus 100 is in standby mode (Yes at step S2514), the CPU 10*a* determines whether temperature of the fixing roller 21 is lower than the second temperature (step S2515).

When temperature of the fixing roller 21 is lower than the second temperature (Yes at step S2515), the CPU 10*a* stops charging the capacitor bank 111 (step S2516). Then, the CPU 10*a* supplies power to the DC fixing heater 105 based on voltage controlled by the step-down chopper circuit 104 and drives the DC fixing heater 105 (step S2517).

When temperature of the fixing roller 21 is equal to or higher than the second temperature (No at step S2515), the CPU 10*a* determines whether temperature of the fixing roller 21 is equal to or higher than the reload temperature (step S2518).

When temperature of the fixing roller 21 is less than the reload temperature (No at step S2518), the CPU 10*a* determines again whether the image forming apparatus 100 is in standby mode without receiving a copying signal (step S2514).

When temperature of the fixing roller 21 is equal to or higher than the reload temperature (Yes at step S2518), the CPU 10*a* checks whether charging voltage in the capacitor bank 111 is equal to or less than 44 volts based on a signal input from the A/D converter 10*b* (step S2519).

When charging voltage in the capacitor bank 111 is equal to or less than 44 volts (Yes at step S2519), the CPU charges the capacitor bank 111 based on voltage controlled by the step-down chopper circuit 104 (step S2520).

When charging voltage in the capacitor bank 111 is larger than 44 volts (No at step S2519), the CPU stops charging the capacitor bank 111 (step S2521).

In addition, the CPU 10*a* stops driving the DC fixing heater 105 through the capacitor bank 111 (step S2522).

After processing at steps S2517, S2520, and S2522, the CPU 10*a* determines whether a predetermined time has elapsed from the start of standby mode (step S2523). When the predetermined time has elapsed (Yes at step S2523), the mode is changed to energy-saving mode (step S2524). Then, the CPU 10*a* determines again whether the image forming apparatus 100 is in standby mode without receiving a copying signal (step S2514).

When the image forming apparatus 100 receives a copying signal or is not in standby mode (No at step S2514), process control moves to "A" in FIG. 8, and the CPU 10*a* determines whether the image forming apparatus 100 is in a copying operation (step S2531).

When the image forming apparatus 100 is in a copying operation (Yes at step S2531), the CPU 10*a* determines whether temperature of the fixing roller 21 is equal to or less than the first temperature (step S2532).

When temperature of the fixing roller 21 is equal to or less than the first temperature (Yes at step S2532), the CPU 10*a* determines whether charging voltage in the capacitor bank 111 is equal to or larger than 35 volts (step S2533).

When charging voltage in the capacitor bank 111 is equal to or larger than 35 volts (Yes at step S2533), the CPU 10*a* stops charging the capacitor bank 111 (step S2534).

The CPU 10*a* supplies power stored in the capacitor bank 111 to the DC fixing heater 105 and drives the DC fixing heater 105 (step S2535). Then, the CPU 10*a* determines again whether the image forming apparatus 100 is in a copying operation (step S2531).

When temperature of the fixing roller 21 exceeds the first temperature (No at step S2532), the CPU 10*a* determines whether temperature of the fixing roller 21 is equal to or less than the second temperature (step S2536).

When temperature of the fixing roller 21 is equal to or less than the second temperature (Yes at step S2536), the CPU 10*a* stops charging the capacitor bank 111 (step S2537).

The CPU 10*a* supplies power to the DC fixing heater 105 based on voltage controlled by the step-down chopper circuit 104 and drives the DC fixing heater 105 (step S2538).

When temperature of the fixing roller 21 exceeds the second temperature (No at step S2536), the CPU 10*a* determines whether temperature of the fixing roller 21 is equal to or higher than the reload temperature (step S2539).

When temperature of the fixing roller 21 is lower than the reload temperature (No at step S2539), the CPU 10*a* determines again whether the image forming apparatus 100 is in a copying operation (step S2531).

When temperature of the fixing roller 21 is equal to or higher than the reload temperature (Yes at step S2539), the CPU 10*a* stops driving the DC fixing heater 105 (step S2540).

When the image forming apparatus is not in a copying operation (No at step S2531), the CPU 10*a* determines whether the image forming apparatus 100 is in energy-saving mode (step S2541). When the image forming apparatus 100 is not in energy-saving mode (No at step S2541), process control moves to "B" in FIG. 7, and the CPU 10*a* determines whether the image forming apparatus 100 is in standby mode without receiving a copying signal (step S2514).

When the image forming apparatus 100 is in energy-saving mode (Yes at step S2541), the CPU 10*a* controls the image forming apparatus 100 to enter energy-saving mode (step S2542).

Then, the CPU 10*a* charges the capacitor bank 111 based on voltage controlled by the step-down chopper circuit 104 (step S2543).

The CPU 10*a* determines whether a user depresses the energy-saving release key (step S2544). When the energy-saving release key is not depressed (No at step S2544), processing at steps S2542 to S2543 is performed.

When the energy-saving release key is depressed (Yes at step S2544), the starting flag is set to '1' (step S2545). Then, the CPU 10*a* starts processing again with determination of whether the starting flag is 111 (step S2501).

As described above, in the image forming apparatus 100, control of the step-down chopper circuit 104 enables the capacitor bank 111 to be charged at a charging voltage different from a voltage to supply power from the AC power source 112 to the DC fixing heater 105.

The capacitor cells in the capacitor bank are expensive components that are liable to be damaged due to overcharge. Therefore, consideration should be given to prevent such damage upon arranging the capacitor cells in the image forming apparatus. Accordingly, in the conventional image forming apparatus in which power supplied from the AC power source is switched between the DC fixing heater and the capacitor bank, power is supplied to the capacitor bank based on supply voltage of the AC power source unless voltage is controlled through the step-down chopper circuit.

Provided that from the AC power source supplies a voltage of 100 volts and the capacitor has a rated voltage of 2.5 volts, the conventional image forming apparatus requires 40 capacitor cells. Supply voltage from an AC power source varies according to countries. Therefore, to provide the conventional image forming apparatuses to a variety of countries, a different number of capacitor cells are required depending on supply voltage in each country. In consideration of working loads or costs in manufacturing steps, it is not practical to arrange the capacitor cells based on supply voltage.

In the image forming apparatus 100, thus, charging is performed to the capacitor bank 111 with suitable charging voltage controlled by the step-down chopper circuit 104. This makes it possible to charge with voltage different from supply voltage from the AC power source 112. Accordingly, arrangement of the capacitor cells is not limited by the AC power source, which makes it possible to use the image forming apparatus 100 in different countries in which supply voltage is different from one another. Furthermore, it is possible to arrange the suitable number of the capacitor cells in the image forming apparatus 100 based on power needed for the DC fixing heater and costs of the image forming apparatus.

Supply voltage is altered by the step-down chopper circuit 104 based on PWM signals output from the output control unit 103. In other words, the FET 113 of the step-down chopper circuit 104 can be controlled based on a duty ratio of PWM signals output from the output control unit 103 in the image forming apparatus 100, and therefore, power can be supplied with a suitable supply voltage according to a destination to which power is supplied. To change supply voltage based on the duty ratio to, for example, charge the capacitor bank 111, a difference between reference voltage for charging the capacitor bank 111 and detected feedback voltage is multiplied by a gain to increase or decrease the previous duty ratio by the obtained value. The feedback voltage is described later.

Charging the capacitor bank 111 in the image forming apparatus 100 is likewise controlled at each of steps S2512, S2520, and S2543 in FIGS. 7 and 8 and the explanation is as follows. FIG. 9 is a flowchart of a processing procedure of charging the capacitor bank 111 by the output control unit 103 according to the first embodiment.

First, the A/D converter 103*c* monitors a charging voltage for the capacitor bank 111, and the charging current detecting circuit 103*d* monitors a charging current for the capacitor bank 111 (step S2601). The CPU 103*a* determines whether the charging voltage monitored by the A/D converter 103*c* is equal to or less than a first reference charging voltage (step S2602). When the charging voltage is equal to or less than the first reference charging voltage (Yes at step S2602), the CPU 103*a* instructs the PWM generating circuit 103*e* to perform constant-current control (step S2603). The reference charging voltage is a charging voltage of the capacitor bank 111 as a reference to switch processing to be performed. A specific value of the reference charging voltage (a first reference charging voltage and a second reference charging voltage) can be set as appropriate depending on a capacitance of the capacitor bank 111. The charging current and the charging voltage are continued to be monitored (step S2601).

With regard to the constant-current control, by using voltage between terminals detected from the resistance R1 serially connected to the capacitor bank 111 as feedback voltage, flowing current can be maintained constant by controlling the feedback voltage to be constant. The charging current detecting circuit 103*d* monitors voltage between the terminals so that the PWM generating circuit 103*e* multiplies a difference between reference voltage previously set for the constant-current control and the detected feedback voltage by a gain to increase or decrease the previous duty ratio by the obtained value. The PWM generating circuit 103*e* outputs PWM signals based on the changed duty ratio. Thus, the constant-current control is enabled in the image forming apparatus 100.

When the charging voltage is larger than the first reference charging voltage (No at step S2602), the CPU 103*a* determines whether the charging voltage is equal to or less than the second reference charging voltage (step S2604). When the charging voltage is equal to or less than the second reference charging voltage (Yes at step S2604), the PWM generating circuit 103*e* performs constant-power control (step S2605). Then, the process control returns to step S2601. The second reference charging voltage is larger than the first reference charging voltage.

Incidentally, switching between the constant-power control and the constant-current control can be performed according to an operation of the bias circuit (for example, when a single-cell full-charge signal is input) instead of when the charging voltage exceeds the second reference charging voltage.

The PWM generating circuit 103*e* calculates target output voltage to be detected from the resistance R1 based on reference voltage set for the constant-power control and voltage between terminals of the capacitor bank 111 monitored by the A/D converter 103*c*. The CPU 103*a* multiplies a difference between feedback voltage, i.e., voltage between terminals detected from the resistance R1, and target output voltage by a gain to increase or decrease the previous duty ratio by the obtained value. The output control unit 103 outputs PWM signals based on the changed duty ratio. This makes it possible to perform the constant-power control in the image forming apparatus 100.

When the charging voltage is larger than the second reference charging voltage (No at step S2604), the constant-current control is performed with low current (step S2606).

The output control unit 103 performs processing at step S2606 until a whole-cell full-charge signal is input. When a whole-cell full-charge signal is input, the output control unit 103 stops outputting PWM signals, and the processing ends.

In the image forming apparatus 100, switching between the constant-current control and the constant-power control is performed according to charging current to the capacitor bank 111 and charging voltage in the capacitor bank 111 based on the above processing procedure and power supplied to the capacitor bank 111 is controlled. This makes it possible to charge the capacitor bank 111 without damaging the capacitor cells of the capacitor bank 111.

The capacitor cells of the capacitor bank 111 are actually different in capacitance cell by cell. Therefore, when charging voltage in the capacitor bank 111 is larger than the second reference charging voltage, the constant-current control is performed with low current in the image forming apparatus 100. This makes it possible to perform suitable current control in response to a charging condition of each capacitor cell, leading to prevention of degradation in each capacitor cell. As a result, it is possible to achieve high longevity of the capacitor bank 111 and protect a charging circuit.

Figure 10A:
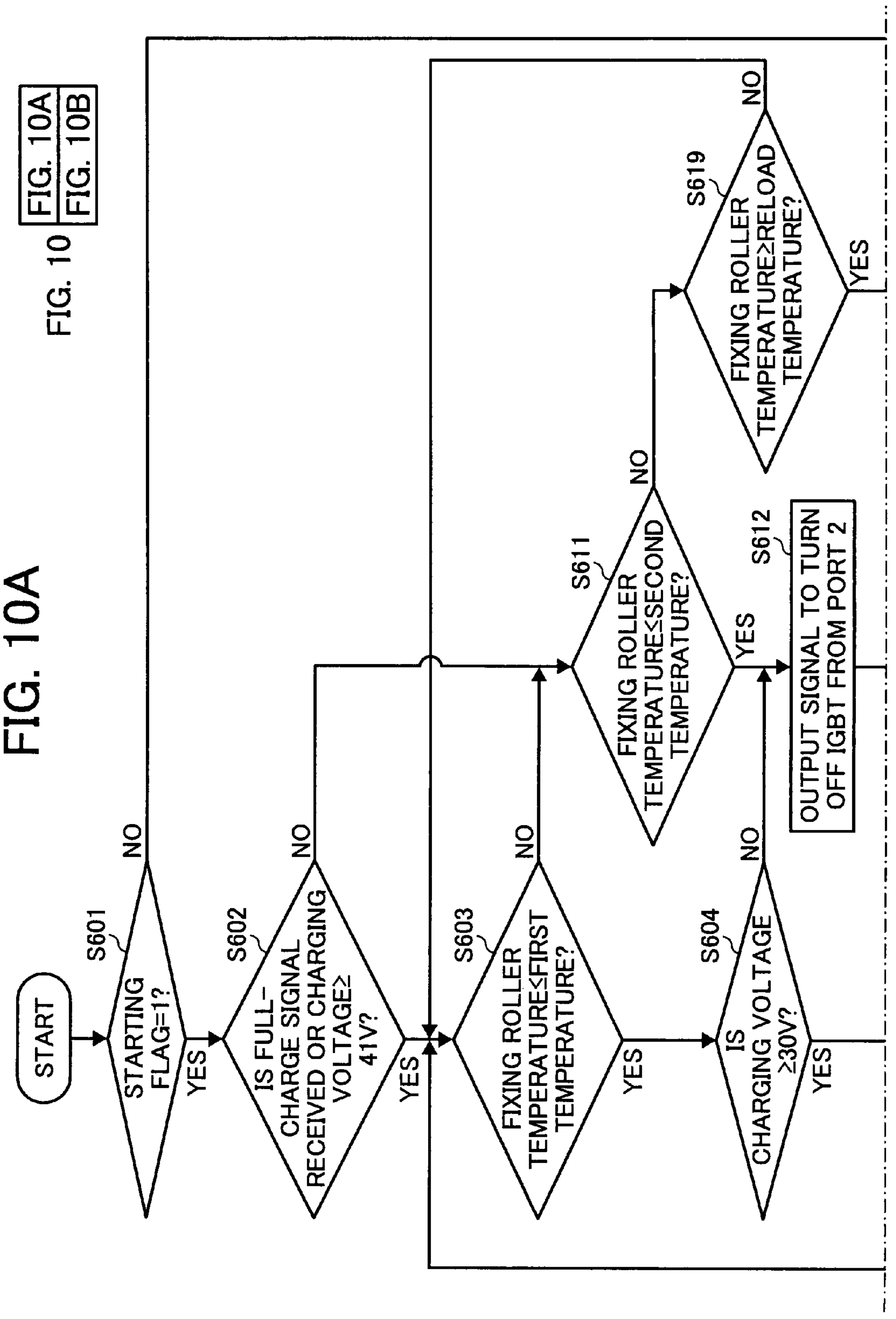
FIG. 10 is a flowchart of a processing procedure of starting the fixing device under control of the CPU of the engine control unit.
Figure 10B:
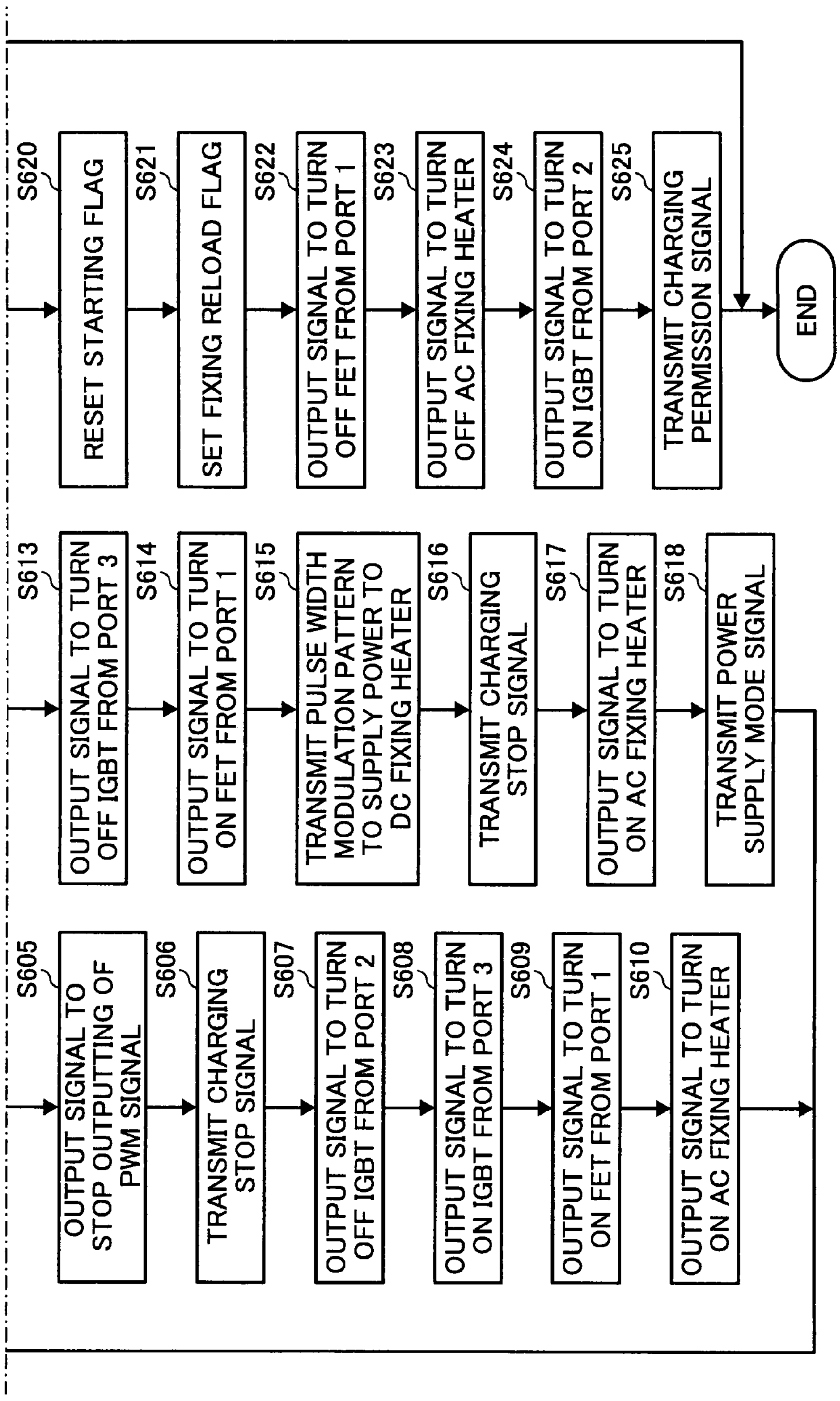

FIG. 10 is a detailed flowchart of a processing procedure of activating the fixing device 400 under control of the CPU 10*a* of the engine control unit 10, i.e., the processing procedure shown at steps S2501 to S2512 in FIG. 7.

Prior to the processing procedure shown in FIG. 10, the capacitor bank 111 stores therein a large amount of power. In FIG. 10, when starting the image forming apparatus 100, power is supplied from the capacitor bank 111 to the DC fixing heater 105. Then, when temperature of the fixing roller 21 exceeds a predetermined temperature or when charging voltage of the capacitor bank 111 is less than 30 volts, power is supplied from the step-down chopper circuit 104 to the DC fixing heater 105. The following explanation is in the order of processing.

The CPU 10*a* of the engine control unit 10 first checks whether a starting flag is set (step S601). The starting flag is the same as that explained in connection with FIG. 6 and is set to ‘1’ at turn-on of the main power source or when energy-saving mode is released. When the starting flag is not set to ‘1’ (No at step S601), the processing ends.

When the starting flag is set to ‘1’ (Yes at step S601), the CPU 10*a* of the engine control unit 10 checks through the A/D converter 10*b* whether a full-charge signal is received from the output control unit 103 or charging voltage of the capacitor bank 111 is equal to or larger than 41 volts (step S602). In the first embodiment, the charging voltage determined as charged is, for example, 41 volts. The following voltage values are likewise indicated as an example.

When a full-charge signal is received and the charging voltage is equal to or larger than 41 volts (Yes at step S602), the CPU 10*a* checks through the A/D converter 10*b* whether temperature of the fixing roller 21 is equal to or less than the first temperature (step S603). The temperature is detected by one of or both of the temperature detecting circuits 28 and 33.

When temperature of the fixing roller 21 is equal to or less than the first temperature (Yes at step S603), the CPU 10*a* checks whether charging voltage is equal to or larger than 30 volts (step S604).

When the charging voltage is equal to or larger than 30 volts (Yes at step S604), the CPU 10*a* outputs a signal to stop outputting PWM signals to the output control unit 103 (step S605).

The CPU 10*a* transmits a charging stop signal to stop charging to the output control unit 103 (step S606).

The CPU 10*a* outputs a signal to turn off the IGBT 110 from the port 2 to stop supplying power to the capacitor bank 111 (step S607).

The CPU 10*a* outputs a signal to turn on the IGBT 109 from the port 3 to supply power stored in the capacitor bank 111 to the DC fixing heater 105 (step S608).

The CPU 10*a* outputs a signal to turn on the FET 106 from the port 1 to supply power to the DC fixing heater 105 (step S609).

The CPU 10*a* outputs a signal to turn on the AC fixing heater 30 from the port 4 (step S610). This leads to power supply to the DC fixing heater 105. Then, the CPU 10*a* starts processing again with checking through the A/D converter 10*b* whether temperature of the fixing roller 21 is equal to or less than the first temperature (step S603). Such processing is performed until temperature of the fixing roller 21 exceeds the first temperature or the charging voltage of the capacitor bank 111 drops below 30 volts.

When temperature of the fixing roller 21 exceeds the first temperature (Yes at step S603), or a full-charge signal is not received or the charging voltage of the capacitor bank 111 is less than 41 volts (No at step S602), the CPU 10*a* checks whether temperature of the fixing roller 21 is equal to or less than the second temperature (step S611). The second temperature is, for example, 178 degrees centigrade.

When temperature of the fixing roller 21 is equal to or less than the second temperature (Yes at step S611), the CPU 10*a* outputs a signal to turn off the IGBT 110 from the port 2 (step S612).

The CPU 10*a* outputs a signal to turn off the IGBT 109 from the port 3 (step S613). Thus, power is supplied to the DC fixing heater 105 from the step-down chopper circuit 104 instead of the capacitor bank 111.

The CPU 10*a* outputs a signal to turn on the FET 106 from the port 1 (step S614).

The CPU 10*a* transmits a pulse width modulation pattern to supply power to the DC fixing heater 105 to the output control unit 103 (step S615). The CPU 10*a* can transmit a voltage value to supply power to the DC fixing heater 105 to the output control unit 103. Thus, the output control unit 103 controls the FET 113 to supply appropriate power to the DC fixing heater 105.

The CPU 10*a* transmits a charging stop signal to stop charging (step S616).

The CPU 10*a* outputs a signal to turn on the AC fixing heater 30 from the port 4 (step S617).

The CPU 10*a* transmits a power supply mode signal to the output control unit 103 (step S618). Power is supplied from the step-down chopper circuit 104 to the DC fixing heater 105 based on the series of processing.

In other words, when the main power source is turned on or energy-saving mode is released in the image forming apparatus 100 and when temperature of the fixing roller 21 exceeds the first temperature (170 degrees centigrade) and is equal to or less than the second temperature (178 degrees centigrade), the above processing (steps S612 to S618) is performed. In addition, after starting of the apparatus and when charging voltage is less than 30 volts, the above processing (steps S612 to S618) is performed and switching is performed to supply power from the step-down chopper circuit 104 to the DC fixing heater 105.

When temperature of the fixing heater 21 exceeds the second temperature (No at step S611), the CPU 10*a* checks whether temperature of the fixing roller 21 reaches the reload temperature (step S619).

When temperature of the fixing roller 21 does not reach the reload temperature (No at step S619), the CPU 10*a* determines whether temperature of the fixing roller 21 exceeds the first temperature (step S603). When temperature of the fixing roller 21 exceeds the first temperature and is equal to or less than the second temperature, power is continued to be supplied from the step-down chopper circuit 104 to the DC fixing heater 105.

When temperature of the fixing roller 21 reaches the reload temperature (Yes at step S619), the CPU 10*a* resets the starting flag (step S620). That is, the starting flag is set to '0'.

The CPU 10*a* sets a fixing reload flag (step S621). The CPU 10*a* outputs a signal to turn off the FET 106 from the port 1 (step S622).

The CPU 10*a* outputs a signal to turn off the AC fixing heater 30 from the port 4 (step S623).

The CPU 10*a* outputs a signal to turn on the IGBT 110 from the port 2 for charging (step S624). Then, the CPU 10*a* outputs a charging permission signal (step S625). This procedure makes the image forming apparatus 100 start fixing.

Figure 11A:
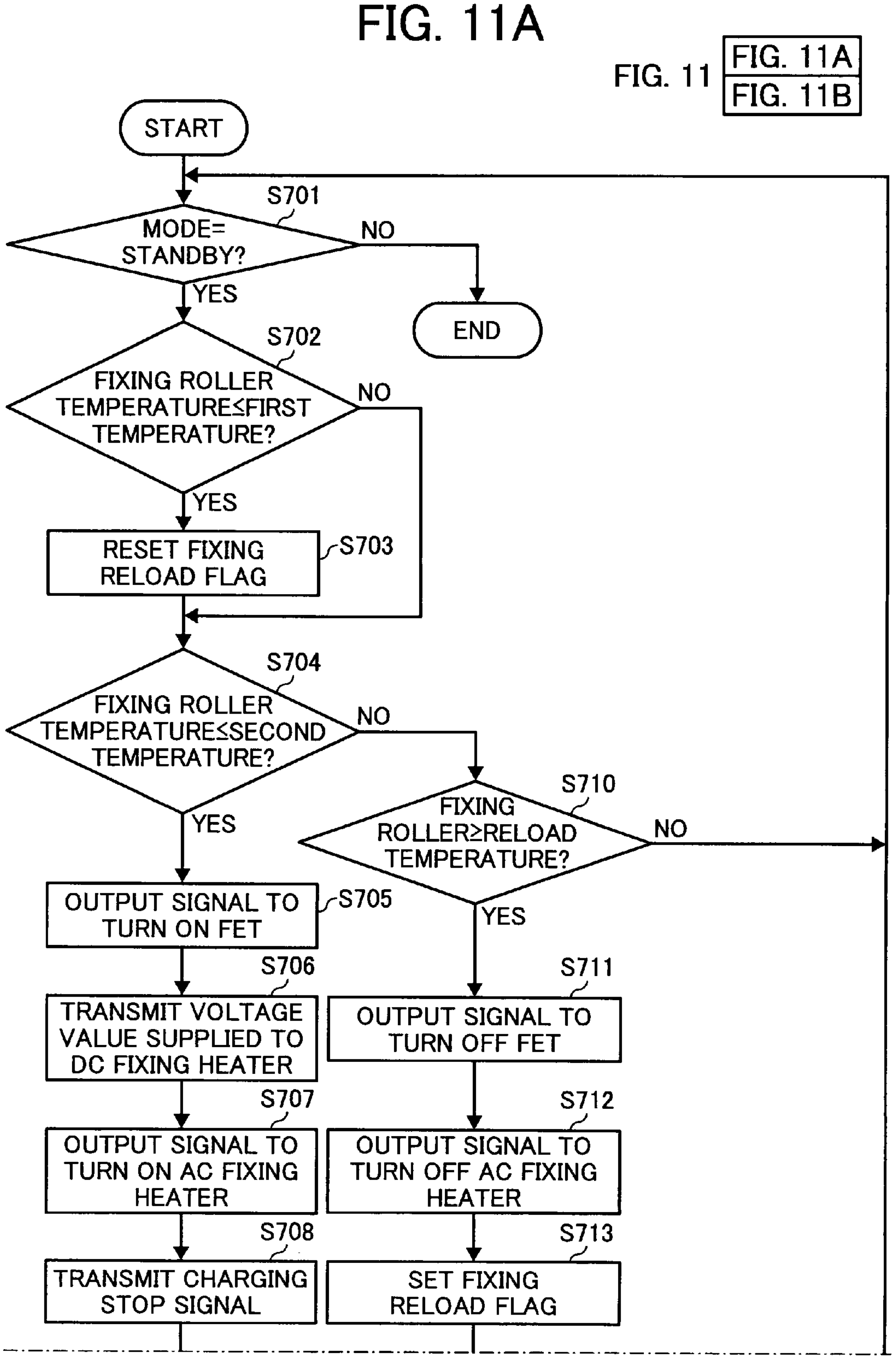
FIG. 11 is a flowchart of a control procedure performed by the CPU of the engine control unit when the image forming apparatus is in standby mode.
Figure 11B:
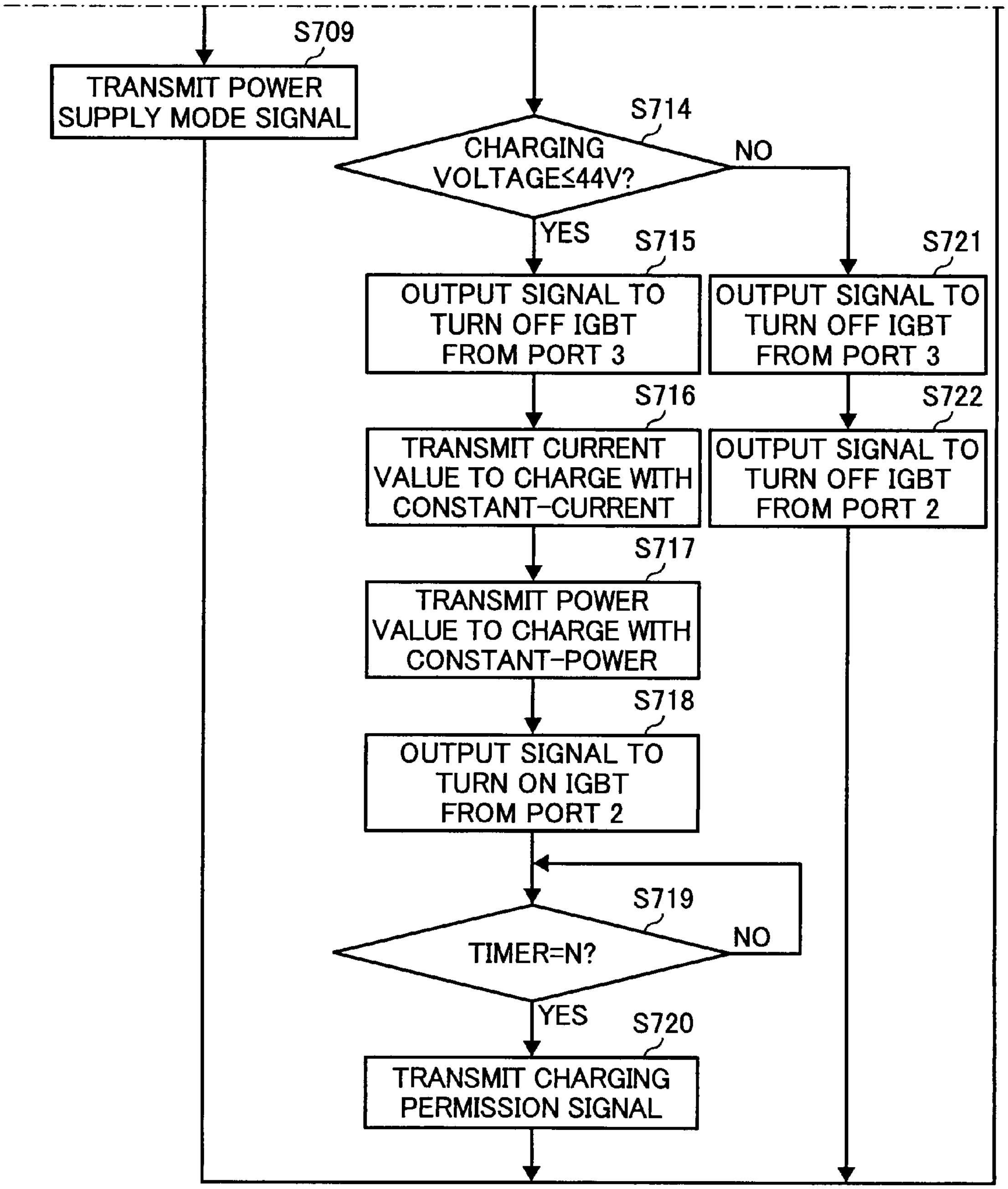

FIG. 11 is a detailed flowchart of a control procedure performed by the CPU 10*a* of the engine control unit 10 when the image forming apparatus 100 is in standby mode, i.e., the processing procedure shown at steps S2514 to S2522 in FIG. 7.

FIG. 11 depicts control of the AC fixing heater 30 at the time of standby, control of the DC fixing heater 105 to which power is supplied from the step-down chopper circuit 104, and control of a charging permission signal that is transmitted to charge.

The CPU 10*a* first checks whether a copying signal is received and the image forming apparatus 100 is in standby mode (step S701). When the image forming apparatus 100 is not in standby mode (No at step S701), the processing ends.

When a copying signal is not received and the image forming apparatus 100 is in standby mode (Yes at step S701), the CPU 10*a* checks whether temperature of the fixing roller 21 is equal to or less than a first standby temperature (for example, 178 degrees centigrade) (step S702).

When temperature of the fixing roller 21 is equal to or less than the first standby temperature (Yes at step S702), the CPU 10*a* resets a fixing reload flag (step S703). Generally, the fixing reload flag is not reset at the time of standby in the image forming apparatus 100. However, when the image forming apparatus 100 is opened, power supply to the DC fixing heater 105 and to the AC fixing heater 30 is stopped. Accordingly, temperature of the fixing roller 21 falls to the first standby temperature or less, and a fixing reload flag is reset.

The CPU 10*a* checks whether temperature of the fixing roller 21 is equal to or less than a second standby temperature (for example, 179 degrees centigrade) (step S704).

When temperature of the fixing roller 21 is equal to or less than the second standby temperature (Yes at step S704), the CPU 10*a* outputs a signal to turn on the FET 106 from the port 1 (step S705).

The CPU 10*a* transmits a value of reference voltage supplied to the DC fixing heater 105 to the CPU 103*a* of the output control unit 103 (step S706). The reference voltage is calculated as follows. First, time lag occurs based on a response from the thermistor 28*a* in a surface temperature (fixing temperature) of the fixing roller 21 that is input in the A/D converter 10*b* so that the CPU 10*a* calculates reference voltage based on the input surface temperature, a tendency that the surface temperature changes (increase or decrease), and an amount of the changed surface temperature (an increased amount or a decreased amount).

The value of the reference voltage is forwarded through the CPU 103*a* to the PWM generating circuit 103*e*. Voltage lowered through the step-down chopper circuit 104 is fed back from the step-down voltage detecting circuit 4 to the PWM generating circuit 103*e*. The PWM generating circuit 103*e* multiplies a difference between the altered reference voltage and voltage lowered from the step-down voltage detecting circuit 4 by a gain to increase or decrease the previous duty ratio by the obtained value. The PWM generating circuit 103*e* outputs PWM signals with the calculated duty ratio to the FET 113 of the step-down chopper circuit 104.

The CPU 10*a* outputs a signal to turn on the AC fixing heater 30 from the port 4 (step S707). Then, the CPU 10*a* transmits a charging stop signal (step S708). The CPU 10*a* transmits a power supply mode signal to the output control unit 103 (step S709). Thus, even when temperature of the fixing roller 21 decreases, standby mode continues.

When temperature of the fixing roller 21 exceeds the second standby temperature (No at step S704), the CPU 10*a* checks whether temperature of the fixing roller 21 is equal to or higher than the reload temperature (step S710).

When temperature of the fixing roller 21 is lower than the reload temperature (No at step S710), power is continued to be supplied to the AC fixing heater 30 and to the DC fixing heater 105. The processing starts again with checking whether the image forming apparatus 100 is in standby mode (step S701).

When temperature of the fixing roller 21 is equal to or higher than the reload temperature (Yes at step S710), the CPU 10*a* outputs a signal to turn off the FET 106 from the port 1 (step S711).

The CPU 10*a* outputs a signal to turn off the AC fixing heater 30 from the port 4 (step S712). Then, the CPU 10*a* sets the fixing reload flag (step S713).

The CPU 10*a* checks whether charging voltage of the capacitor bank 111 is equal to or less than 44 volts based on a signal input from the A/D converter 10*b* (step S714).

When charging voltage of the capacitor bank 111 is equal to or less than 44 volts (Yes at step S714), the CPU 10*a* outputs a signal to turn off the IGBT 109 from the port 3 (step S715).

The CPU 10*a* transmits a current value to charge with constant-current to the output control unit 103 (step S716). The CPU 10*a* transmits a power value to charge with constant-power to the output control unit 103 (step S717). In addition, the CPU 10*a* outputs a signal to turn on the IGBT 110 from the port 2 (step S718).

Then, the CPU 10*a* checks whether a time measured by a timer reaches 'N' (step S719). When the time measured by the timer does not reach 'N' (No at step S719), the CPU 10*a* continues checking until the time measured by the timer reaches 'N'. That is, a predetermined time is waited.

When the time measured by the timer reaches 'N' (Yes at step S719), the CPU 10*a* transmits a charging permission signal (step S720). The processing starts again with checking whether the image forming apparatus 100 is in standby mode (step S701). Thus, the image forming apparatus 100 is stays in standby mode. In the first embodiment, an IGBT is used as a switching circuit, and charging is not particularly required after a predetermined standby time. When a relay is used as a switching circuit as in a second embodiment described below, such an effect can also be achieved that a contact point in the relay is prevented from being welded.

The above series of operations enable the PWM generating circuit 103*e* of the output control unit 103 to charge.

When charging voltage exceeds 44 volts (No at step S714), the CPU 10*a* outputs a signal to turn off the IGBT 109 from the port 3 (step S721).

The CPU 10*a* outputs a signal to turn off the IGBT 110 from the port 2 (step S722). The processing starts again with checking whether the image forming apparatus 100 is in standby mode (step S701). Thus, the image forming apparatus 100 stays in standby mode.

Figure 12A:
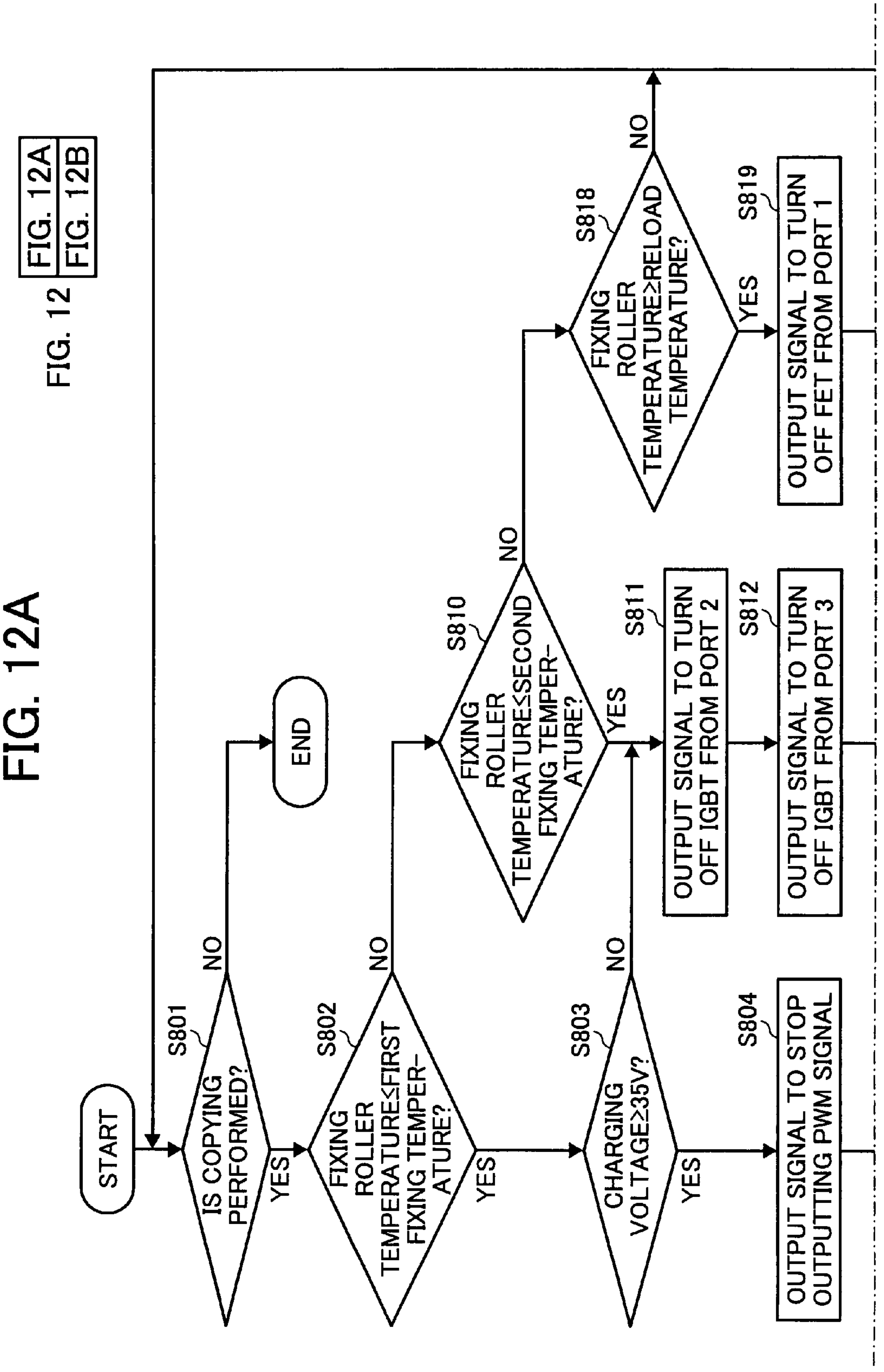
FIG. 12 is a flowchart of a processing procedure of controlling the DC fixing heater to maintain a fixing temperature during a series of copying operations through the CPU of the engine control unit.
Figure 12B:
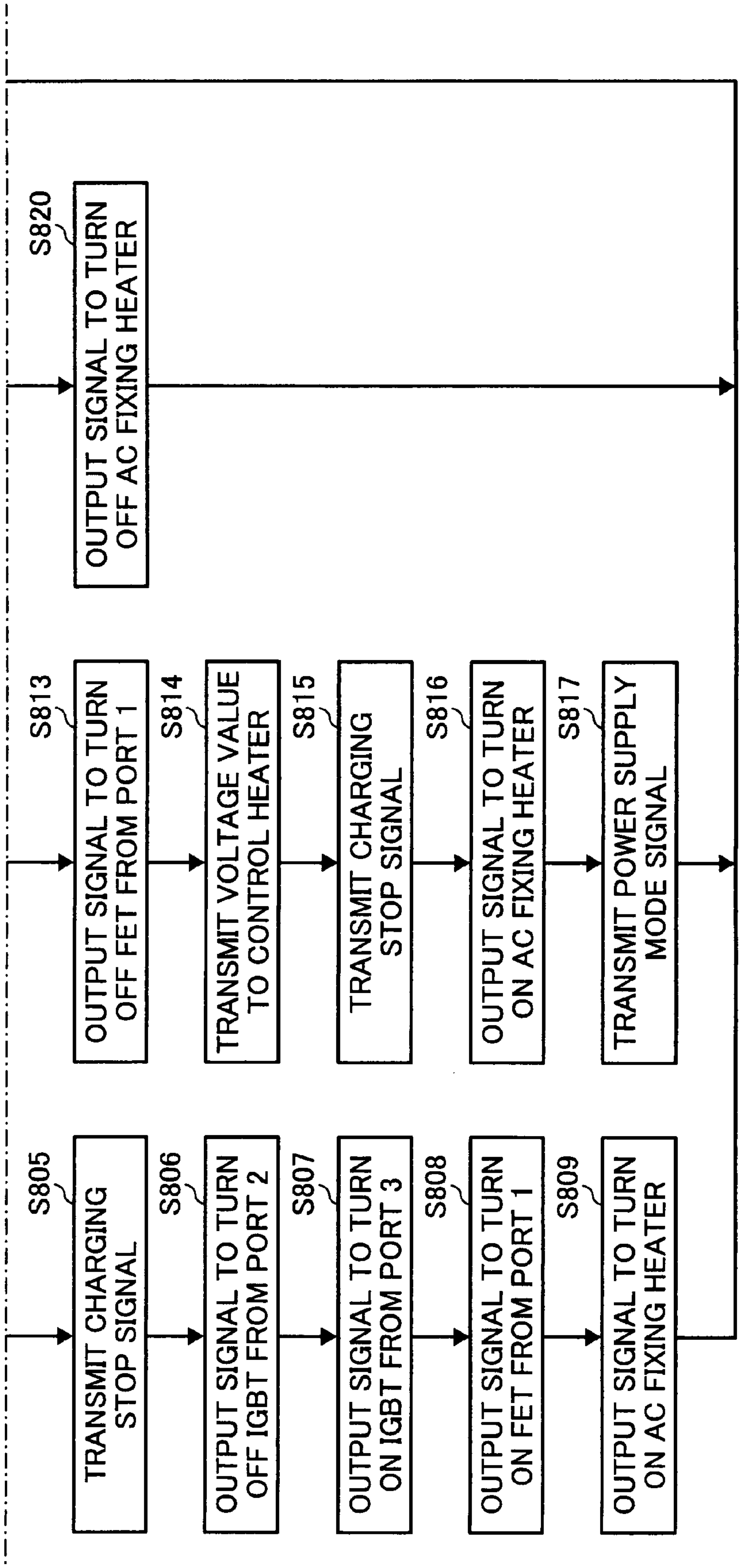

FIG. 12 is a detailed flowchart of a processing procedure of controlling the DC fixing heater 105 to maintain a fixing temperature during a series of copying operations performed by the CPU 10*a* of the engine control unit 10, i.e., the processing procedure shown at steps S2531 to S2540 in FIG. 8.

FIG. 12 depicts control performed, during a series of copying operations, when power is supplied from the step-down chopper circuit 104 to the DC fixing heater 105 and when power is supplied through the AC fixing heater control circuit 43 to the AC fixing heater 30. When temperature of the fixing roller 21 is equal to or less than the first predetermined fixing temperature (falling temperature), stored power in the capacitor bank 111 is used to supply the power to the DC fixing heater 105. When temperature of the fixing roller 21 is equal to or higher than the first predetermined fixing temperature and returns to the second predetermined fixing temperature or less, the used stored power in the capacitor bank 111 is stopped and power is supplied from the step-down chopper circuit 104 to the DC fixing heater 105 again.

The CPU 10*a* checks whether the image forming apparatus 100 is in a copying operation (step S801). When the image forming apparatus 100 is not in a copying operation (No at step S801), the processing ends.

When the image forming apparatus 100 is in a copying operation (Yes at step S801), the CPU 10*a* checks whether temperature of the fixing roller 21 is equal to or less than a first fixing temperature (step S802). This checking detects whether there is a fall in temperature.

When temperature of the fixing roller 21 is equal to or less than the first fixing temperature (Yes at step S802), the CPU 10*a* checks charging voltage in the capacitor bank 111 (step S803).

When charging voltage in the capacitor bank 111 is equal to or larger than 35 volts (Yes at step S803), the CPU 10*a* outputs a signal to stop outputting PWM signals to the CPU 103*a* of the output control unit 103 (step S804). The CPU 10*a* transmits a charging stop signal to stop charging to the CPU 103*a* (step S805).

The CPU 10*a* outputs a signal to turn off the IGBT 110 from the port 2 to stop power supply to the capacitor bank 111 (step S806).

The CPU 10*a* outputs a signal to turn on the IGBT 109 from the port 3 to supply power stored in the capacitor bank 111 to the DC fixing heater 105 (step S807).

The CPU 10*a* outputs a signal to turn on the FET 106 from the port 1 (step S808) and a signal to turn on the AC fixing heater 30 from the port 4 (step S809).

When temperature of the fixing roller 21 exceeds the first fixing temperature (No at step S802), the CPU 10*a* checks through the A/D converter 10*b* whether temperature of the fixing roller 21 is equal to or less than a second fixing temperature (step S810).

When temperature of the fixing roller 21 is equal to or less than the second fixing temperature (Yes at step S810), the CPU 10*a* outputs a signal to turn off the IGBT 110 from the port 2 (step S811).

The CPU 10*a* outputs a signal to turn off the IGBT 109 from the port 3 (step S812) and a signal to turn on the FET 106 from the port 1 (step S813). The CPU 10*a* transmits a voltage value to supply power to the DC fixing heater 105 to the output control unit 103 (step S814). Instead of a voltage value, the CPU 10*a* can transmit a pulse width modulation pattern.

The CPU 10*a* transmits a charging stop signal to stop charging (step S815). Then, the CPU 10*a* outputs a signal to turn on the AC fixing heater 30 from the port 4 (step S816). Thus, the capacitor bank 111 is disconnected, which allows power to be supplied from the step-down chopper circuit 104 to the DC fixing heater 105.

The CPU 10*a* transmits a power supply mode signal to the output control unit 103 to supply power to the fixing roller 21 (step S817). This processing causes power to be supplied from the step-down chopper circuit 104 to the DC fixing heater 105.

When temperature of the fixing roller 21 exceeds the second temperature (No at step S810), the CPU 10*a* checks whether temperature of the fixing roller 21 reaches the reload temperature (step S818).

When temperature of the fixing roller 21 does not reach the reload temperature (No at step S818), the CPU 10*a* checks whether the image forming apparatus 100 is in a copying operation (step S801). In other words, when the image forming apparatus 100 is in a copying operation and temperature of the fixing roller 21 is equal to or higher than the second temperature, power is continued to be supplied from the step-down chopper circuit 104 to the DC fixing heater 105 and from the AC fixing heater control circuit 43 to the AC fixing heater 30.

When temperature of the fixing roller 21 reaches the reload temperature (Yes at step S818), the CPU 10*a* outputs a signal to turn off the FET 106 from the port 1 (step S819) and a signal to turn off the AC fixing heater 30 from the port 4 (step S820). Thus, copying operation continues.

Figure 13:
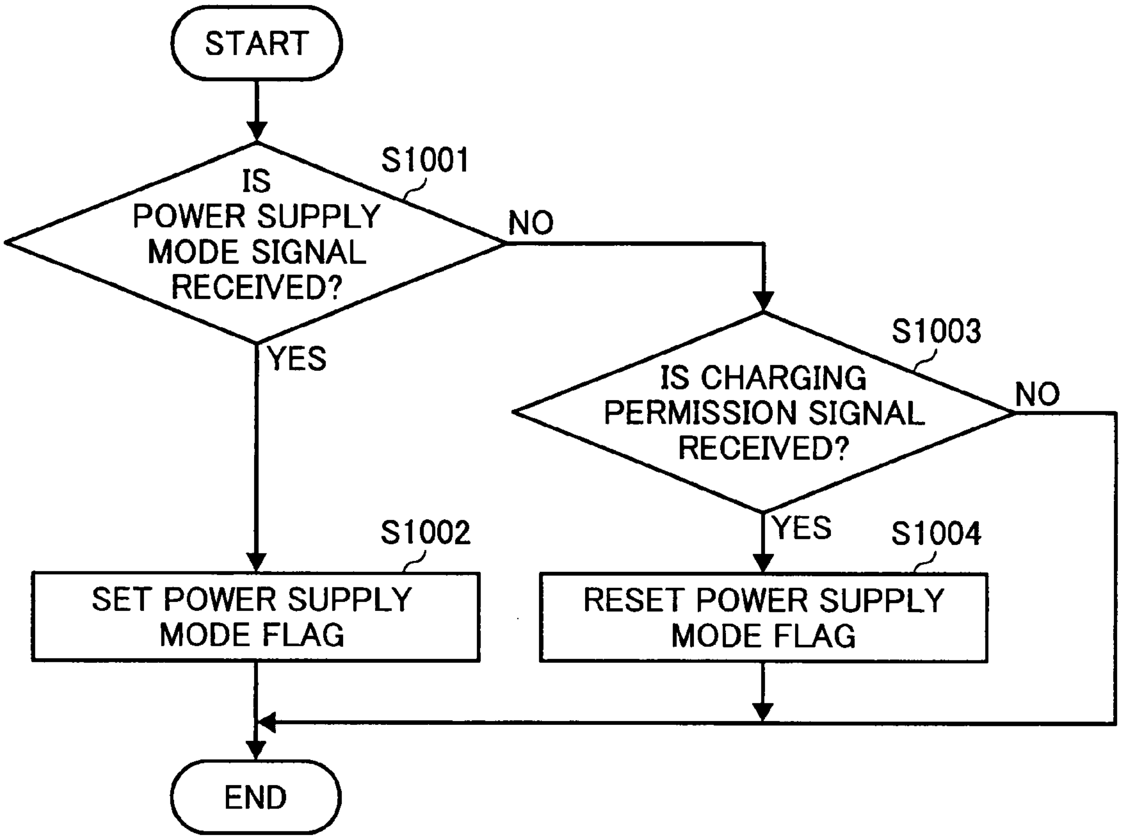
FIG. 13 is a flowchart of a processing procedure of setting a flag in response to a signal such as a power supply mode signal through a CPU of the output control unit.

FIG. 13 is a flowchart of a processing procedure of setting a flag in response to a signal such as a power supply mode signal performed by the CPU 103*a* of the output control unit 103.

The CPU 103*a* first checks whether a power supply mode signal is received from the CPU 10*a* (step S1001).

When a power supply mode signal is received (Yes at step S1001), the CPU 103*a* sets a power supply mode flag (step S1002), and the processing ends.

When a power supply mode signal is not received (No at step S1001), the CPU 103*a* checks whether a charging permission signal is received (step S1003).

When a charging permission signal is received (Yes at step S1003), the CPU 103*a* resets a power supply mode flag, and the processing ends (step S1004). When the charging permission signal is not received (No at step S1003), the processing ends.

The power supply mode flag is a flag for the step-down chopper circuit 104 to supply power to the DC fixing heater 105 when not charging. Processing that includes using a power supply mode flag is explained in an embodiment described below.

Figure 14:
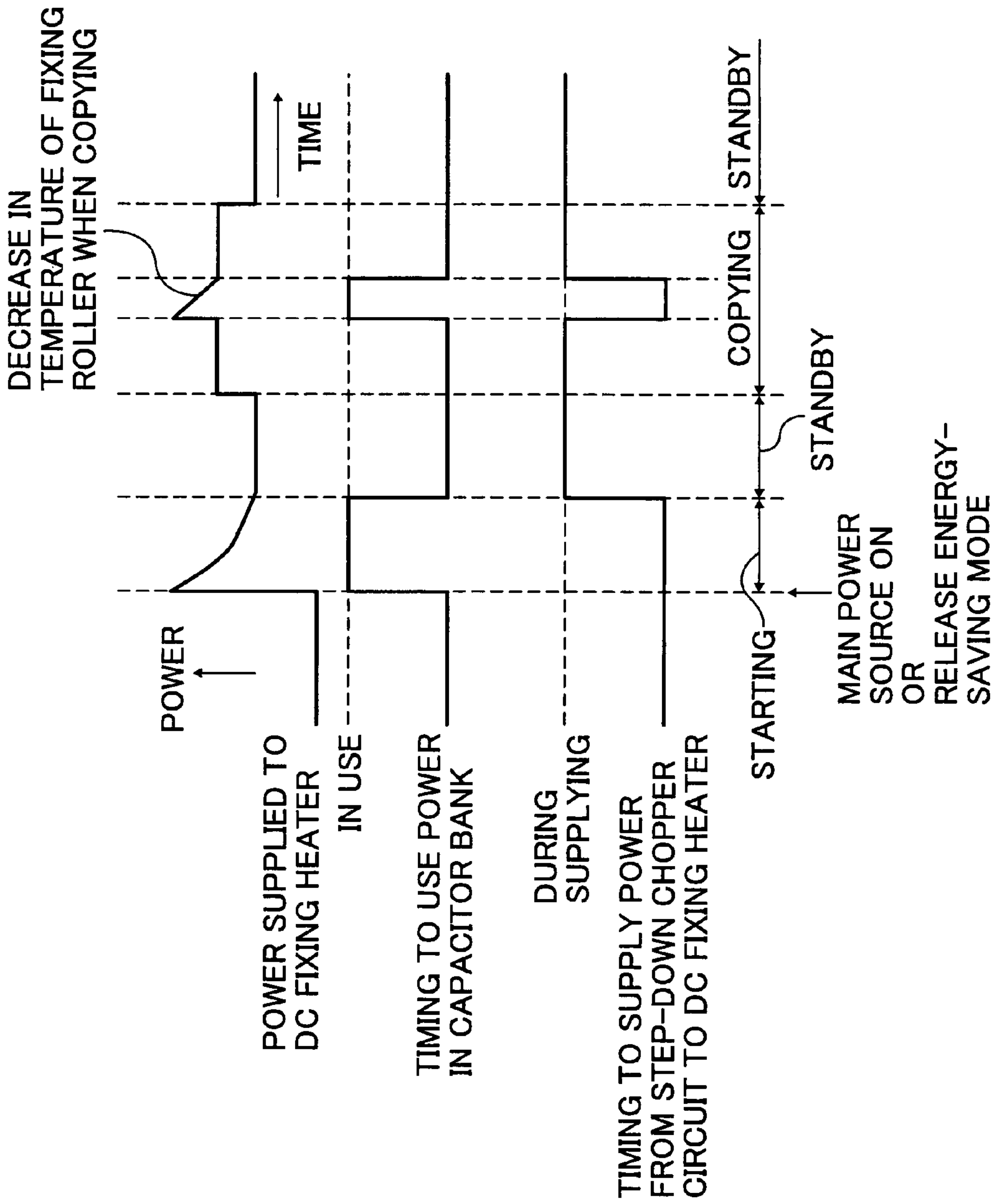
FIG. 14 is a chart for explaining timing to supply electric power to the DC fixing heater after starting of the image forming apparatus.

FIG. 14 is a chart for explaining timing to supply power to the DC fixing heater 105 after starting of the image forming apparatus 100.

As shown in FIG. 14, power supplied to the DC fixing heater 105 is supplied from the capacitor bank 111 or the step-down chopper circuit 104. Power is supplied from the capacitor bank 111 to the DC fixing heater 105 only when starting or when temperature falls. It is confirmed that the capacitor bank 111 supplies large power at that time. In other words, the use of the capacitor bank 111 enables the fixing roller 21 to be heated to a temperature at which copying is possible in a short time.

As described above, the first embodiment includes means of controlling voltage that is referred to as the step-down chopper circuit 104. The image forming apparatus 100 can supply output voltage controlled by the step-down chopper circuit 104 to the DC fixing heater 105 or the capacitor bank 111.

Stored power charged in the capacitor bank 111 is supplied to the DC fixing heater 105 to heat the fixing roller 21. This makes it possible to decrease the number of components, leading to reduction of manufacturing costs.

When storing power to start the image forming apparatus 100, it is desirable to use an electric double layer capacitor (EDLC) that has high voltage and a large capacitance for charging. However, a typical voltage in the EDLC is 2.3 volts to 2.5 volts and it is difficult to form an EDLC that has high voltage. In this case, it is necessary to have a great number of EDLCs to store power with voltage in which only rectification is performed with respect to power from the AD power source 112. However, an EDLC that has a large capacitance is costly and undesirable.

To store power in the capacitor bank 111 of the image forming apparatus 100, the step-down chopper circuit 104 enables not only rectification but also voltage stepping-down. Such configuration allows the image forming apparatus 100 to realize cost reduction.

In the image forming apparatus 100, power is supplied to the DC fixing heater 105 from both of the capacitor bank 111 and the step-down chopper circuit 104, leading to common use of components. The capacitor bank 111 also has a simplified charging circuit configuration. This makes it possible to reduce manufacturing costs of the image forming apparatus 100.

The image forming apparatus 100 includes switching circuits such as the IGBT 109 and the IGBT 110 so that, when power is not supplied from the step-down chopper circuit 104 to the DC fixing heater 105, it is possible to charge the capacitor bank 111, enabling power equalization of the image forming apparatus 100.

The image forming apparatus 100 has a configuration of charging the capacitor bank 111 and a circuit to supply power to the DC fixing heater 105 in common so that a circuit configuration can be simplified. This makes it possible to reduce manufacturing costs in the image forming apparatus 100 that includes an auxiliary storage power source.

The image forming apparatus 100 includes the step-down chopper circuit 104 and voltage is controlled in the output control unit 103. This makes it possible to alter voltage to supply power to the DC fixing heater 105 and charging voltage to the capacitor bank 111. In addition, it is possible to increase stored power in the capacitor bank 111.

The step-down chopper circuit 104 can change voltage to supply to the DC fixing heater 105 based on PWM signals, which makes it possible to prevent rush current to the DC fixing heater 105 in low temperature and thereby prevent overshoot.

The image forming apparatus 100 includes a communication unit (not shown). The output control unit 103 and the engine control unit 10 can be controlled from outside through the communication unit in the image forming apparatus 100, thereby enabling flexible control.

Power supplied to the DC fixing heater 105 can be controlled in the output control unit 103 and in the engine control unit 10 based on the resulting detections of the DC fixing heater thermistor 28*a*, the AC fixing heater thermistor 33*a*, and the charging voltage detecting circuit 16 in the image forming apparatus 100 so that starting time for fixing can be shortened. Temperature detection allows rapid return to temperature at which fixing is possible when fixing temperature falls.

In operation modes other than image forming operations such as copying operation in the first embodiment, a charging instruction signal and a charging permission signal are transmitted to the output control unit 103 so that it is possible to charge at suitable timing and equalize power to be used. This makes flicker measures possible.

The engine control unit 10 transmits a pulse width modulation pattern to the output control unit 103 in the first embodiment. This makes suitable voltage control possible, hence enabling higher harmonic wave measures, flicker measures, prevention of rush current, and prevention of overshoot in temperature of the heating unit.

Furthermore, in the first embodiment, the IGBT 109 is closed and the IGBT 110 is opened in charging, while the IGBT 109 is opened and the IGBT 110 is closed in using stored power so that it is possible to reduce maximum usable power in the image forming apparatus 100 by use of stored power in the capacitor bank 111. When the image forming apparatus 100 uses a commercial power source of 100 volts and 15 amperes as the AC power source 112, fast starting is possible.

When power does not need to be supplied to the DC fixing heater 105 in the image forming apparatus 100, power is stored in the capacitor bank 111, leading to equalization of usable power and flicker measures.

The DC fixing heater 105 and the AC fixing heater 30 are used in the image forming apparatus 100 so that starting time of the fixing device can be reduced or a fall in fixing temperature can be prevented during a series of copying operations. A source to supply power can be controlled in response to charging voltage of the capacitor bank 111 and temperature of the fixing roller 21 so that starting time can be reduced or fixing temperature can be prevented from falling during a series of copying operations.

In the above and following descriptions, the present invention is applied to an image forming apparatus; however, the present invention can be applied to any apparatus that includes a power storage device.

Besides, the first embodiment is susceptible to several variations and modifications. For example, in the first embodiment, power is not supplied to the DC fixing heater 105 when charging. However, power can be supplied to the DC fixing heater 105 at the time of charging.

Figure 15A:
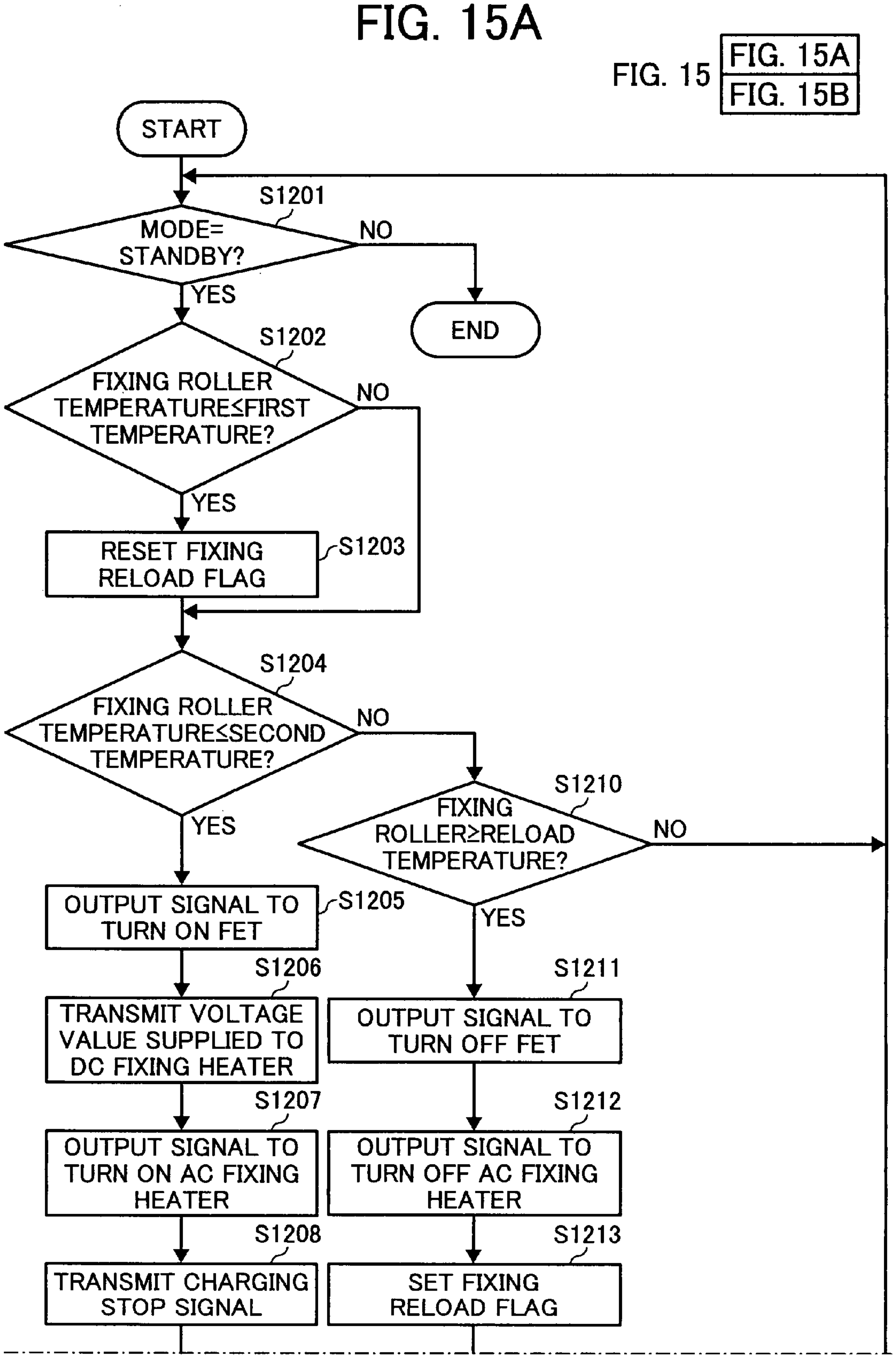
FIG. 15 is a flowchart of a processing procedure of controlling a fixing temperature through the CPU of the engine control unit when the image forming apparatus is in standby mode.
Figure 15B:
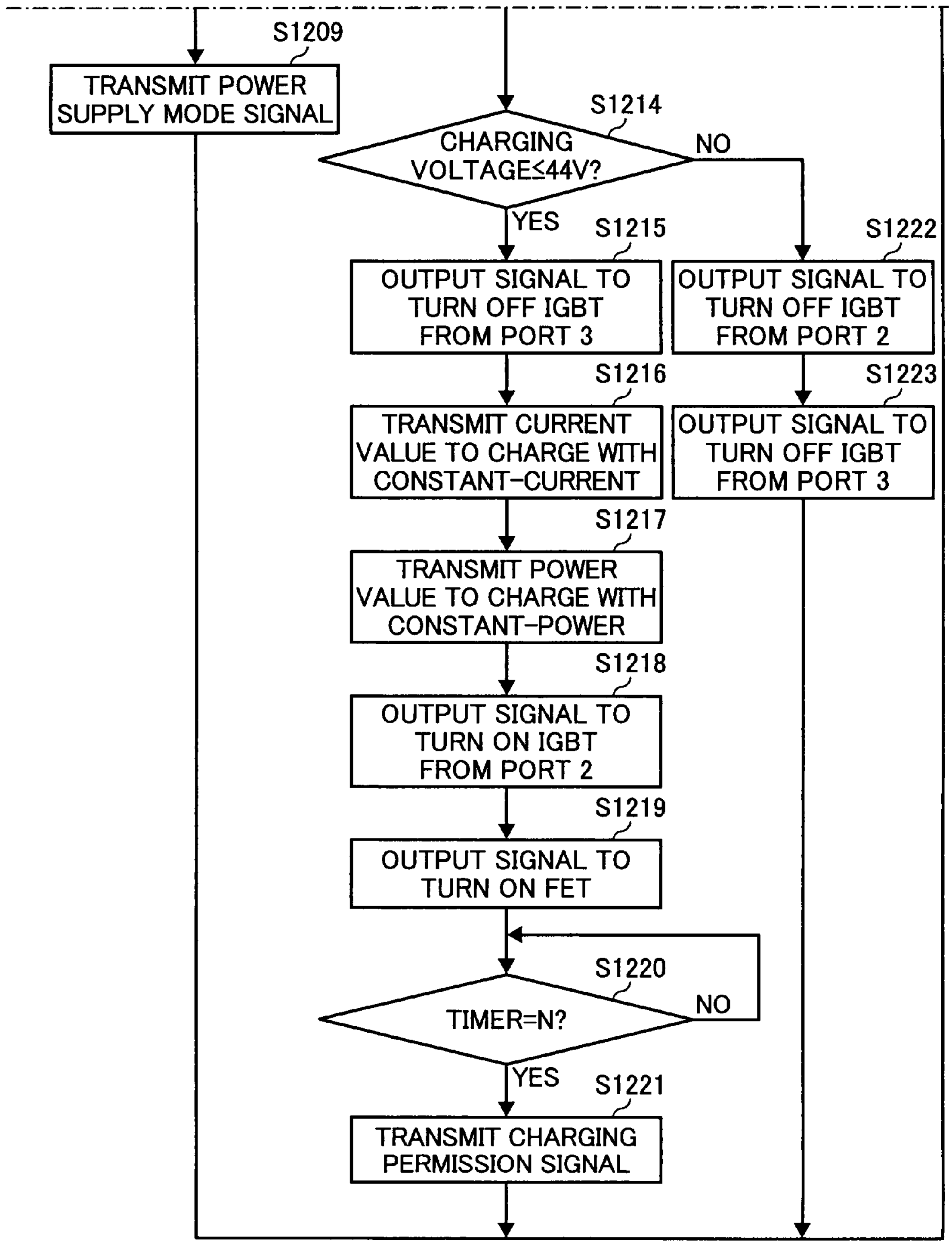

In this case, when a predetermined condition is satisfied during standby, power is supplied to the DC fixing heater 105 with charging of the DC fixing heater 105. This operation is performed based on control from the CPU 10*a*. FIG. 15 is a flowchart of a processing procedure of controlling a fixing temperature during standby performed by the CPU 10*a* of the engine control unit 10 in the modified example.

FIG. 15 depicts control of the AC fixing heater 30 during standby, control of the DC fixing heater 105 after power supply from the step-down chopper circuit 104, and control of the AC fixing heater 30.

In FIG. 15, processing is performed according to temperature of the fixing roller 21 (steps S1201 to S1213) in the same manner as that at steps S701 to S713 in FIG. 11 and, when charging voltage is equal to or less than 44 volts, the IGBTs 109 and 110 are controlled (steps S1214 to S1218) in the same manner as in FIG. 11.

What is different from the processing of FIG. 11 is that the CPU 10*a* outputs a signal to turn on the FET 106 (step S1219) in FIG. 15. Thus, power is supplied to the DC fixing heater 105. The subsequent processing (steps S1220 to S1223) is the same as previously described in connection with FIG. 11 (steps S719 to S722), and the explanation is omitted.

With such processing, power can be supplied to the DC fixing heater 105 during charging.

In other words, charging is possible while power is supplied to the DC fixing heater 105, which increases the time during which the capacitor bank 111 can be charged. This makes it possible to charge the capacitor bank 111 immediately after using the apparatus, thus leading to a smaller capacitance of the capacitor bank 111.

Figure 16A:
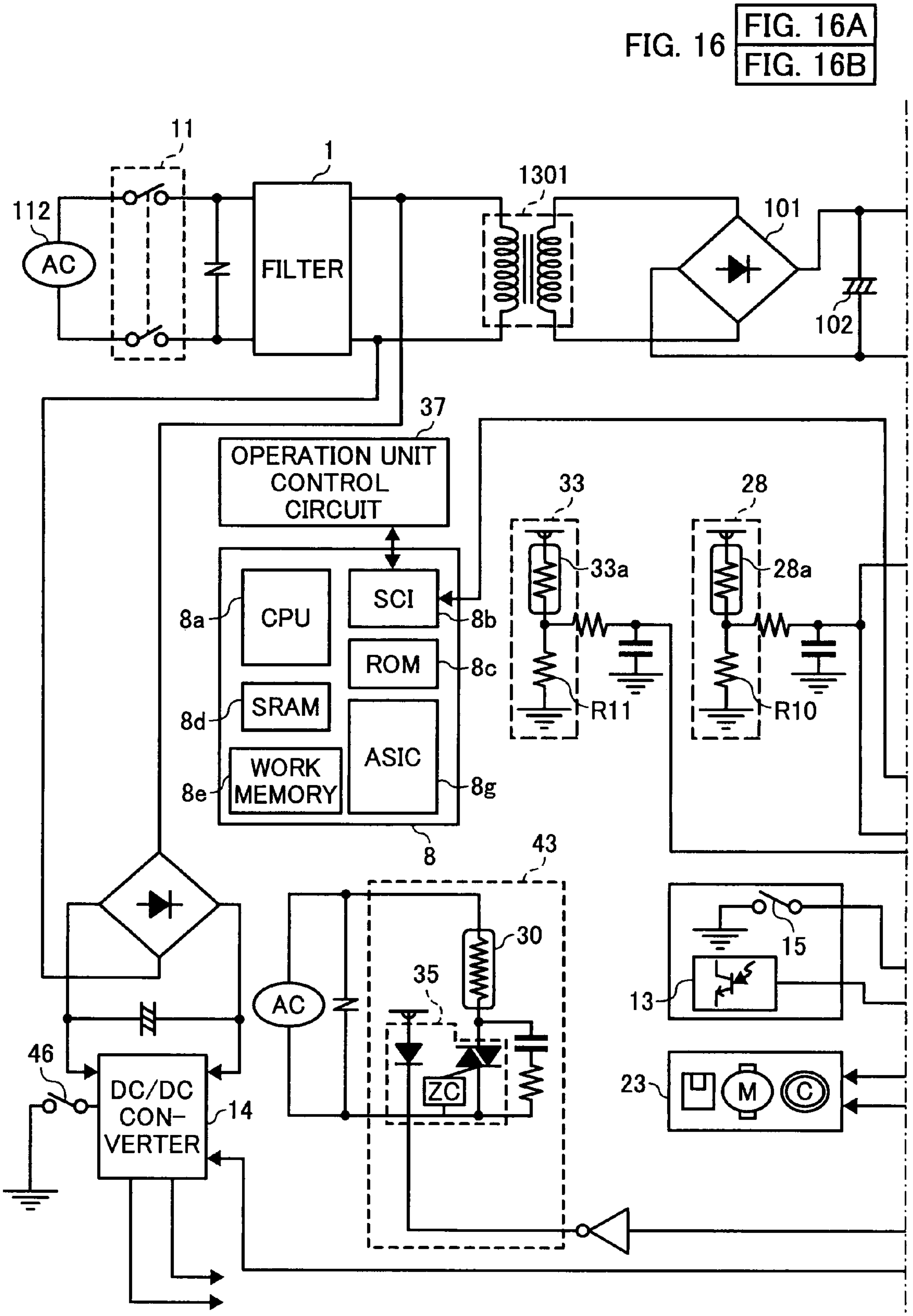
FIG. 16 is a circuit diagram of an image forming apparatus according to a second embodiment of the present invention.
Figure 16B:
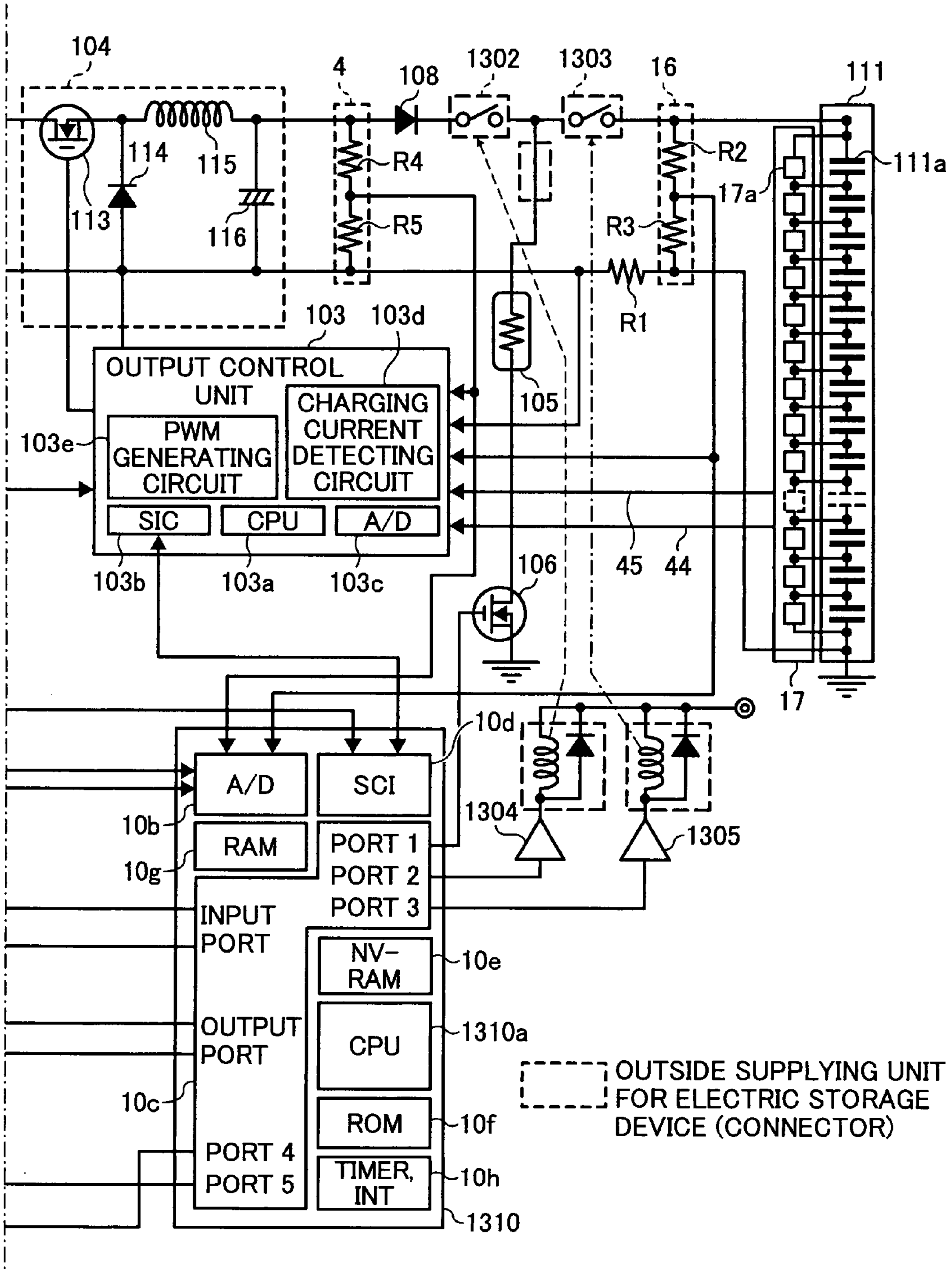

FIG. 16 is a circuit diagram of an image forming apparatus 1300 according to a second embodiment of the present invention. Differently from the image forming apparatus 100, a relay is used as switching means in the image forming apparatus 1300. This causes more capacitor cells serially connected in the capacitor bank 111, which enables higher charging voltage.

An isolation transformer 1301 is arranged between the filter 1 connected to the AC power source through the main power source 11 and the full-wave rectifying circuit 101 and divides a first side from a second side. Therefore, when charging voltage of the capacitor bank 111 exceeds 60 volts, it is easy to implement in safety because they are divided from each other.

A first relay 1302 and a second relay 1303 are switching circuits that control current flow.

A driver 1304 and a driver 1305 amplify signals output from an engine control unit 1310.

The engine control unit 1310 includes a CPU 1310*a* that performs processing different from the CPU 10*a* of the engine control unit 10 according to the first embodiment. The other configuration in the engine control unit 1310 is the same as that in the engine control unit 10 and the explanation is omitted.

The CPU 1310*a* controls the first and second relays 1302 and 1303. This makes it possible to charge the capacitor bank 111 with higher voltage than in the first embodiment. The charged stored power is supplied from the capacitor bank 111 to the DC fixing heater 105.

The CPU 1310*a* outputs a signal of turning on the first relay 1302 in normal operations from the port 2 and, after measuring a predetermined time by the internal timer, outputs a signal of turning on the FET 106 from the port 1 in the input/output ports 10*c*.

Then, the CPU 1310*a* outputs a signal of turning on or off the FET 106 from the port 1 in the input/output ports 10*c* based on the resulting temperature detection of the temperature detecting circuit 28.

The CPU 1310*a* controls to supply stored power in the capacitor bank 111 through the second relay 1303 to the DC fixing heater 105 when temperature falls upon starting of the apparatus or during a series of copying operations.

When stored power in the capacitor bank 111 is supplied to the DC fixing heater 105, the CPU 1310*a* turns on the second relay 1303 from the port 3 in the input/output ports 10*c* and, after measuring the predetermined time by the internal timer, outputs a signal of turning on the FET 106 from the port 1 in the input/output ports 10*c*. This prevents a contact point of the second relay 1303 from being welded.

When turning off the second relay 1303, the CPU 1310*a* outputs a signal of turning off the FET 106 and then turns off the second relay 1303. This prevents the contact point of the second relay 1303 from being welded.

During charging, the first relay 1302 and the second relay 1303 are closed and the FET 106 is turned off. Thus, power is not supplied to the DC fixing heater 105 but supplied to the capacitor bank 111.

Figure 17A:
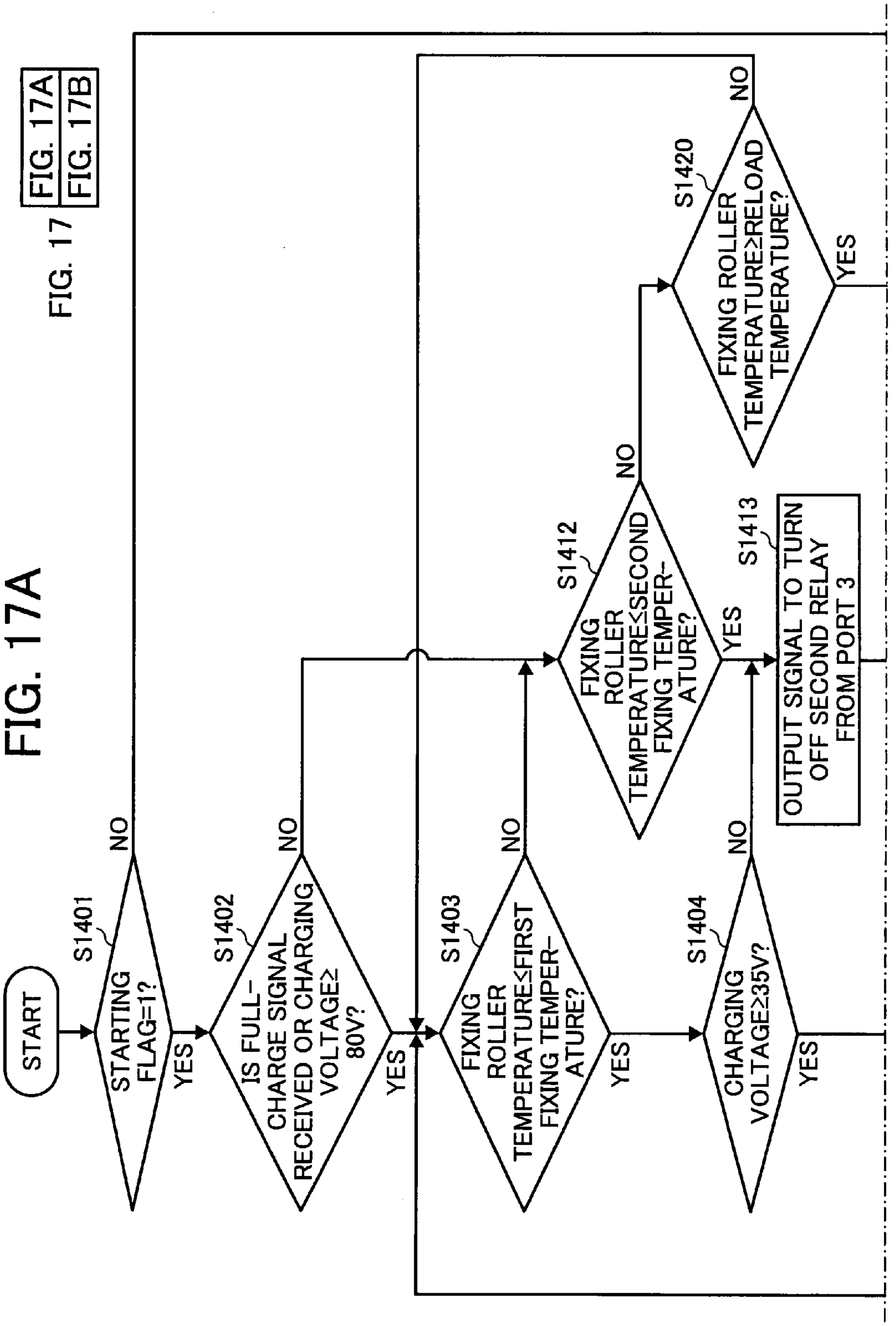
FIG. 17 is a flowchart of a processing procedure of starting a fixing device through a DC fixing heater under control of a CPU of an engine control unit shown in FIG. 16.
Figure 17B:
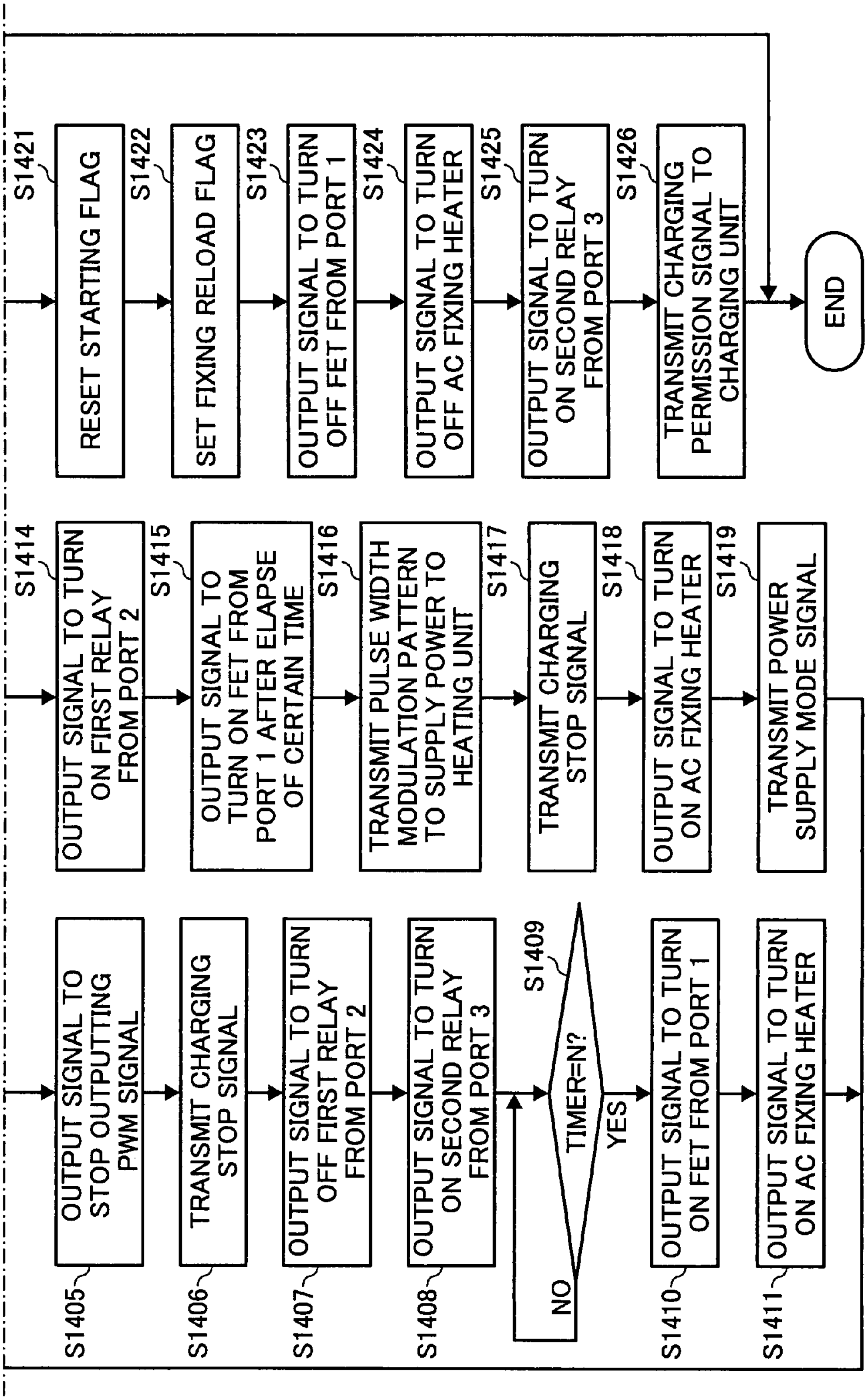

FIG. 17 is a flowchart of a processing procedure of starting the fixing device 400 by the DC fixing heater 105 under control of the CPU 1310*a* of the engine control unit 1310 in the image forming apparatus 1300.

High voltage is previously stored in the capacitor bank 111 in the processing shown in FIG. 17. Upon starting of the image forming apparatus 1300, power is discharged from the capacitor bank 111. When temperature of the fixing roller 21 exceeds a first fixing temperature or when charging voltage of the capacitor bank 111 falls below 35 volts, power is supplied from the step-down chopper circuit 104.

What is different from the processing of FIG. 10 is that the CPU 1310*a* waits in FIG. 17 (step S1409) until a predetermined time 'N' passes in the timer after the second relay is turned on from the port 3 (step S1408). Then, the CPU 1310*a* outputs a signal of turning on the FET 106 from the port 1 (step S1410).

In addition, it is determined whether charging voltage is equal to or larger than 41 volts at step S601 of FIG. 10; however, it is determined whether charging voltage is equal to or larger than 80 volts at step S1402 of FIG. 17 because of the capacitor bank 111 that has a larger capacitance. It is determined whether charging voltage is equal to or larger than 30 volts at step S604 of FIG. 10; however; it is determined whether charging voltage is equal to or larger than 35 volts at step S1404 of FIG. 17. The other processing procedure shown in FIG. 17 is the same as previously described in connection with FIG. 10, and the explanation is omitted.

Figure 18:
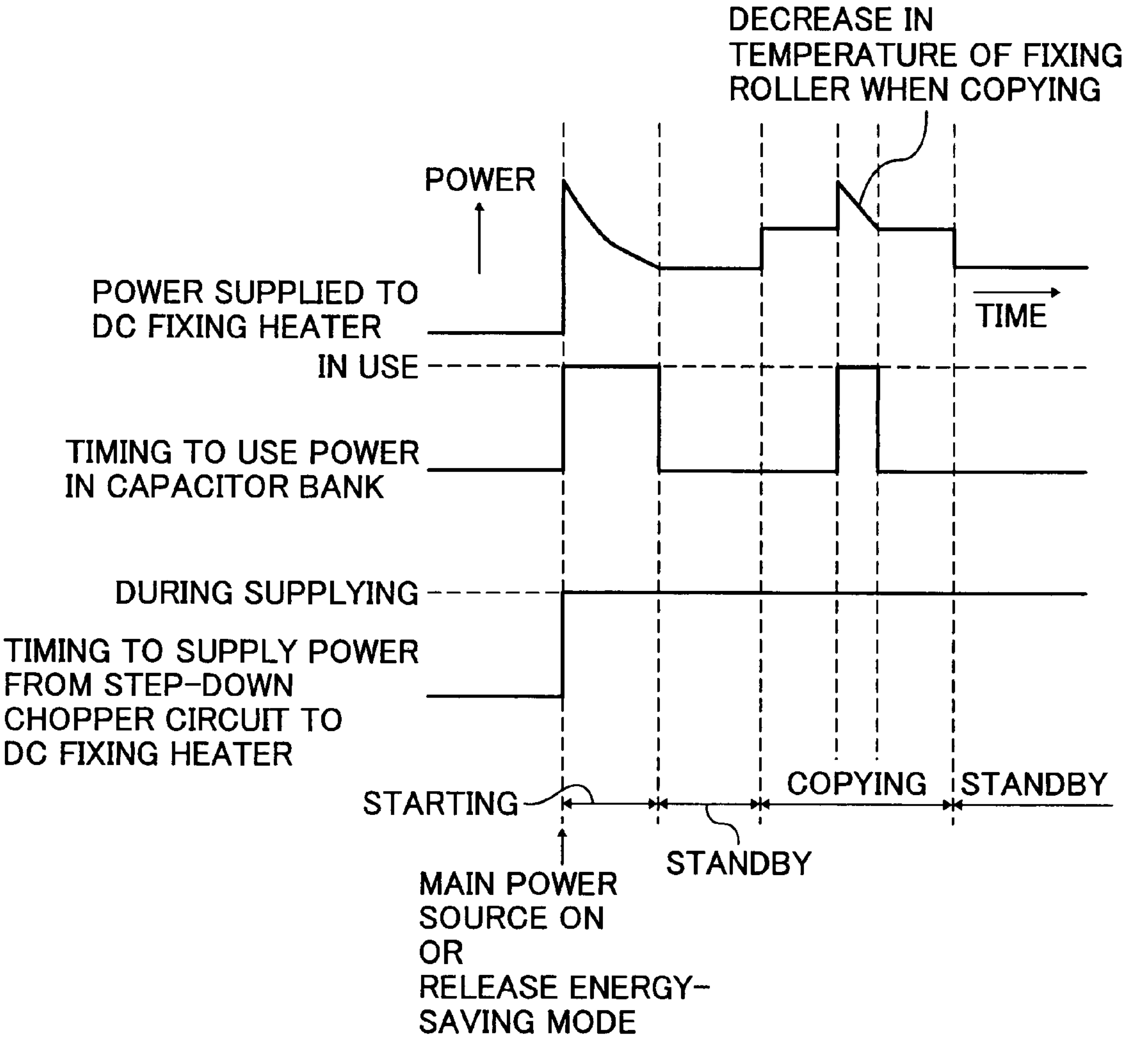
FIG. 18 is a chart for explaining timing to supply electric power to the DC fixing heater after starting of the image forming apparatus shown in FIG. 16.

FIG. 18 is a chart for explaining timing to supply electric power to the DC fixing heater 105 after starting of the image forming apparatus 1300.

The timing shown in FIG. 18 is the same as that in FIG. 14 for using power of the capacitor bank 111. However, the timing when supplying power from the step-down chopper circuit 104 to the DC fixing heater 105 in FIG. 18 is different from that in FIG. 14. In other words, power that is charged in the capacitor bank 111 of the image forming apparatus 1300 is added to output power supplied from the step-down chopper circuit 104 to the DC fixing heater 105 upon starting of the apparatus and when temperature falls. Thus, high power can be applied, resulting in less starting time.

Timing to supply power to the DC fixing heater 105 according to the second embodiment is not limited to the timing as shown in FIG. 18, but can be, for example, timing according to the first embodiment shown in FIG. 14.

Otherwise, the image forming apparatus 1300 is basically similar to the image forming apparatus 100 and operates in a similar manner, and therefore, the same explanation is not repeated.

In the image forming apparatus 1300, a charging circuit of the capacitor bank 111 has something in common with a circuit that supplies power to the DC fixing heater. This makes it possible not only to simplify a circuit configuration but also to heat the fixing roller by use of fewer fixing heaters. Thus, it is possible to reduce manufacturing costs of the image forming apparatus 1300 that includes an auxiliary storage power source.

An amount of power stored in the capacitor bank 111 can be larger than in the first embodiment, thereby enabling reduction in starting time.

In the image forming apparatus 1300, when supplying power to the DC fixing heater 105, the first relay 1302 is closed and when charging the capacitor bank 111, the first relay 1302 and the second relay 1303 are closed. When supplying power stored in the capacitor bank 111 to the DC fixing heater 105, the first relay 1302 is open and the second relay 1303 is closed. Thus, power stored in the capacitor bank 111 can be supplied to the DC fixing heater 105 so that maximum usable power can be reduced. In addition, the image forming apparatus 1300 uses a commercial power source of 100 volts and 15 amperes and can be rapidly started.

After the CPU 1310*a* in the image forming apparatus 1300 controls to turn on the second relay from the port 3, the CPU 1310*a* outputs a signal of turning on the FET 106 from the port 1 after a predetermined time elapses. This makes it possible to prevent a contact point of the relay from being welded.

Figure 19A:
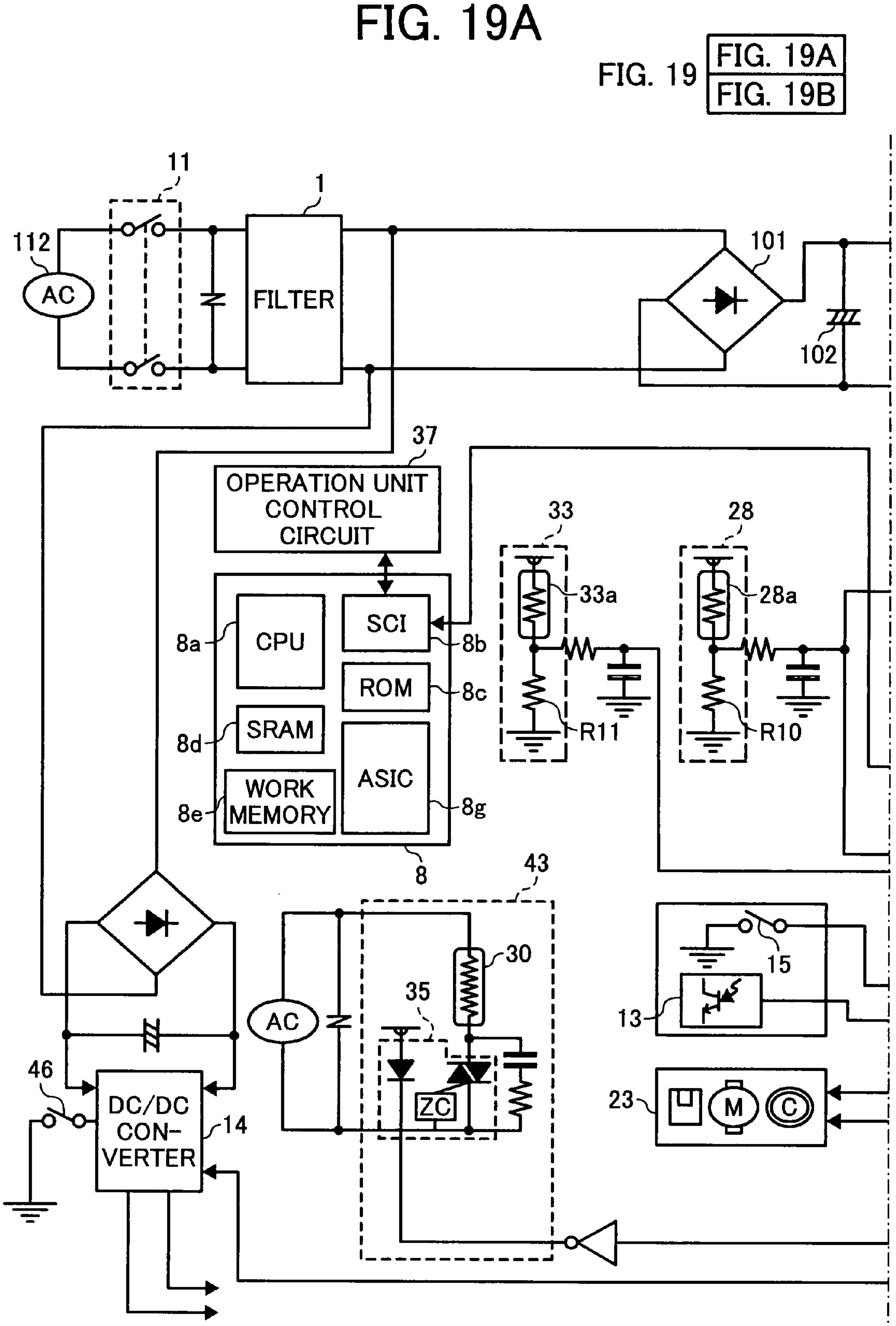
FIG. 19 is a circuit diagram of an image forming apparatus according to a third embodiment of the present invention.
Figure 19B:
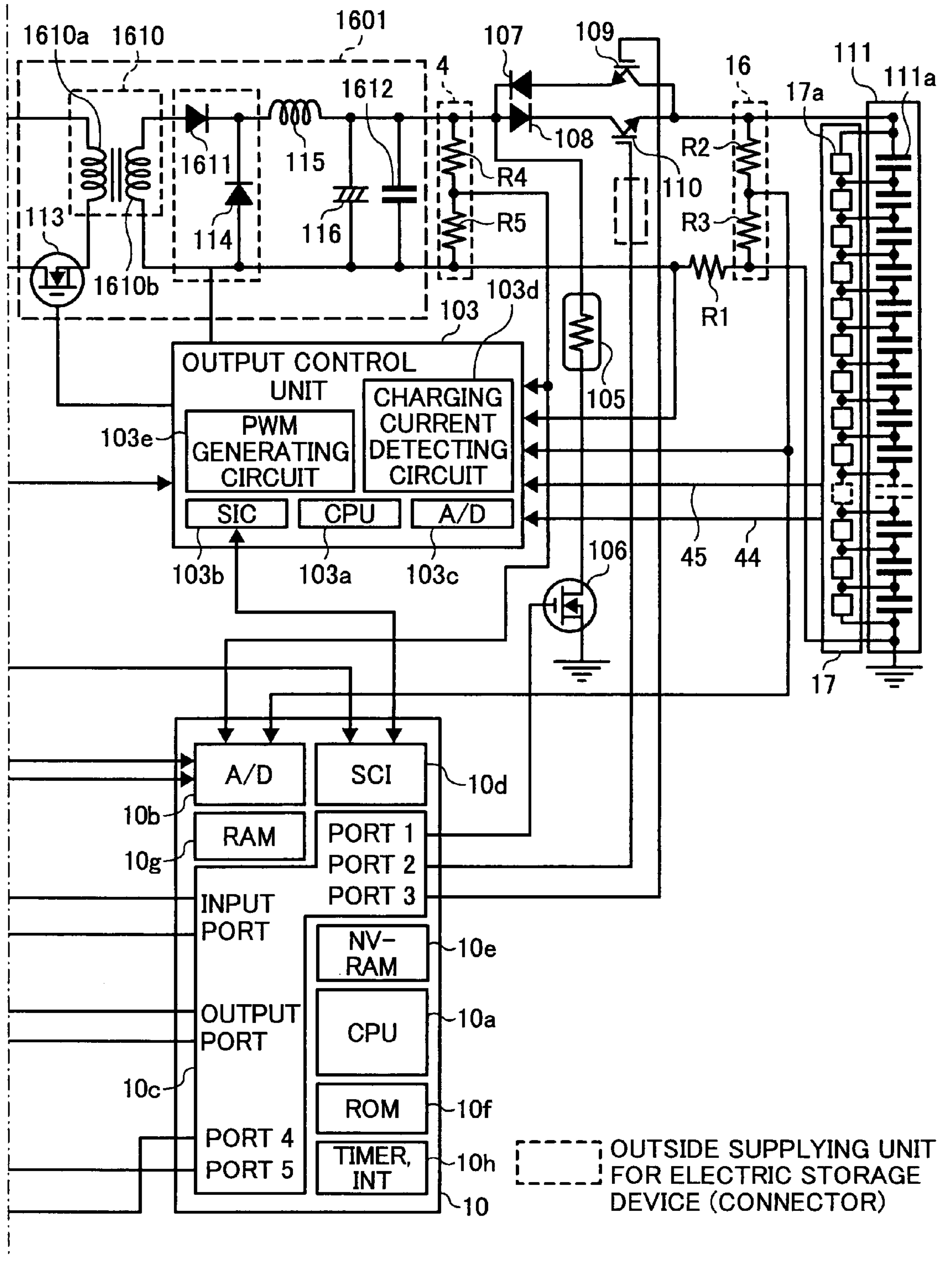

FIG. 19 is a circuit diagram of an image forming apparatus 1600 according to a third embodiment of the present invention. Differently from the image forming apparatus 100, the image forming apparatus 1600 uses a DC/DC converter 1601 that uses a high-frequency transformer instead of the step-down chopper circuit 104.

The DC/DC converter 1601 includes a high-frequency transformer 1610, the FET 113, a diode 1611, a diode 1612, the choke coil 115, the smoothing condenser 116, and the smoothing condenser 102. The high-frequency transformer 1610 includes a first coil 1610*a* and a second coil 1610*b*.

The smoothing condenser 102 is connected to the first coil 1610*a* of the high-frequency transformer 1610 in parallel on a DC output side of the full-wave rectifying circuit 101 in the image forming apparatus 1600. The first coil 1610*a* is serially connected to the FET 113 as switching means.

Likewise of the first embodiment, the FET 113 performs switching (on and off operations) based on PWM signals output from the PWM generating circuit 103*e*. Switching current flows through the first coil 1610*a* in response to switching of the FET 113.

Switching current through the first coil 1610*a* induces switching voltage in the second coil 1610*b* of the high-frequency transformer 1610. Thus, output voltage can be controlled by changing a conduction period of a switching frequency.

The diodes 1611 and 1612 are connected to the second coil 1610*b* of the high-frequency transformer 1610 as a rectifying circuit. Switching voltage is rectified in the rectifying circuit, smoothed by the choke coil 115 and the smoothing condenser 116, and converted into DC output.

The converted DC output passes through the DC fixing heater 105, the diode 108, and the IGBT 110 and is supplied to the capacitor bank 111. Thus, power is stored in the capacitor bank 111.

The stored power in the capacitor bank 111 is supplied through the IGBT 109 and the diode 107 to the DC fixing heater 105.

Otherwise, the image forming apparatus 1600 is basically similar to the image forming apparatus 100 and operates in a similar manner, and therefore, the same explanation is not repeated.

This configuration makes it possible to separate the power storing unit from other circuits. This allows easy implementation in safety standard.

Figure 20:
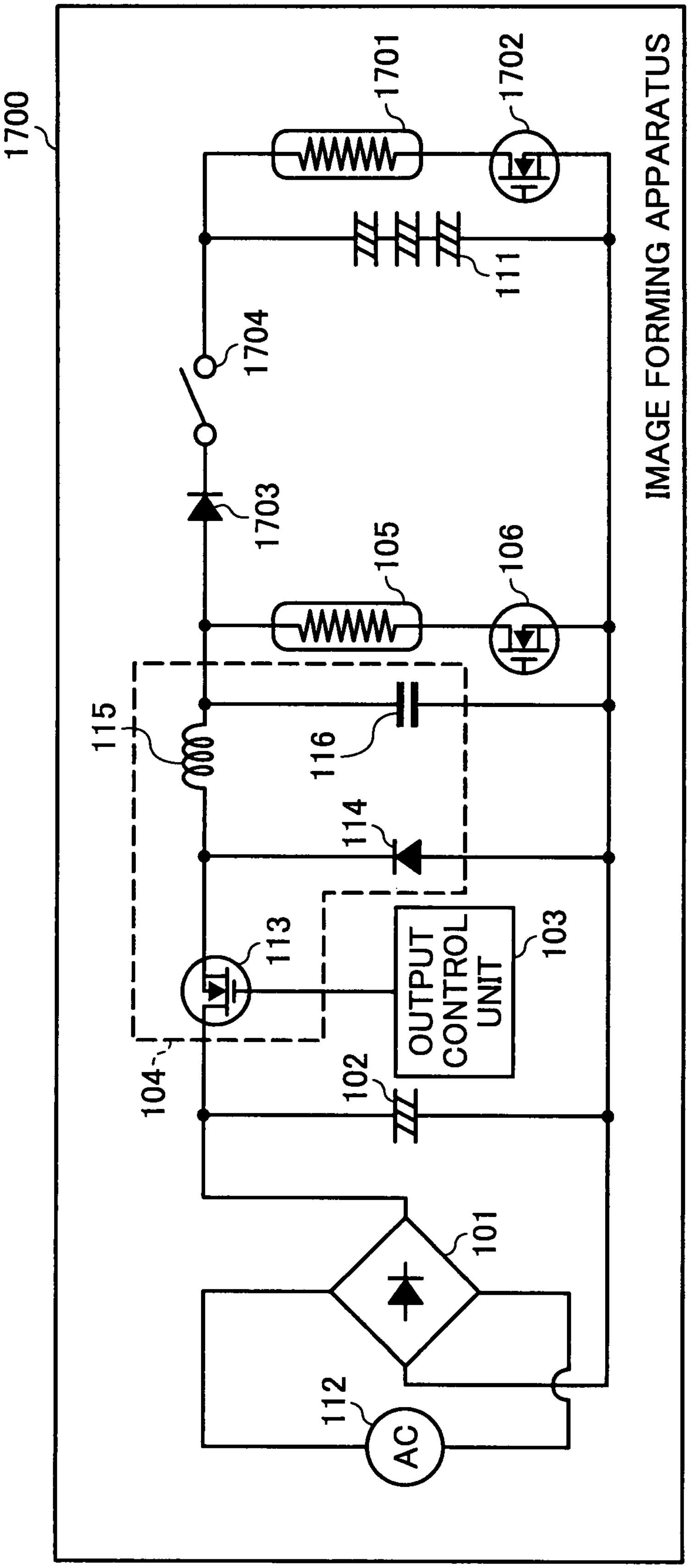
FIG. 20 is a schematic diagram of an image forming apparatus according to a fourth embodiment of the present invention.

FIG. 20 is a schematic diagram of an image forming apparatus 1700 according to a fourth embodiment of the present invention. The image forming apparatus 1700 is different from the image forming apparatus 100 in that the image forming apparatus 1700 further includes a DC fixing heater 1701 and a discharge circuit (FET) 1702, and also, a diode 1703 and a switching circuit 1704 in place of two diodes and two switching circuits.

In the fourth embodiment, the DC fixing heater 1701 is arranged as a secondary heater in addition to the DC fixing heater 105 to which power is supplied from the step-down chopper circuit 104. This makes it possible to reduce starting time for fixing or rapidly recover from falling of fixing temperature.

Figure 21A:
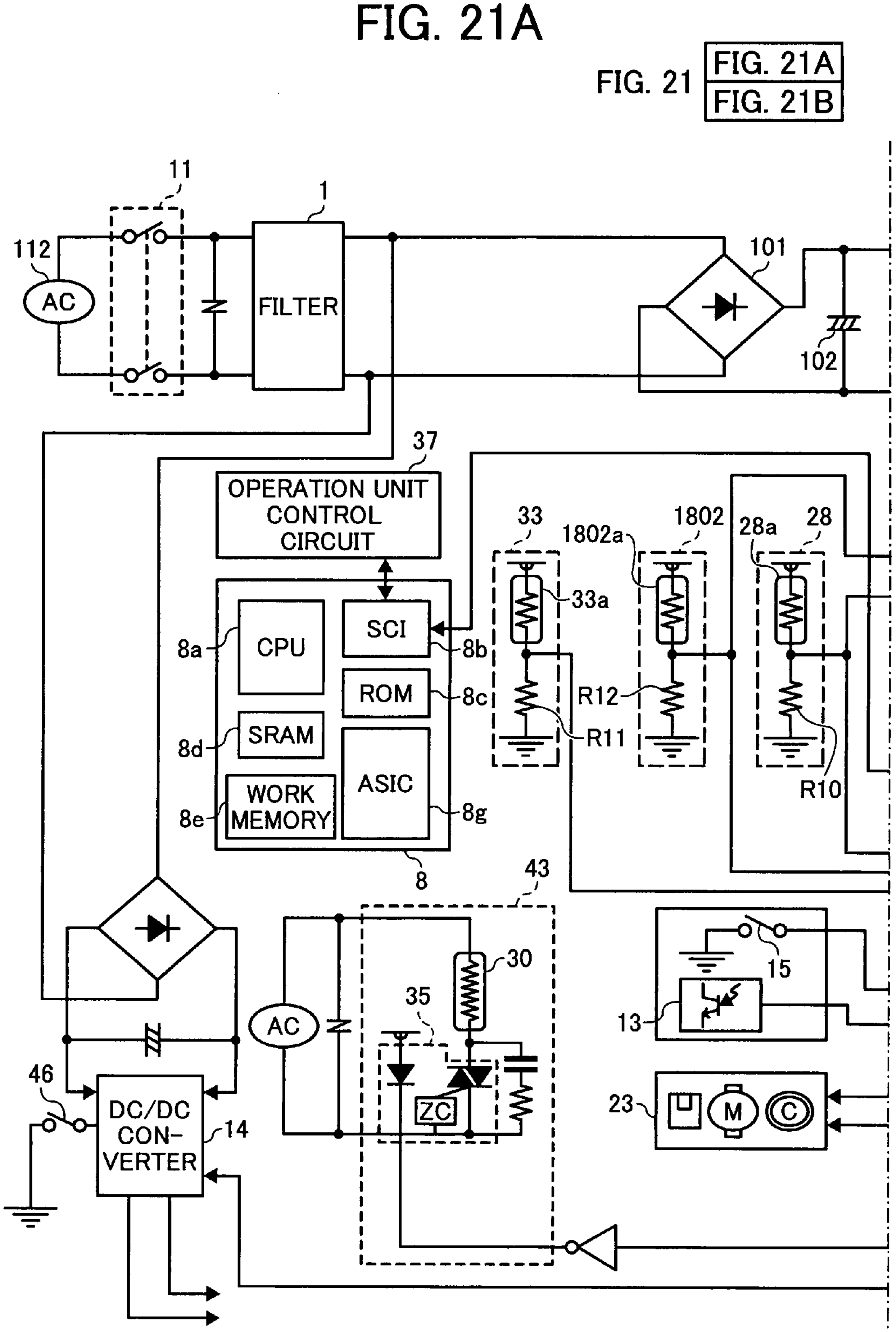
FIG. 21 is a circuit diagram of the image forming apparatus shown in FIG. 20.
Figure 21B:
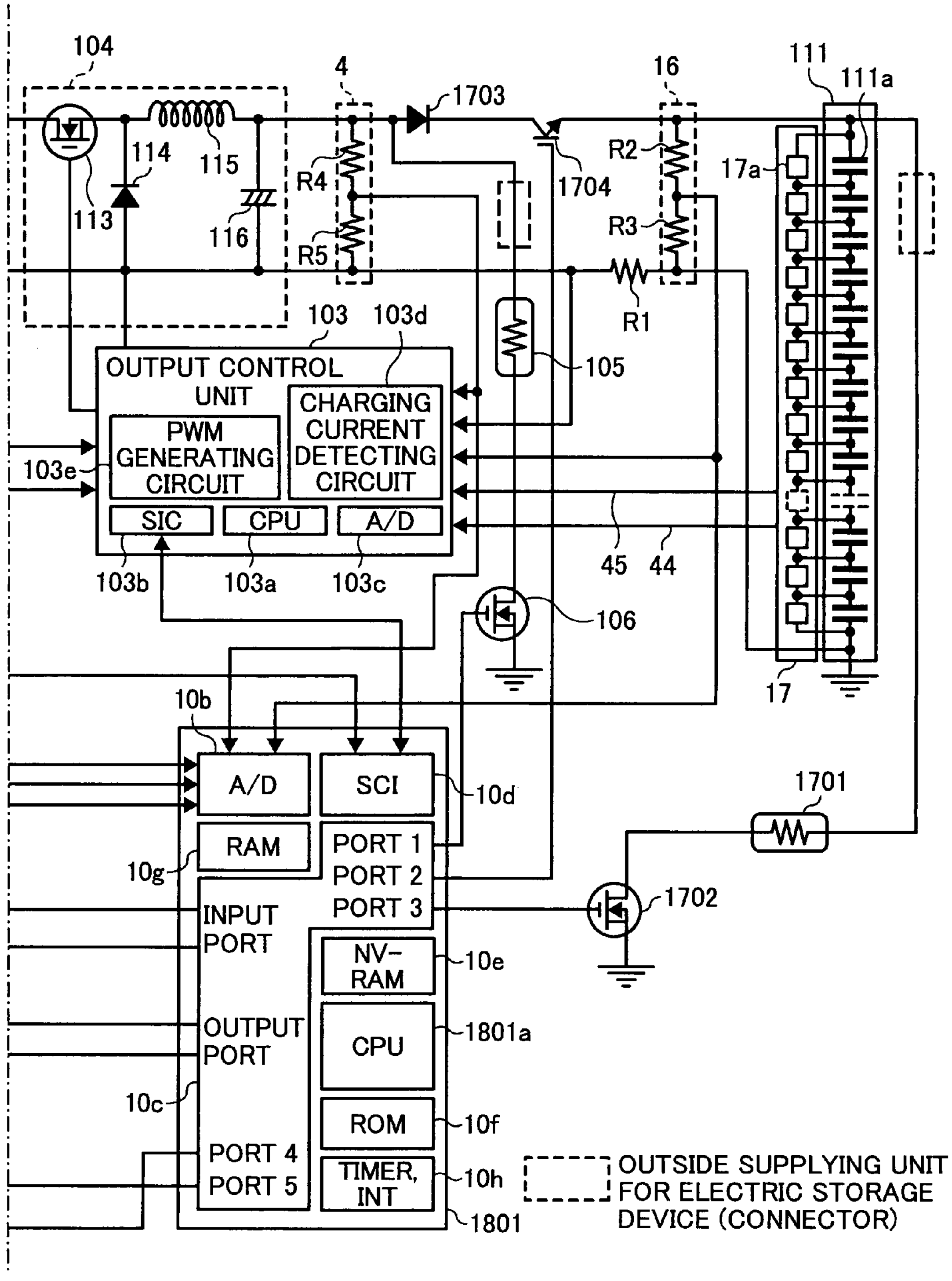

FIG. 21 is a circuit diagram of the image forming apparatus 1700. In addition to the difference above mentioned, the image forming apparatus 1700 differs from the image forming apparatus 100 in that the image forming apparatus 1700 includes an engine control unit 1801 in place of the engine control unit 10, and a temperature detecting circuit 1802.

The engine control unit 1801 is different from the engine control unit 10 in that the CPU 10*a* is changed to a CPU 1801*a* that performs different processing from that of the CPU 10*a*.

The image forming apparatus 1700 performs almost the same charging operation as that in the image forming apparatus 100. Charging is performed when temperature of the fixing roller 21 is higher than the reload temperature. The image forming apparatus 1700 is additionally different from the image forming apparatus 100 in that power charged in the capacitor bank 111 is supplied to the DC fixing heater 1701.

When the main power source is turned on, when energy-saving mode is released, or when temperature of the fixing roller 21 falls below a predetermined temperature during a series of copying operations, the CPU 1801*a* outputs a signal to turn on the FET 1702 from the port 3 and supplies stored power in the capacitor bank 111 to the DC fixing heater 1701.

The temperature detecting circuit 1802 detects temperature in a region of the fixing roller 21 heated by the DC fixing heater 1701.

On the other hand, as shown in FIG. 4, the fixing device 400 according to the first embodiment is explained. The image forming apparatus 1700 includes the DC fixing heater 1701 and a thermistor that is connected to the temperature detecting circuit 1802 and that corresponds thereto besides the configuration in FIG. 4 and the explanation is omitted.

The image forming apparatus 1700 includes two dedicated secondary heaters of the DC fixing heater 105 and the DC fixing heater 1701. Therefore, the AC fixing heater 30 is removed and only these two DC fixing heaters can be implemented in an apparatus that does not need fast copying.

Figure 22:
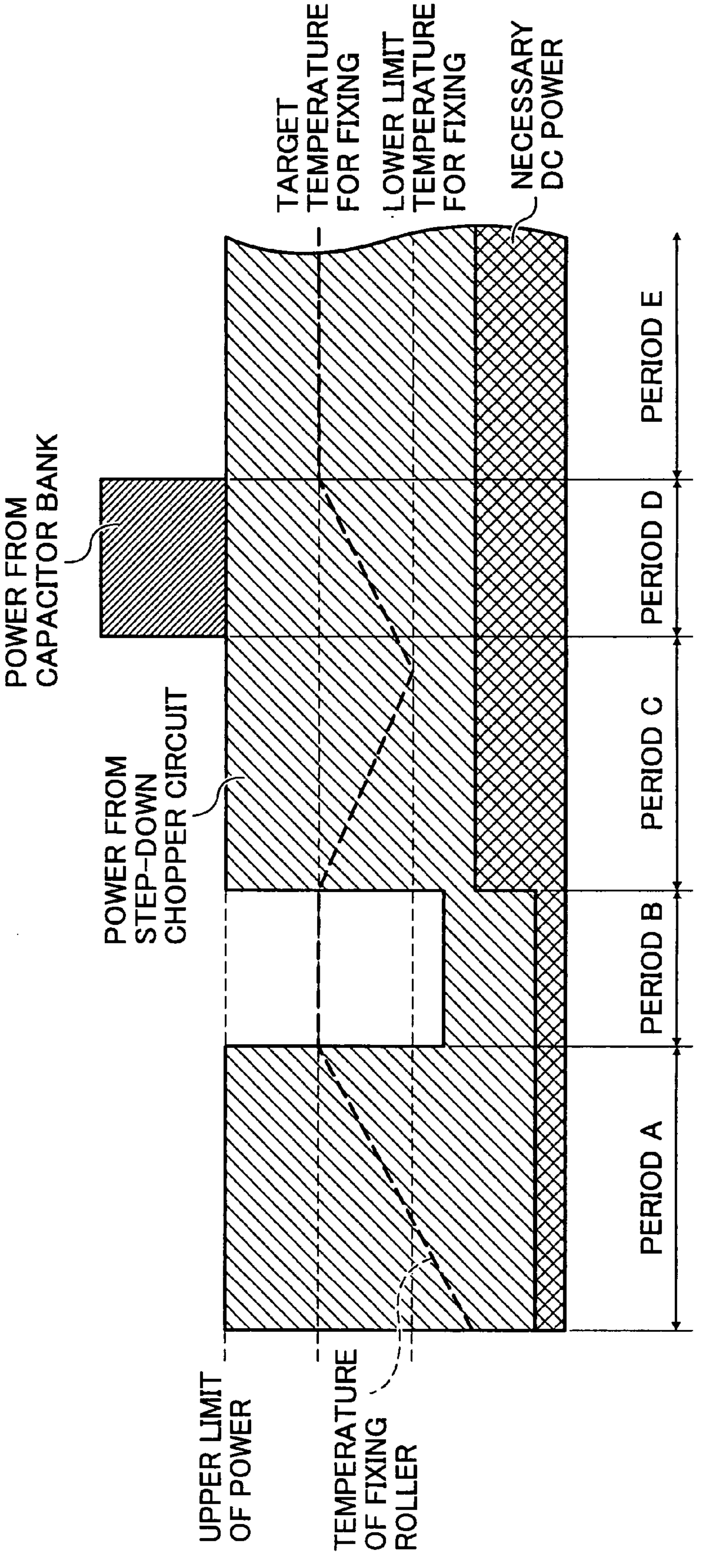
FIG. 22 is a chart of a relation among temperature of a fixing roller, electric power supplied from a step-down chopper circuit, and electric power supplied from a capacitor bank in the image forming apparatus.

FIG. 22 is a chart of a relation among temperature of the fixing roller 21, electric power supplied from the step-down chopper circuit 104, and electric power supplied from the capacitor bank 111 in the image forming apparatus 1700. In FIG. 22, a period A represents a fixing reload period, a period B standby mode period, and periods C to E printing periods. When a fixing temperature decreases due to copying operations in the period C, power is supplied from the step-down chopper circuit 104 to the DC fixing heater 105 in the period D as well as power is supplied from the capacitor bank 111 to the DC fixing heater 1701. This makes it possible to supply power more than upper limit of power in the image forming apparatus 1700. Thus, it is possible to rapidly return temperature of the fixing roller 21 to a target fixing temperature.

Power from the step-down chopper circuit 104 is also supplied in the period D shown in FIG. 22. Accordingly, power supplied from the capacitor bank 111 can be smaller than that in the first embodiment, leading to reduction of a capacitance of the capacitor bank 111. When temperature of the fixing roller reaches the target fixing temperature, power from the capacitor bank 111 stops supplying and only power from the step-down chopper circuit 104 is supplied.

As shown in FIG. 6, a series of copying operations in the first embodiment is explained. Additional different processing is performed in the fourth embodiment. More specifically, the processing is performed between steps S502 and S505. The CPU 1801*a* transmits a pulse width modulation pattern for starting fixing to the CPU 103*a* of the output control unit 103. The pulse width modulation pattern for starting fixing is used when supplying power from the step-down chopper circuit 104 to the DC fixing heater 105 in starting fixing. The pulse width modulation pattern makes it possible to prevent rush current or overshoot in temperature of the heating unit. The CPU 1801*a* transmits a starting mode signal to the CPU 103*a*. The other processing is the same as that in FIG. 6 and the explanation is omitted. Processing that uses a starting mode signal is later-explained.

Figure 23A:
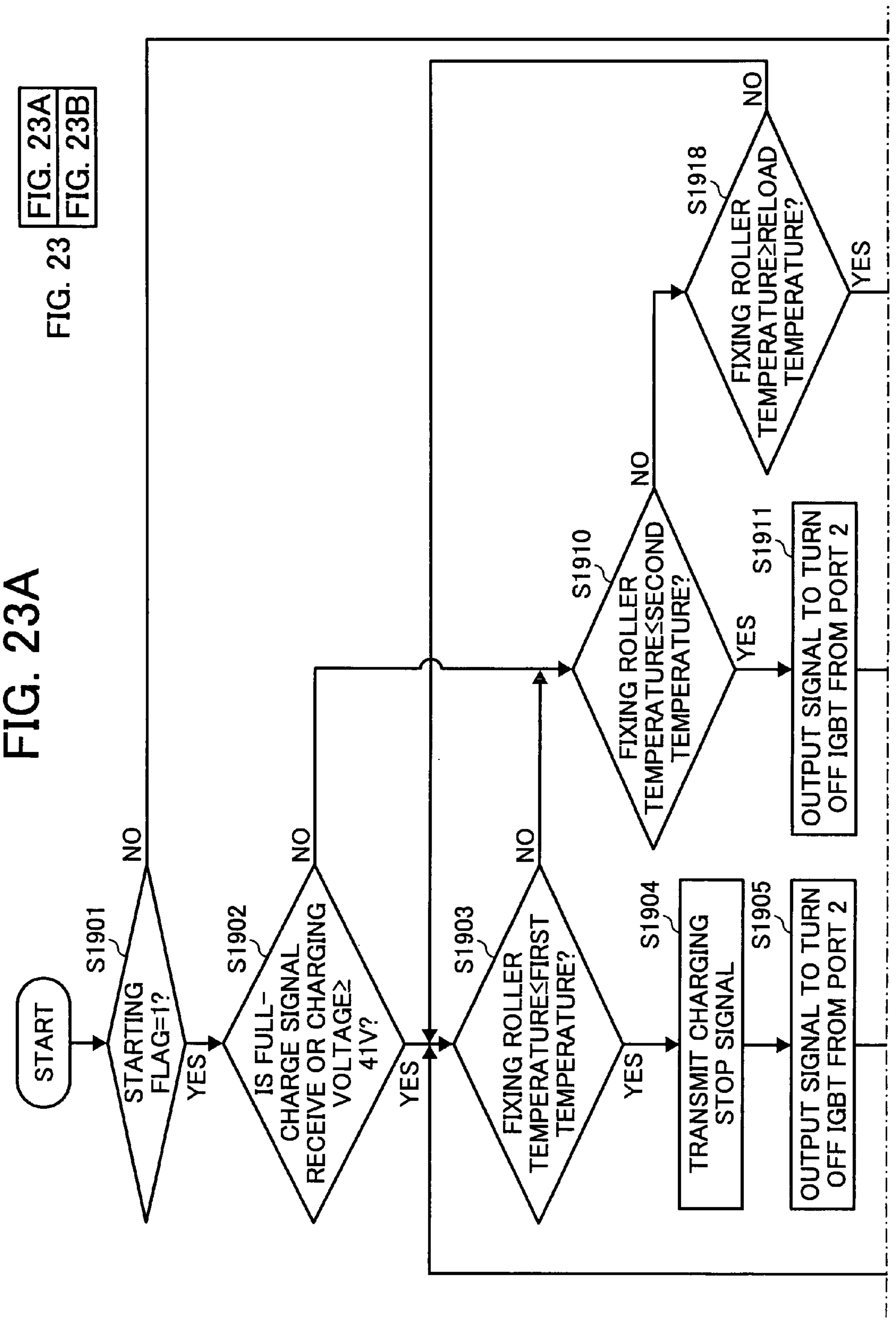
FIG. 23 is a flowchart of a processing procedure of starting fixing through two DC fixing heaters under control of a CPU of an engine control unit shown in FIG. 21.
Figure 23B:
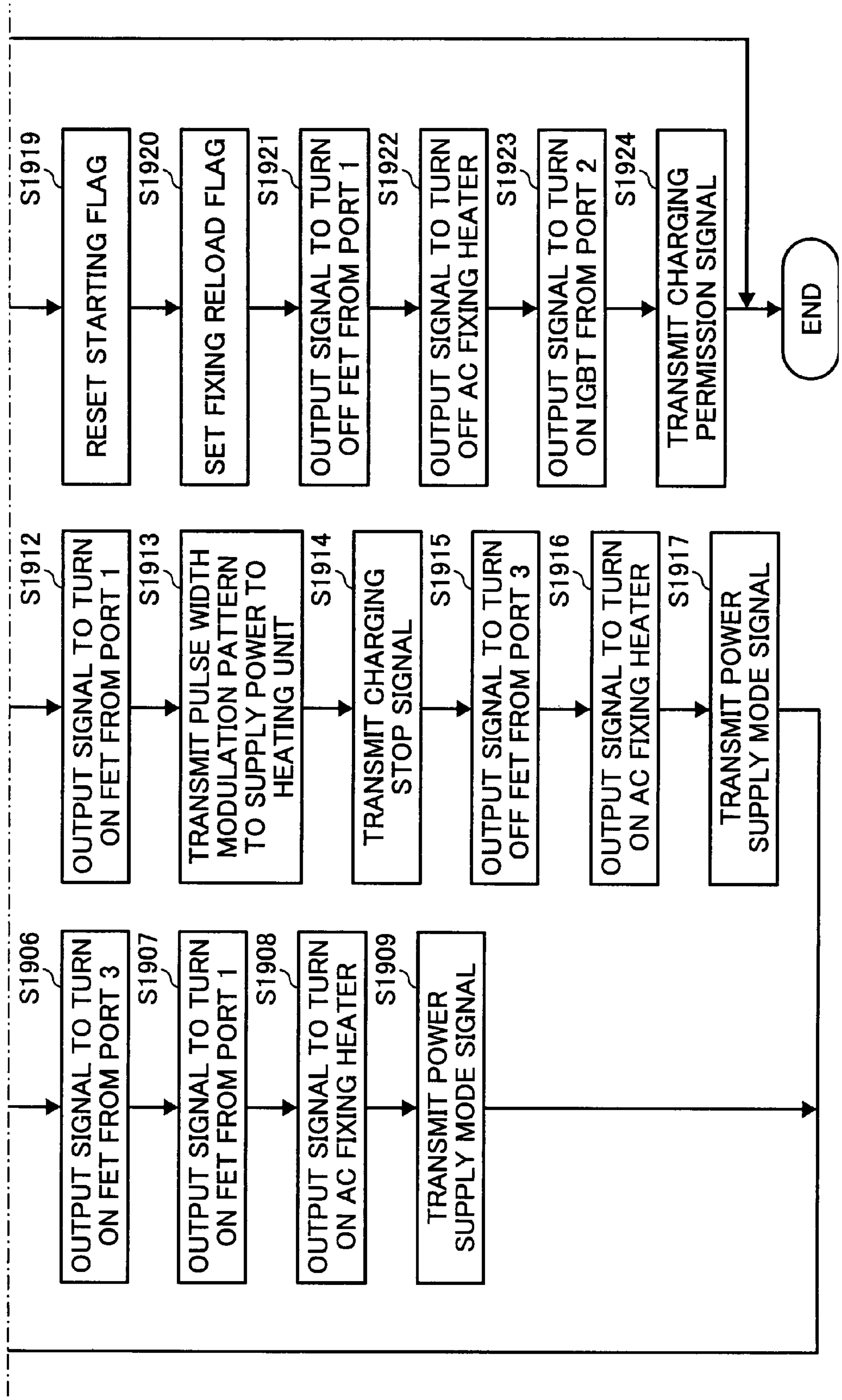

FIG. 23 is a flowchart of a processing procedure of starting fixing through the DC fixing heater 105 and the DC fixing heater 1701 under control of the CPU 1801*a* of the engine control unit 1801.

FIG. 23 depicts that power is supplied from the step-down chopper circuit 104 to one DC fixing heater 105 when starting fixing, power is also discharged from the capacitor bank 111 to the other DC fixing heater 1701 and, when temperature of the fixing roller 21 exceeds a predetermined temperature, discharging power through the DC fixing heater 1701 is stopped and power is supplied only from the step-down chopper circuit 104. A large amount of power is kept stored in advance in the capacitor bank 111.

The CPU 1801*a* of the engine control unit 1801 first checks whether a starting flag is set (step S1901). The starting flag is the same as that in the first embodiment as shown in FIG. 6. When the starting flag is not set to '1' (No at step S1901), the processing ends.

When the starting flag is set to '1' (Yes at step S1901), the CPU 1801*a* of the engine control unit 1801 checks through the A/D converter 10*b* whether a full-charge signal is received from the output control unit 103 or charging voltage in the capacitor bank 111 is equal to or larger than 41 volts (step S1902).

When a full-charge signal is received from the output control unit 103 or the charging voltage is equal to or larger than 41 volts (Yes at step S1902), the CPU 1801*a* checks through the A/D converter 10*b* whether temperature of the fixing roller 21 is equal to or less than a first temperature (step S1903). The temperature is detected by at least one of the temperature detecting circuits 28, 33, and 1802. The first temperature is, for example, 170 degrees centigrade.

When temperature of the fixing roller 21 is equal to or less than the first temperature (Yes at step S1903), the CPU 1801*a* transmits a charging stop signal to stop charging to the output control unit 103 (step S1904).

The CPU 1801*a* outputs a signal to turn off the IGBT 1704 from the port 2 to stop power supply to the capacitor bank 111 (step S1905).

The CPU 1801*a* outputs a signal to turn on the FET 1702 from the port 3 to supply stored power in the capacitor bank 111 to the DC fixing heater 1701 (step S1906).

The CPU 1801*a* outputs a signal to turn on the FET 106 from the port 1 to supply power to the DC fixing heater 105 (step S1907).

The CPU 1801*a* outputs a signal to turn on the AC fixing heater 30 from the port 4 (step S1908). Then, the CPU 1801*a* transmits a power supply mode signal to the output control unit 103 (step S1909).

Then, the process control returns to step S1903. This processing is performed until temperature of the fixing roller 21 exceeds the first temperature.

When temperature of the fixing roller 21 exceeds the first temperature (No at step S1903) or when a full-charge signal is not received or the charging voltage in the capacitor bank 111 is less than 41 volts (No at step S1902), the CPU 1801*a* checks whether temperature of the fixing roller 21 is equal to or less than a second temperature (step S1910). The second temperature is, for example, 178 degrees centigrade.

When temperature of the fixing roller 21 is equal to or less than the second temperature (Yes at step S1910), the CPU 1801*a* outputs a signal to turn off the IGBT 1704 from the port 2 (step S1911).

The CPU 1801*a* outputs a signal to turn on the FET 106 from the port 1 (step S1912).

The CPU 1801*a* transmits a pulse width modulation pattern to supply power to the DC fixing heater 105 to the output control unit 103 (step S1913). The CPU 1801*a* can transmit a voltage value to supply power to the DC fixing heater 105 to the output control unit 103.

The CPU 1801*a* transmits a charging stop signal to stop charging (step S1914).

The CPU 1801*a* outputs a signal to turn off the FET 1702 from the port 3 (step S1915).

The CPU 1801*a* outputs a signal to turn on the AC fixing heater 30 from the port 4 (step S1916).

The CPU 1801*a* transmits a power supply mode signal to the output control unit 103 (step S1917). The series of processing causes power to be supplied from the step-down chopper circuit 104 to the DC fixing heater 105 without using the capacitor bank 111.

In other words, when the main power source is turned on or when energy-saving mode is released in the image forming apparatus 1700 and when temperature of the fixing roller 21 exceeds the first temperature (170 degrees centigrade) and is equal to or less than the second temperature (178 degrees centigrade), the above processing is performed (steps S1911 to S1917).

When temperature of the fixing roller 21 exceeds the second temperature (No at step S1910), the CPU 1801*a* checks whether temperature of the fixing roller reaches the reload temperature (step S1918).

When temperature of the fixing roller does not reach the reload temperature (No at step S1918), the process control returns to step S1903. When temperature of the fixing roller 21 exceeds the first temperature and is equal to or less than the second temperature, power supply to the DC fixing heater 105 continues from the step-down chopper circuit 104.

When the fixing roller reaches the reload temperature (Yes at step S1918), a starting flag is reset (step S1919). That is, the starting flag is set to '0'.

The CPU 1801*a* sets a fixing reload flag (step S1920). The CPU 1801*a* outputs a signal to turn off the FET 106 from the port 1 (step S1921).

The CPU 1801*a* outputs a signal to turn off the AC fixing heater 30 from the port 4 (step S1922).

The CPU 1801*a* outputs a signal to turn on the IGBT 1704 to charge from the port 2 (step S1923). Then, the CPU 1801*a* transmits a charging permission signal (step S1924). Such procedure leads to starting fixing in the image forming apparatus 1700.

Figure 24A:
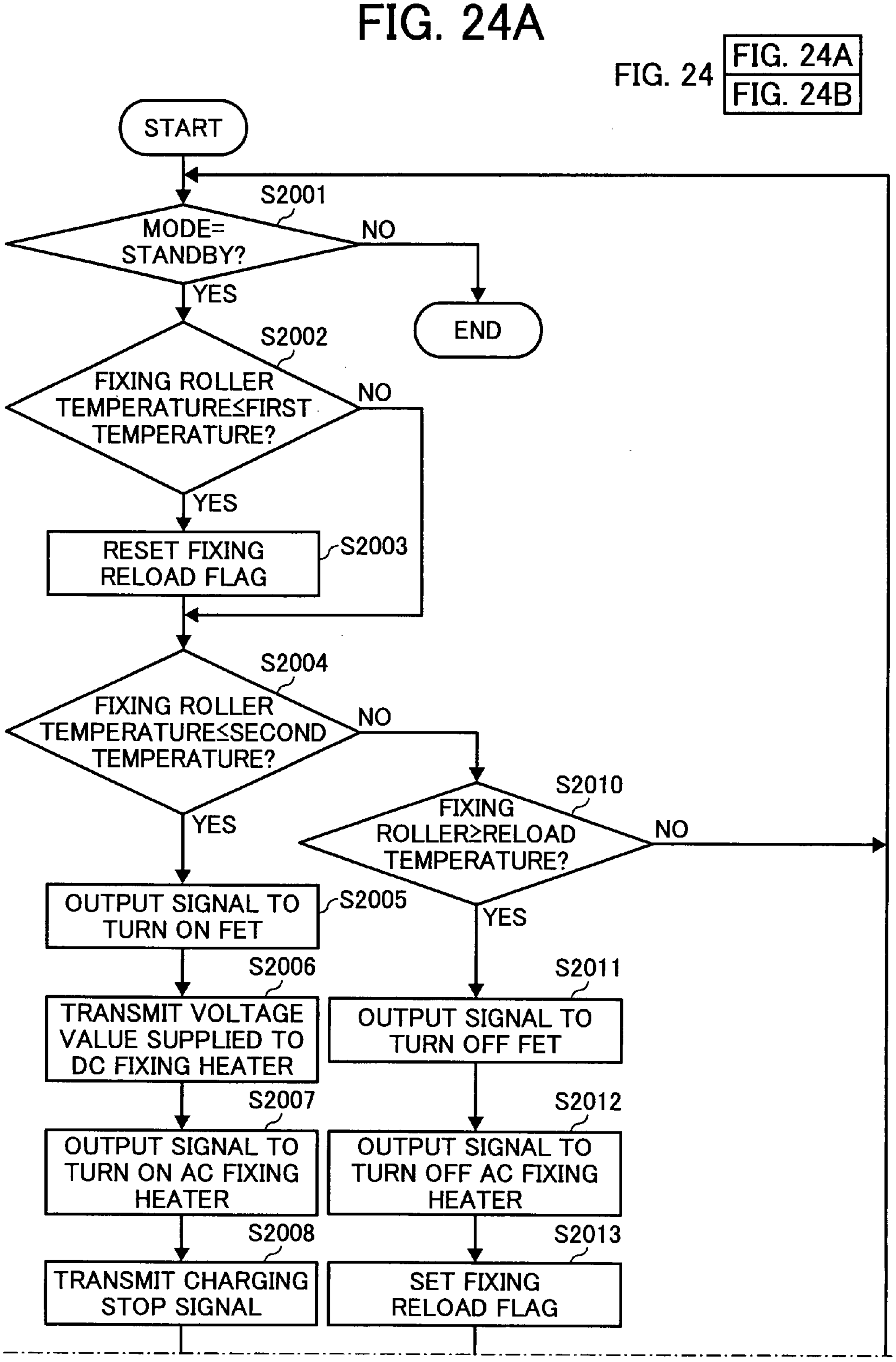
FIG. 24 is a flowchart of a processing procedure of controlling a fixing temperature through the CPU of the engine control unit when the image forming apparatus is in standby mode.
Figure 24B:
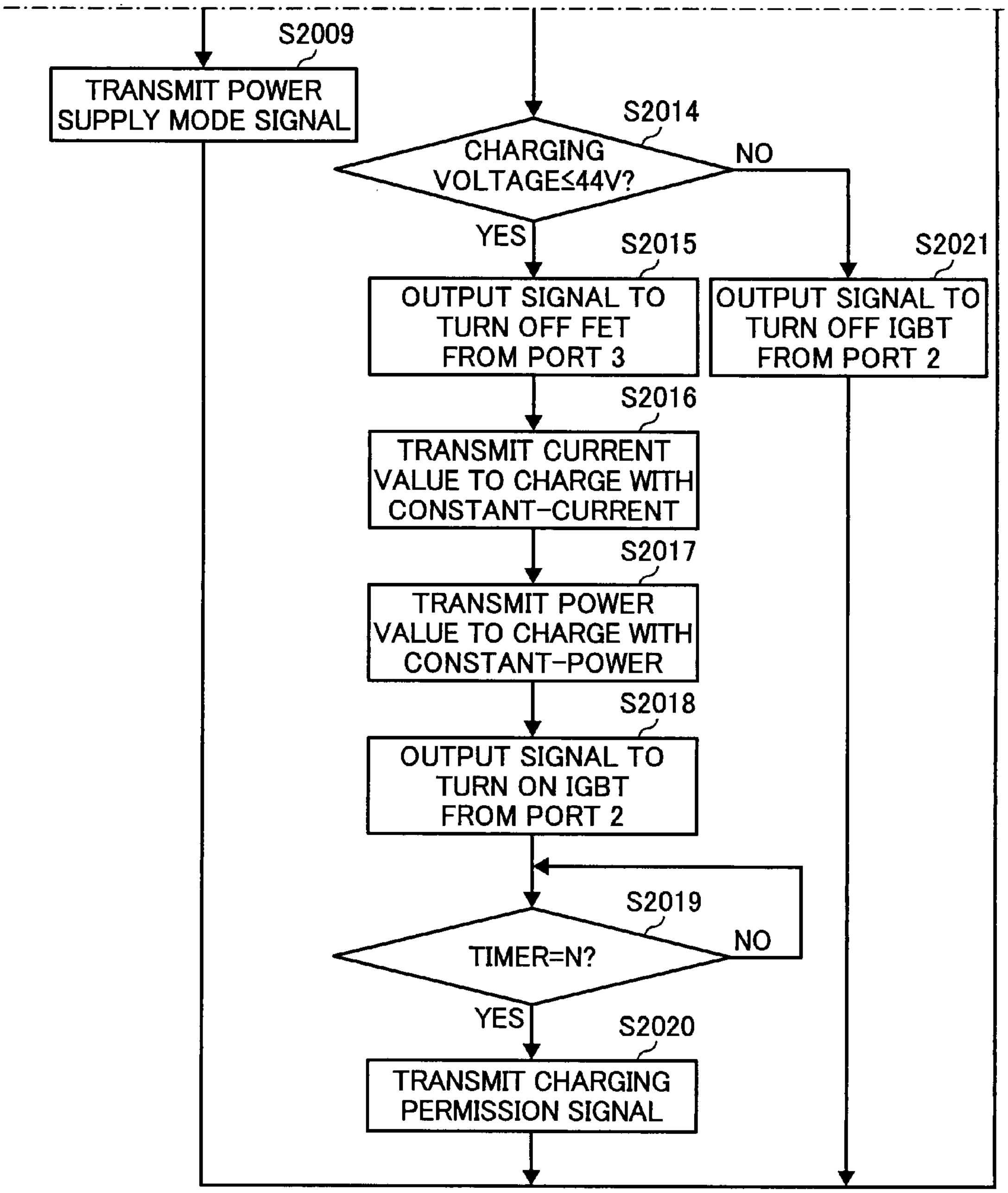

FIG. 24 is a flowchart of a processing procedure of controlling a fixing temperature through the CPU 1801*a* of the engine control unit 1801 when the image forming apparatus 1700 is in standby mode.

FIG. 24 depicts control of the AC fixing heater 30 during standby, the DC fixing heater 105 to which power is supplied from the step-down chopper circuit 104, a charging permission signal that is transmitted for charging.

Processing of FIG. 24 is performed in the same manner as previously described for the first embodiment in connection with FIG. 11. What is different from the processing in FIG. 11 is that signal output to turn off the IGBT from the port 3 at step S721 is not performed in FIG. 24. In addition, the signal from the port 3 is not output to the IGBT 109 but to the FET 1702. The other processing is the same as previously described in connection with FIG. 11, and the explanation is omitted.

Figure 25A:
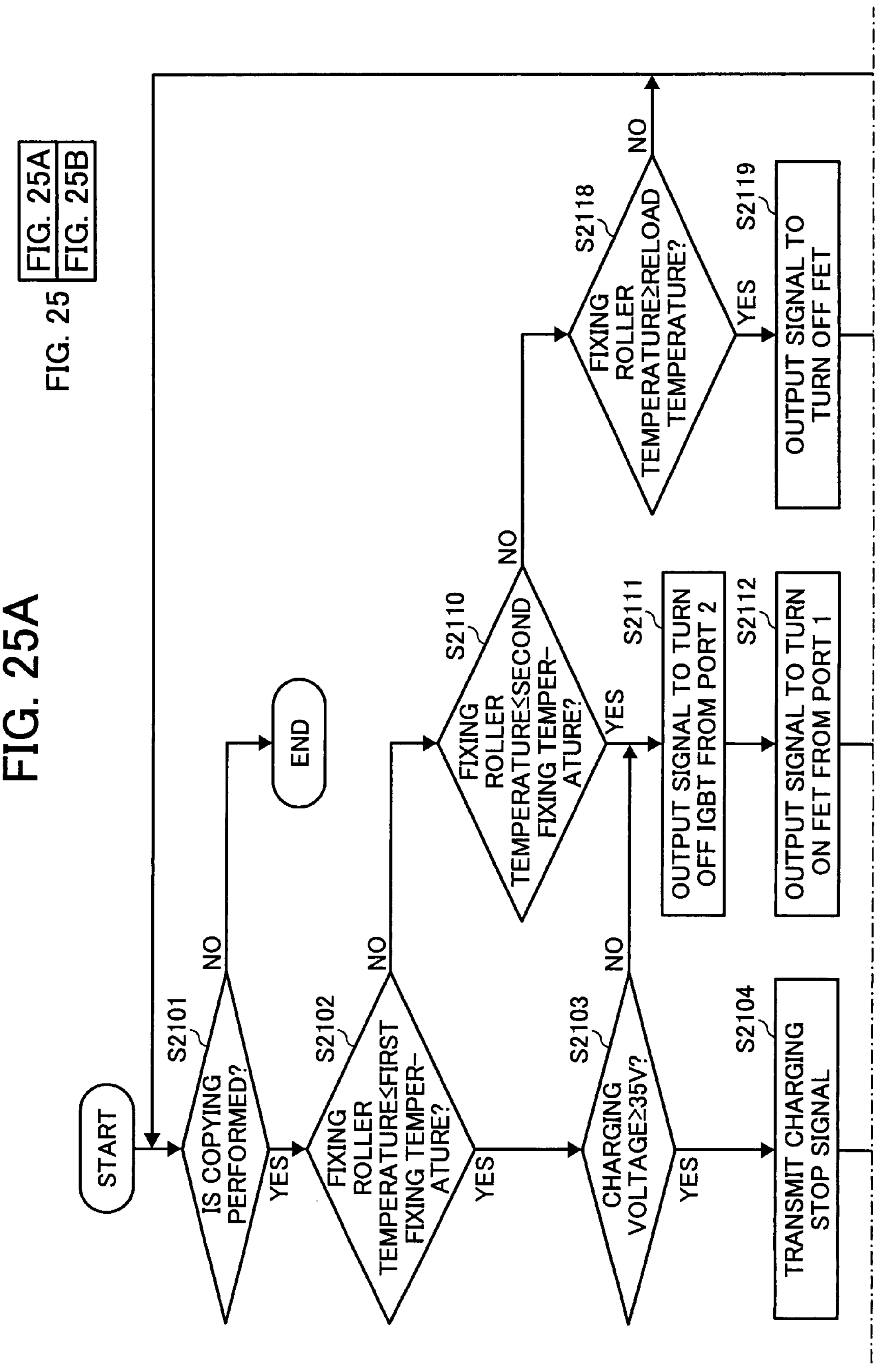
FIG. 25 is a flowchart of a processing procedure of controlling the DC fixing heaters to maintain a fixing temperature during a series of copying operations through a CPU of the image forming apparatus.
Figure 25B:
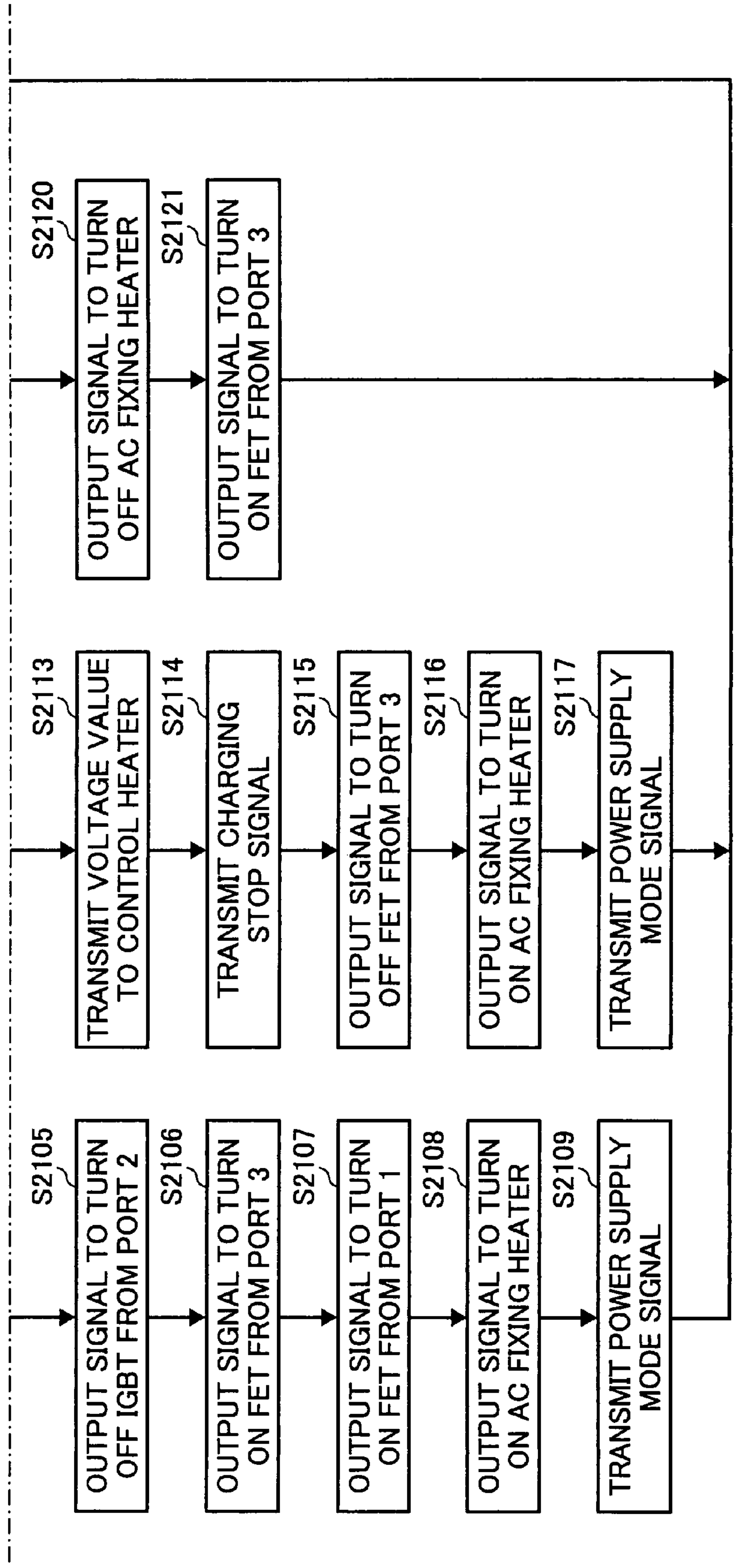

FIG. 25 is a flowchart of a processing procedure of controlling the DC fixing heater 105 and the DC fixing heater 1701 to maintain a fixing temperature during a series of copying operations through the CPU 1801*a* of the engine control unit 1801.

FIG. 25 depicts control of power supply from the step-down chopper circuit 104 to the DC fixing heater 105 during a series of copying operations and power supply from the AC fixing heater control circuit 43 to the AC fixing heater 30. When temperature of the fixing roller 21 is equal to or less than the first predetermined fixing temperature (falling of temperature), stored power of the capacitor bank 111 is used to supply it to the Dc fixing heater 1701. When the temperature of the fixing roller 21 is equal to or higher than the first predetermined fixing temperature and returns to the second predetermined fixing temperature or less, the CPU 1801*a* stops using stored power in the capacitor bank 111.

First, the CPU 1801*a* checks whether the image forming apparatus 1700 is in a copying operation (step S2101). When the image forming apparatus 1700 is not in a copying operation (No at step S2101), the processing ends.

When the image forming apparatus 1700 is in a copying operation (Yes at step S2101), the CPU 1801*a* checks whether temperature of the fixing roller 21 is equal to or less than a first fixing temperature (step S2102). For example, the first fixing temperature is 160 degrees centigrade. This checking detects whether there is a fall in temperature.

Subsequently, when temperature of the fixing roller 21 is equal to or less than the first fixing temperature (Yes at step S2102), the CPU 1801*a* checks charging voltage in the capacitor bank 111 (step S2103).

When the charging voltage in the capacitor bank 111 is equal to or larger than 35 volts (Yes at step S2102), the CPU 1801*a* transmits a charging stop signal to stop charging to the CPU 103*a* (step S2104).

The CPU 1801*a* outputs a signal to turn off the IGBT 110 from the port 2 to stop supplying power to the capacitor bank 111 (step S2105).

The CPU 1801*a* outputs a signal to turn on the FET 1702 from the port 3 to supply stored power in the capacitor bank 111 to the DC fixing heater 1701 (step S2106).

The CPU 1801*a* outputs a signal to turn on the FET 106 from the port 1 to supply power from the step-down chopper circuit 104 to the DC fixing heater 105 (step S2107). The CPU 1801*a* outputs a signal to turn on the AC fixing heater 30 from the port 4 (step S2108). The CPU 1801*a* outputs a power supply mode signal to the output control unit 103 (step S2109).

The first fixing temperature is 160 degrees centigrade at step S2102. The processing at steps S2103 to S2109 is repeated until temperature of the fixing roller 21 exceeds 175 degrees centigrade. In other words, a starting condition of the processing at steps S2103 to S2109 is 160 degrees centigrade of the first fixing temperature and an ending condition thereof is 175 degrees centigrade of the first fixing temperature.

When temperature of the fixing roller 21 exceeds the first fixing temperature (for example, 175 degrees centigrade) (No at step S2102), the CPU 1801*a* checks through the A/D converter 10*b* whether it is equal to or less than the second fixing temperature (for example, 178 degrees centigrade) (step S2110).

When temperature of the fixing roller 21 is equal to or less than the second temperature (Yes at step S2110), the CPU 1801*a* outputs a signal to turn off the IGBT 110 from the port 2 (step S2111).

The CPU 1801*a* outputs a signal to turn on the FET 106 from the port 1 (step S2112). The CPU 1801*a* transmits a voltage value to supply power to the DC fixing heater 105 to the output control unit 103 (step S2113). The CPU 1801*a* can transmit a pulse width modulation pattern instead of a voltage value.

The CPU 1801*a* transmits a charging stop signal to stop charging (step S2114). Then, the CPU 1801*a* outputs a signal to turn off the FET 1702 from the port 3 (step S2115).

The CPU 1801*a* outputs a signal to turn on the Ac fixing heater 30 from the port 4 (step S2116). This makes power supply from the capacitor bank 111 stop.

The CPU 1801*a* transmits a power supply mode signal to the output control unit 103 to supply power to the fixing roller 21 (step S2117). This processing leads to power supply from the step-down chopper circuit 104 to the DC fixing heater 105.

When temperature of the fixing roller 21 exceeds the second fixing temperature (No at step S 2110), the CPU 1801*a* checks whether temperature of the fixing roller 21 reaches the reload temperature (step S2118).

When temperature of the fixing roller 21 does not reach the reload temperature (No at step S2118), the process control returns to step S2101. In other words, when temperature of the fixing roller 21 is equal to or higher than the second fixing temperature in a copying operation, power is continued to be supplied from the step-down chopper circuit 104 to the DC fixing heater 105 and from the AC fixing heater control circuit 43 to the AC fixing heater 30.

When temperature of the fixing roller 21 reaches the reload temperature (Yes at step S2118), the CPU 1801*a* outputs a signal to turn off the FET 106 from the port 1 (step S2119). The CPU 1801*a* outputs a signal to turn off the AC fixing heater 30 from the port 4 (step S2120). Thus, copying operation continue.

Figures 26, 26A:
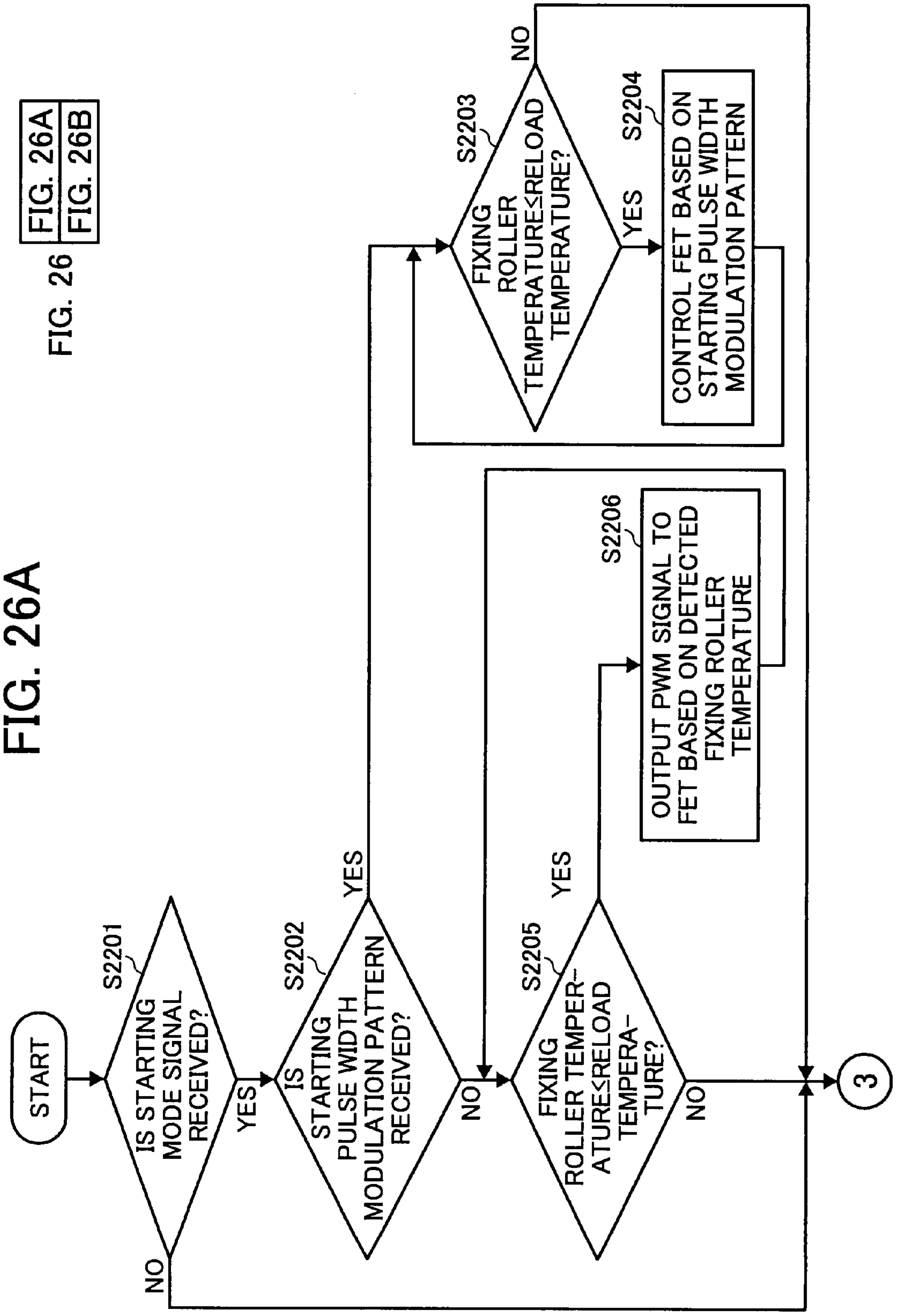
FIG. 26 is a flowchart of a processing procedure of supplying electric power to the DC fixing heaters through a CPU of an output control unit shown in FIG. 20.
Figure 26B:
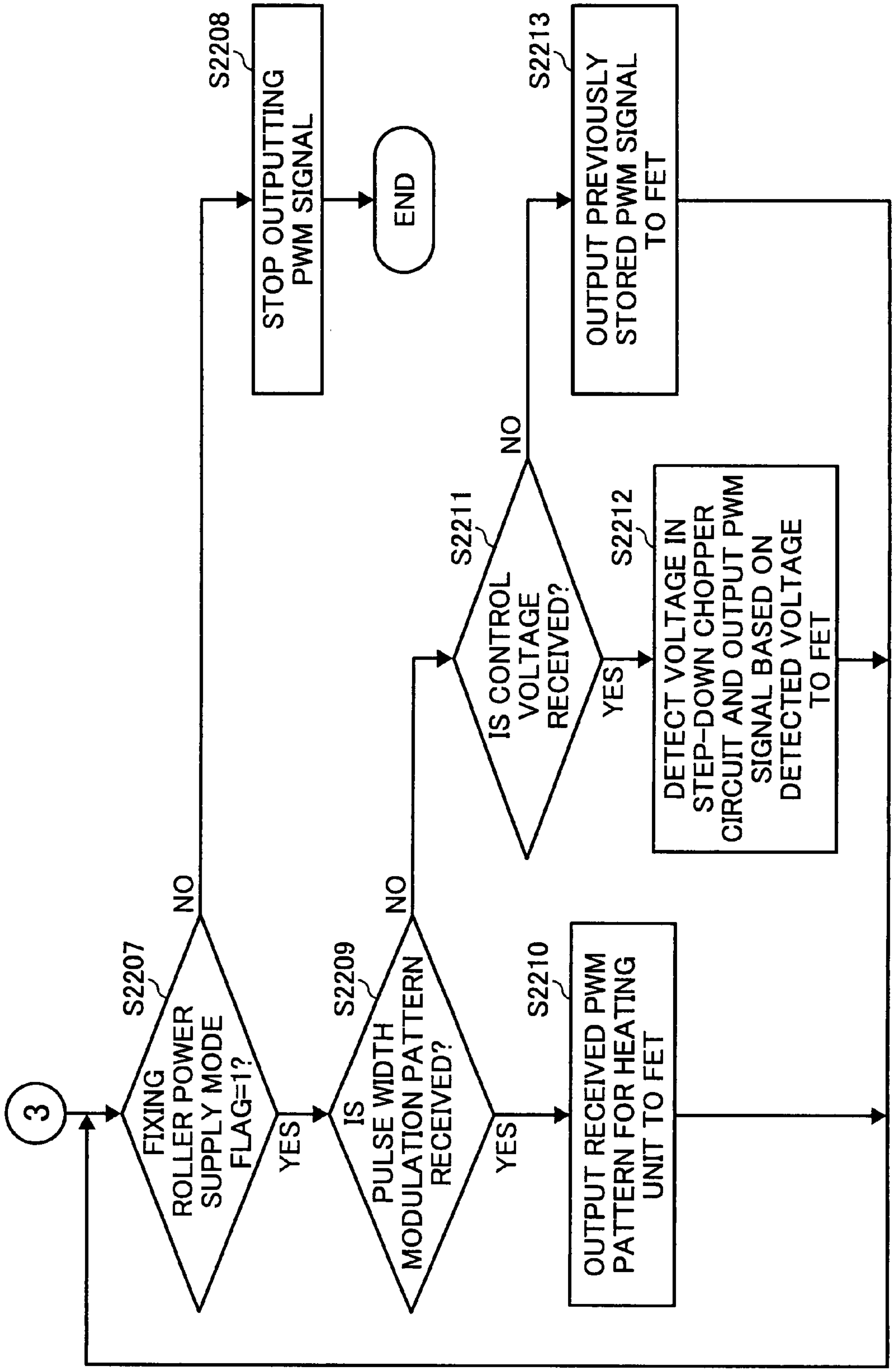

FIG. 26 is a flowchart of a processing procedure of supplying electric power to the DC fixing heater 105 through the CPU 103*a* of the output control unit 103.

First, the CPU 103*a* checks whether a starting mode signal is received from the CPU 10*a* (step S2201).

When the starting mode signal is received (Yes at step S2201), the CPU 103*a* checks whether a pulse width modulation pattern is received from the engine control unit 1801 (step S2202). The CPU 103*a* can receive a voltage value to supply power instead of a pulse width modulation pattern. In this case, the CPU 103*a* generates a pulse width modulation pattern based on the received voltage value. The FET 113 is controlled based on this pulse width modulation pattern, thereby decreasing voltage to an appropriate level.

When a pulse width modulation pattern is received (Yes at step S 2202), the CPU 103*a* checks whether temperature of the fixing roller 21 reaches a set temperature (reload temperature) (step S2203). When temperature of the fixing roller 21 does not reach the reload temperature (Yes at step S2203), the CPU 103*a* outputs a pulse width modulation signal generated based on a pulse width modulation pattern to prevent rush current by the PWM generating circuit 103*e* to the gate of the FET 113 of the step-down chopper circuit 104 (step S2204).

When a pulse width modulation pattern is not received from the engine control unit 1801 (No at step S 2202), the CPU 103*a* checks whether temperature of the fixing roller 21 reaches a set temperature (reload temperature) (step S2205).

When temperature of the fixing roller 21 does not reach the set temperature (Yes at step S2205), the PWM generating circuit 103*e* generates, to prevent rush current, a pulse width modulation signal based on detected temperature of the fixing roller and outputs the pulse width modulation signal to the gate of the FET 113 in the step-down chopper circuit 104 (step S2206). Then, the CPU 103*a* checks again whether temperature of the fixing roller 21 reaches the set temperature (step S2205). These operations are repeated until temperature of the fixing roller 21 reaches the set temperature.

When a starting mode signal is not received (No at step S2201), and temperature of the fixing roller 21 reaches the preset temperature (No at step S2203 and step S2205), the CPU 103*a* checks whether a power supply mode flag of the fixing roller 21 is set to '1' (step S2207).

When the power supply mode flag of the fixing roller 21 is set to '1' (Yes at step S2207), power can be supplied from the step-down chopper circuit 104 to the DC fixing heater 105, and it is checked whether a pulse width modulation pattern is received from the engine control unit 1801 (step S2209).

When a pulse width modulation pattern is received (Yes at step S2209), the PWM generating circuit 103*e* outputs a pulse width modulation signal based on the received pulse width modulation pattern to the gate of the FET 113 in the step-down chopper circuit 104 (step S2210). Then, the process control returns to step S2207. These operations are repeated until the power supply mode flag is reset (when it is set to '0').

When a pulse width modulation pattern is not received (No at step S2209), the CPU 103*a* checks whether control voltage is received from the CPU 10*a* (step S2211).

When control voltage is received (Yes at step S2211), the PWM generating circuit 103*e* detects voltage output to the FET 113 based on control voltage received from the step-down chopper circuit 104, and outputs a pulse width modulation signal to achieve a suitable voltage based on the detected voltage to the FET 113 (step S2212).

When control voltage is not received (No at step S2211), the PWM generating circuit 103*e* outputs a previously stored pulse width modulation signal to the FET 113 (step S2213). The operations are also repeated until the power supply mode flag is reset.

When a power supply mode flag is not '1' (reset) (No at step S2207), the PWM generating circuit 103*e* stops outputting a pulse width modulation signal (step S2208), and the processing ends.

The above processing allows power to be supplied with constant-power to the DC fixing heater 105 in the image forming apparatus 1700.

The above processing makes voltage in the step-down chopper circuit 104 detected and a pulse width modulation signal is output based on the voltage. As a result, irrespective of variation of power supplied from the AC power source 112, power with constant voltage can be supplied and, thus, fixing temperature can be controlled with higher accuracy.

A pulse width modulation signal is controlled in response to detected temperature in the above processing so that rush current to the DC fixing heater 105 at low temperature can be prevented. A pulse width modulation signal is output based on a previously stored pattern, thereby enabling prevention of rush power. These operations lead to prevention of overshoot when starting fixing, which makes it possible to take measures against flickers.

Figure 27:
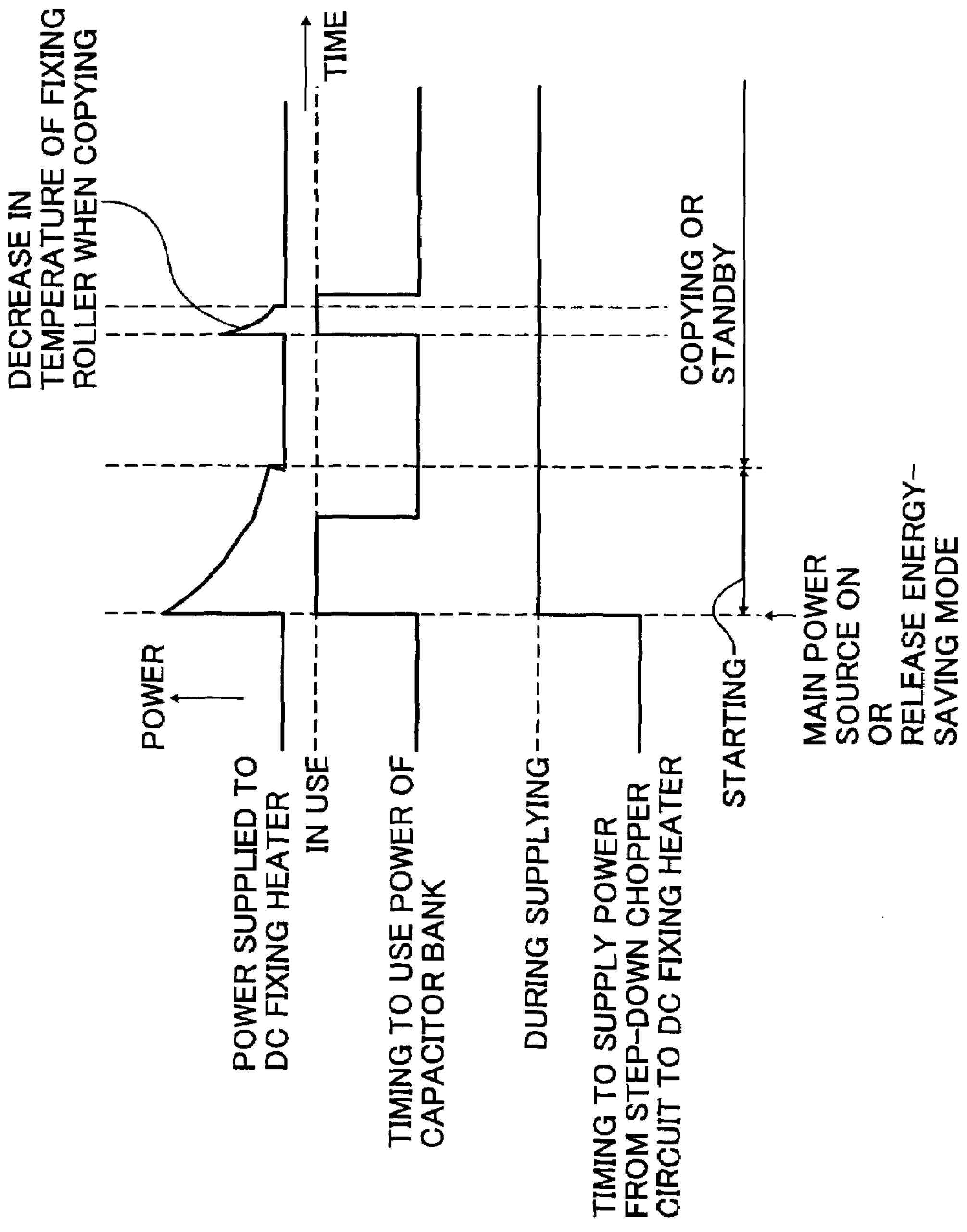
FIG. 27 is a chart for explaining timing to supply electric power to the DC fixing heaters after starting of the image forming apparatus.

FIG. 27 is a chart for explaining timing to supply electric power to the DC fixing heater 105 and the DC fixing heater 1701 after starting of the image forming apparatus 1700.

As shown in FIG. 27, only when the image forming apparatus 1700 is started and only when temperature falls, power is supplied from the capacitor bank 111 to the DC fixing heater 1701. Power is supplied to the DC fixing heater 105 all the time as long as the image forming apparatus 1700 does not enter energy-saving mode after starting.

In the image forming apparatus 1700 with the above configuration, the IGBT 1704 is opened, and the FET 1701 is controlled to use power stored in the capacitor bank 111, which reduces the maximum usage power. In addition, it is possible to form the image forming apparatus that uses a commercial power source of 100 volts and 15 amperes and enables fast starting.

All the above embodiments include the AC fixing heater 30. However, the present invention is not limited to the above configurations, and a configuration that includes only the above DC fixing heater can be available.

Figure 28:
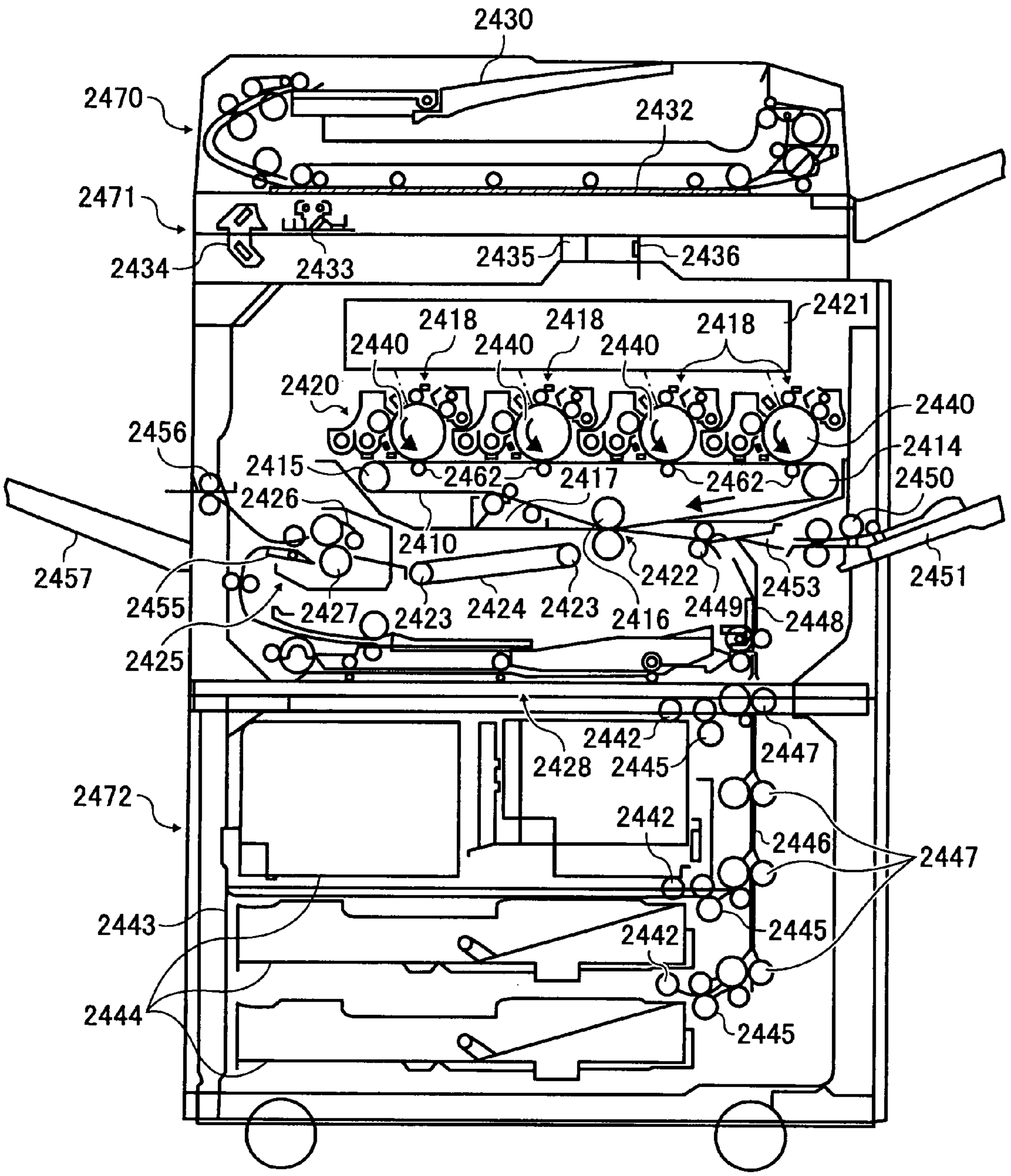
FIG. 28 is a schematic diagram of the image forming apparatus.

FIG. 28 is a schematic diagram of the image forming apparatus according to the above embodiments. The image forming apparatus has an intermediate transfer unit in its center, which has an endless intermediate transfer belt 2410. The intermediate transfer belt 2410 is a double-layer belt that includes an elastic layer on a basic layer that is made of, for example, fluorine resin that has a small elongation, rubber materials that have a large elongation, or materials that are hard to elongate such as sail cloth. The elastic layer is, for example, a well-smoothed coated layer coated with fluorine resin on a surface of fluorine rubber or acrylonitrile-butadiene copolymer rubber.

The intermediate transfer belt 2410 extends around three supporting rollers 2414 to 2416 and is rotatably driven clockwise. A cleaning unit 2417 is arranged on the right side of the second supporting roller 2415 to remove remaining toners on the intermediate transfer belt 2410 after transfer of images.

Photoconductor units 2440 of black (K), yellow (Y), magenta (M), and cyan (C), charger units 2418, and image forming devices 2420 that have a developing unit and a cleaning unit are arranged between the first supporting roller 2414 and the second supporting roller 2415 in the traveling direction of the intermediate transfer belt 2410. The image forming devices 2420 have an IC tag, which is removably mounted on the image forming apparatus body. A writing unit 2421 that emits laser beams to form images to each of the photoconductor units 2440 is arranged above the image forming devices 2420.

A second transfer unit 2422 is arranged below the intermediate transfer belt 2410. The second transfer unit 2422 is arranged by placing an endless second transfer belt 2424 around two rollers 2423 and pressing up the intermediate transfer belt 2410 to come into contact with the third supporting roller 2416. The second transfer belt 2424 is used to makes images on the intermediate transfer belt 2410 transferred on a sheet of paper. A fixing unit 2425 to fix transferred images on the sheet is arranged beside the second transfer unit 2422 and sheets on which toner images are transferred are fed thereto. The fixing unit 2425 is constituted to heat a fixing belt 2426 that is an endless belt and to press a pressure roller 2427 thereto. A sheet reversing unit 2428 that sends out sheets immediately after images are formed on their surfaces to record images on their backs in a face-down manner is arranged under the second transfer unit 2422 and the fixing unit 2425.

When a start switch of an operation unit (not shown) is pressed, a document on a document feed platform 2430 of an ADF 2470 is carried on a contact glass 2432. When a document is not set on the ADF, a scanner of an image reading unit 2471 is driven to read a document that is manually placed on the contact glass 2432, and a first carriage 2433 and a second carriage 2434 are driven for reading and scanning. Light is emitted from a light source on the first carriage 2433 to the contact glass as well as light reflected from a document surface is reflected on a first mirror of the first carriage 2433 and directed to the second carriage 2434. Then, the light is reflected on a mirror of the second carriage 2434 and passes through an imaging lens 2435 so that an image is formed on a charge coupled device (CCD) 2436 that is a reading sensor. Recording data of respective colors K, Y, M, and C are generated based on image signals obtained in the reading sensor 2436.

When the start switch is pressed, rotation driving of the intermediate transfer belt 2410, image forming preparation in each unit of the image forming device 2420, and image forming sequence of each color start. Modulated exposure laser beams are emitted to the photoconductor drums for respective colors based on the recording data, and toner images of respective colors are transferred onto the intermediate transfer belt 2410 and superimposed thereon as a single image through image forming process. A sheet is fed into the second transfer unit 2422 simultaneously with when a leading edge of the toner image enters the second transfer unit 2422. Thus, the toner image on the intermediate transfer belt 2410 is transferred onto the sheet. The sheet with the toner image is fed to the fixing unit 2425 and the toner image is fixed on the sheet.

The above sheet is sent out to the second transfer unit 2422 based on the above timing by selecting and rotatably driving one of paper feeding rollers 2442 in a paper feeding table 2472, taking a sheet from one of paper feeding trays 2444 that are arranged in multiple stages in a paper feeding unit 2443, separating only one sheet by use of a separating roller 2445, placing it in a conveyance roller unit 2446, carrying it by a conveyance roller 2447, directing it to a conveyance roller unit 2448 in the image forming apparatus, hitting it against a registration roller 2449 of the conveyance roller unit 2448, and stopping it. It is also possible to feed sheets by providing sheets on a bypass tray 2451. When a user provides sheets on the bypass tray 2451, a paper feeding roller 2450 of the image forming apparatus is rotatably driven and a sheet on the bypass tray 2451 is separated and is pulled into a bypass feeding path 2453. Likewise, the sheet is hit against the registration roller 2449 and stops.

Sheets that are subject to fixing processing in the fixing unit 2425 and then are discharged are guided to a discharging roller 2456 through a switch hook 2455 and are stacked on a catch tray 2457. Alternatively, a sheet is guided to the sheet reversing unit 2428 through the switch hook 2455, is reversed there, and is directed to a transfer position again. After an image is also recorded on its back side, the sheet is discharged to the catch tray 2457 through the discharging roller 2456. On the other hand, remaining toners on the intermediate transfer belt 2410 after transfer of images are removed by the cleaning unit 2417 and the intermediate transfer belt 2410 is ready for next image formation.

While the registration roller 2449 is generally used as being grounded, bias voltage can be applied thereto to remove paper dust. For example, a conductive rubber roller is used to apply bias voltage. The conductive rubber roller is made of, for example, conductive NBR rubber of 18 millimeters in diameter and 1 millimeter in surface thickness. Electric resistance is about 109 ohms centimeters in volume resistance of rubber materials. Thus, a surface of a sheet that passes through the registration roller 2449 to which bias voltage is applied slightly becomes negatively charged. Therefore, when transferring an image on the intermediate transfer belt 2410 to a sheet, a transfer condition may be altered, compared with a case of not applying voltage to the registration roller 2449. About −800 volts of voltage is applied on one side (front side) of the intermediate transfer belt 2410 on which toners are transferred and about +200 volts of voltage is applied on a back side of a sheet by a transfer roller 2462.

According to an aspect of the present invention, a configuration of an image forming apparatus is simplified and capacitor cells can be prevented from being damaged.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power storage device that stores therein power output from a power supply unit to be supplied to a load unit, the power storage device comprising:

a power storing unit that includes a capacitor cell;

a first switching unit that switches between a first power-supply path and a second power-supply path to supply power from the power supply unit, the power storing unit being located on the first power-supply path, and the load unit being located on the second power-supply path;

a voltage changing unit that is located on the first power-supply path, and that changes a voltage value of power supplied from the power supply unit; and an output control unit that controls, when power is supplied to the first power-supply path, the voltage changing unit to change a voltage value based on a stored voltage of the capacitor cells.

2. The power storage device according to claim 1, wherein the output control unit controls the voltage changing unit to change the voltage value based on an input voltage of power supplied from the power supply unit and a duty ratio that indicates a ratio of a time period during which the power is supplied and a time period during which power supply is stopped.

3. The power storage device according to claim 2, wherein the voltage changing unit is located where the first power-supply path and the second power-supply path intersect, the output control unit outputs, to the voltage changing unit, a pulse-width modulation signal including the duty ratio to change the voltage value, and the duty ratio indicates a different ratio of a time period during which the power is supplied and a time period during which power supply is stopped for the first power-supply path and the second power-supply path.

4. The power storage device according to claim 3, wherein the output control unit determines, when power is to be supplied to the first power-supply path, a first voltage value of the power based on at least one of a charging voltage and a charging current detected from the power storing unit, and an operation of a bias circuit, and the ratio of a time period during which the power is supplied and a time period during which power supply is stopped is determined based on the first voltage value.

5. The power storage device according to claim 4, further comprising a voltage detecting unit that detects a second voltage value of power supplied to the power storing unit, wherein the ratio of a time period during which the power is supplied and a time period during which power supply is stopped is determined based on a difference between the first voltage value and the second voltage value.

6. The power storage device according to claim 1, further comprising a second switching unit that is located on a path between the load unit and the power storing unit, and that performs switching based on whether to supply power from the power storing unit to the load unit.

7. The power storage device according to claim 1, further comprising a charging voltage detecting unit that detects a charging voltage of the power storing unit, wherein the output control unit controls, when power is supplied to the first power-supply path and the charging voltage of the power storing unit is equal to or less than a first reference value, the voltage changing unit to change the voltage value such that a first current flows in the power storing unit.

8. The power storage device according to claim 7, wherein the output control unit controls, when power is supplied to the first power-supply path and the charging voltage of the power storing unit exceeds a second reference value, the voltage changing unit to change the voltage value such that a second current lower than the first current flows in the power storing unit.

9. An image forming apparatus that includes a fixing unit that fixes a toner image, a heating unit that heats the fixing unit, and a power storage device that stores therein power output from a power supply unit, the image forming apparatus comprising:

a power storing unit that includes a capacitor cell;

a switching unit that switches between a first power-supply path and a second power-supply path to supply power from the power supply unit, the power storing unit being located on the first power-supply path, and the heating unit being located on the second power-supply path;

a voltage changing unit that is located on the first power-supply path, and that changes a voltage value of power supplied from the power supply unit; and an output control unit that controls, when power is supplied to the first power-supply path, the voltage changing unit to change a voltage value based on a stored voltage of the capacitor cells.

* * * * *